US012795399B2

(12) United States Patent
Kumar et al.

(10) Patent No.: US 12,795,399 B2
(45) Date of Patent: Nov. 10, 2026

(54) TECHNIQUES FOR NON-TRANSPARENT INFERENCE MONITORING

(71) Applicant: QUALCOMM Incorporated, San Diego, CA (US)

(72) Inventors: Rajeev Kumar, San Diego, CA (US); Aziz Gholmieh, Del Mar, CA (US); Gavin Bernard Horn, La Jolla, CA (US); Miguel Griot, La Jolla, CA (US); Geetha Priya Rajendran, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 18/395,218

(22) Filed: Dec. 22, 2023

(65) Prior Publication Data

US 2025/0212018 A1 Jun. 26, 2025

(51) Int. Cl.
*H04W 24/02* (2009.01)
*H04B 7/06* (2006.01)
(Continued)

(52) U.S. Cl.
CPC .......... *H04W 24/02* (2013.01); *H04B 7/0626* (2013.01); *H04L 43/0829* (2013.01); *H04W 24/08* (2013.01)

(58) Field of Classification Search
CPC .... H04W 24/02; H04W 24/08; H04B 7/0626; H04L 43/0829; G06N 20/00
See application file for complete search history.

(56) References Cited

U.S. PATENT DOCUMENTS

| | | | |
|---|---|---|---|
| 2010/0195644 A1 | 8/2010 | Hao | |
| 2018/0262979 A1 | 9/2018 | Wang et al. | |

(Continued)

FOREIGN PATENT DOCUMENTS

| | | | |
|---|---|---|---|
| WO | WO-2023018726 A1 | 2/2023 | |
| WO | WO-2023148010 A1 | 8/2023 | |
| WO | WO-2023206380 A1 * | 11/2023 | ............ G06N 20/00 |

OTHER PUBLICATIONS

Nokia, et al., “Further Discussion on the General Aspects of ML for Air-interface”, 3GPPTSG RAN WG1 #110, R1-2206967,3rd Generation Partnership Project, Mobile Competence Centre, 650, Route Des Lucioles, F-06921, Sophia-Antipolis Cedex, France, vol. RAN WG1, No. Toulouse, France, Aug. 22, 2022-Aug. 26, 2022, Aug. 12, 2022, 16 Pages, XP052274904.

(Continued)

*Primary Examiner* — Mohammad S Anwar
(74) *Attorney, Agent, or Firm* — Holland & Hart LLP

(57) ABSTRACT

Methods, systems, and devices for wireless communication are described. A user equipment (UE) may identify service capability information associated with multiple services and multiple associated functions supported by a service that is configured to communicate with the UE and a network entity of a radio access network (RAN). The UE may receive, from the network entity, a preferred service message indicating a subset of the multiple services available to the UE or the multiple associated functions that are available to the UE and preferred by the network entity. The UE may transmit, to the service, a request to activate or use at least one preferred service of the subset of the multiple services or at least one preferred associated function of the subset of the multiple associated functions available to the UE for communications between the UE and the network entity in accordance with the preferred service message.

60 Claims, 26 Drawing Sheets

(51) Int. Cl.

| | |
|---|---|
| ***H04L 43/0829*** | (2022.01) |
| ***H04W 24/08*** | (2009.01) |

(56) References Cited

U.S. PATENT DOCUMENTS

| | | | |
|---|---|---|---|
| 2021/0410059 | A1 | 12/2021 | Talebi Fard et al. |
| 2022/0256632 | A1 | 8/2022 | Shrivastava et al. |
| 2022/0287104 | A1 | 9/2022 | Jeon et al. |
| 2022/0360973 | A1 | 11/2022 | Zhu et al. |
| 2022/0377844 | A1 | 11/2022 | Kumar et al. |
| 2022/0400373 | A1 | 12/2022 | Zhu et al. |
| 2023/0014932 | A1 | 1/2023 | Huang et al. |
| 2023/0075276 | A1 | 3/2023 | Zhu et al. |
| 2023/0232207 | A1 | 7/2023 | Nayak |
| 2025/0212263 | A1 | 6/2025 | Kumar et al. |

OTHER PUBLICATIONS

International Search Report and Written Opinion—PCT/US2024/054796—ISA/EPO—Jan. 24, 2025 (2307891U1WO).

Qualcomm Incorporated: "General Aspects of AI/ML Framework", 3GPP TSG RAN WG1 #109-e, R1-2205023, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052144132, 15 Pages, pag. 9, 5, 4, sect. 6.2, 7.3, 4, 5.

ETSI: "Experiential Networked Intelligence (ENI), ENI Use Cases", ETSI Group Specification, 650, Route des Lucioles, F-06921 Sophia Antipolis Cedex, France, ETSI GS ENI 001, V2.1.1, Sep. 2019, pp. 1-92.

Montojo J., "AI/ML for NR Air Interface", 3GPP, A Global Initiative, The 5G Standard, Published on Oct. 2022, pp. 1-3.

* cited by examiner

TECHNIQUES FOR NON-TRANSPARENT INFERENCE MONITORING

FIELD OF TECHNOLOGY

The following relates to wireless communication, including techniques for non-transparent inference monitoring.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a number of services may be available to a UE or a radio access network (RAN), where services can communicate independently to the UE or the RAN. The data, control, and policies between the service and UE may be exposed to the RAN, i.e., data, control, and policies between UE and services are transparent to the RAN. In some cases, the UE may interact or otherwise communicate with (e.g., use) a cross-node artificial intelligence (AI) or machine learning (ML) service in a transparent manner, such that the RAN is aware of inference data provided to the service by UE and control or policies provided by the service to UE.

SUMMARY

The described techniques relate to improved methods, systems, devices, and apparatuses that support techniques for non-transparent inference monitoring. In some implementations, a user equipment (UE) may identify service capability information associated with multiple services and multiple associated functions (e.g., functions associated with the multiple services or with the UE) supported by a service that is configured to communicate with the UE and a network entity of a radio access network (RAN). The UE may receive, from the network entity, a preferred service message indicating a subset of the multiple services available to the UE and preferred by the network entity or a subset of the multiple associated functions that are available to the UE and preferred by the network entity. The UE may transmit, to the service, a request to activate or use at least one preferred service of the subset of the multiple services or at least one preferred associated function of the subset of the multiple associated functions available to the UE and preferred by the network entity for communications between the UE and the network entity in accordance with the preferred service message.

In some other implementations, the UE may receive monitoring input data from an artificial intelligence (AI) or machine learning (ML) service that is configured to communicate with the UE and the network entity. The UE may transmit a monitoring report to the AI or ML service based on the monitoring input data provided by the AI or ML service and a reporting configuration of the UE. The monitoring report may include feedback information associated with a first inference or model of the AI or ML service. The UE may communicate one or more messages with the network entity using a second inference or model of the AI or ML service in accordance with the monitoring report provided by the UE.

A method for wireless communication by a UE is described. The method may include identifying service capability information associated with a set of multiple services and a set of multiple associated functions supported by a service that is configured to communicate with the UE and a network entity of a RAN, receiving, from the network entity, a preferred service message indicating a subset of the set of multiple services available to the UE and preferred by the network entity or the set of multiple associated functions that are available to the UE and preferred by the network entity, and transmitting, to the service, a request to activate or use at least one preferred service of the subset of the set of multiple services or at least one preferred associated function of the subset of the set of multiple associated functions available to the UE and preferred by the network entity for communications between the UE and the network entity in accordance with the preferred service message.

A UE for wireless communication is described. The UE may include one or more memories storing processor executable code, and one or more processors coupled with the one or more memories. The one or more processors may individually or collectively operable to execute the code to cause the UE to identify service capability information associated with a set of multiple services and a set of multiple associated functions supported by a service that is configured to communicate with the UE and a network entity of a RAN, receive, from the network entity, a preferred service message indicating a subset of the set of multiple services available to the UE and preferred by the network entity or the set of multiple associated functions that are available to the UE and preferred by the network entity, and transmit, to the service, a request to activate or use at least one preferred service of the subset of the set of multiple services or at least one preferred associated function of the subset of the set of multiple associated functions available to the UE and preferred by the network entity for communications between the UE and the network entity in accordance with the preferred service message.

Another UE for wireless communication is described. The UE may include means for identifying service capability information associated with a set of multiple services and a set of multiple associated functions supported by a service that is configured to communicate with the UE and a network entity of a RAN, means for receiving, from the network entity, a preferred service message indicating a subset of the set of multiple services available to the UE and preferred by the network entity or the set of multiple associated functions that are available to the UE and preferred by the network entity, and means for transmitting, to the service, a request to activate or use at least one preferred service of the subset of the set of multiple services or at least one preferred associated function of the subset of the set of multiple associated functions available to the UE and preferred by the network entity for communications between the UE and the network entity in accordance with the preferred service message.

A non-transitory computer-readable medium storing code for wireless communication is described. The code may include instructions executable by a processor to identify service capability information associated with a set of multiple services and a set of multiple associated functions supported by a service that is configured to communicate with the UE and a network entity of a RAN, receive, from the network entity, a preferred service message indicating a subset of the set of multiple services available to the UE and preferred by the network entity or the set of multiple associated functions that are available to the UE and preferred by the network entity, and transmit, to the service, a request to activate or use at least one preferred service of the subset of the set of multiple services or at least one preferred associated function of the subset of the set of multiple associated functions available to the UE and preferred by the network entity for communications between the UE and the network entity in accordance with the preferred service message.

In some examples of the method, UEs, and non-transitory computer-readable medium described herein, the preferred service message indicating the subset of the set of multiple services available to the UE and preferred by the network entity or the set of multiple associated functions that may be available to the UE and preferred by the network entity may be based on a current RAN state of the network entity.

In some examples of the method, UEs, and non-transitory computer-readable medium described herein, identifying the service capability information may include operations, features, means, or instructions for receiving service capability information associated with a set of multiple functions supported by the service that may be configured to communicate with the UE and the network entity of the RAN.

In some examples of the method, UEs, and non-transitory computer-readable medium described herein, receiving the service capability information may include operations, features, means, or instructions for receiving the service capability information that indicates one or more set of AI or ML functions, AI or ML models and non AI or ML functions supported by the service on a per-function bases, a per-feature basis, or a per-feature group basis.

In some examples of the method, UEs, and non-transitory computer-readable medium described herein, receiving the service capability information may include operations, features, means, or instructions for receiving a UE-specific or non-UE-specific message indicating the service capability information.

In some examples of the method, UEs, and non-transitory computer-readable medium described herein, the subset of the set of multiple services available to the UE and preferred by the network entity or the set of multiple associated functions available to the UE and preferred by the network entity may be preferred for all RAN states of the network entity.

In some examples of the method, UEs, and non-transitory computer-readable medium described herein, the request may be transmitted via a control plane or user plane.

In some examples of the method, UEs, and non-transitory computer-readable medium described herein, receiving the preferred service message may include operations, features, means, or instructions for receiving dedicated signaling or system information instructing the UE to activate or prioritize the at least one preferred service of the subset of the set of multiple services or the at least one preferred associated function of the subset of the set of multiple associated functions available to the UE and preferred by the network entity.

In some examples of the method, UEs, and non-transitory computer-readable medium described herein, the at least one preferred service of the subset of the set of multiple services or the at least one preferred associated function of the subset of the set of multiple associated functions available to the UE and preferred by the network entity may be based on a current RAN state of the network entity.

In some examples of the method, UEs, and non-transitory computer-readable medium described herein, the current RAN state of the network entity includes a codebook index of the network entity, a MULTIPLE-INPUT MULTIPLE OUTPUT (MIMO) scheme of the network entity, a channel state information (CSI) reporting configuration of the UE, a location of the UE, or a combination thereof.

Some examples of the method, UEs, and non-transitory computer-readable medium described herein may further include operations, features, means, or instructions for receiving, from the network entity, a request or instruction for the UE to activate or use the at least one preferred service of the subset of the set of multiple services or the at least one preferred associated function of the subset of the set of multiple associated functions available to the UE and preferred by the network entity in accordance with the preferred service message indicating that the at least one preferred service or the at least one preferred associated function of the service may be preferred by the network entity.

In some examples of the method, UEs, and non-transitory computer-readable medium described herein, receiving the preferred service message may include operations, features, means, or instructions for receiving the preferred service message in accordance with a mapping between the set of multiple services or the set of multiple associated functions supported by the service and one or more RAN states of the network entity, an area configuration for the service, or any combination thereof.

In some examples of the method, UEs, and non-transitory computer-readable medium described herein, the area configuration corresponds to a public land mobile network (PLMN), a tracking area, or a RAN notification area associated with the network entity.

Some examples of the method, UEs, and non-transitory computer-readable medium described herein may further include operations, features, means, or instructions for performing a RAN-triggered service establishment procedure with the service in accordance with the preferred service message from the network entity.

In some examples of the method, UEs, and non-transitory computer-readable medium described herein, the preferred service message further indicates routing information to use for service establishment between the UE and the service.

A method for wireless communication by a network entity is described. The method may include receiving, from a service that is configured to communicate with the network entity and a UE, service capability information associated with a mapping between a set of multiple services or a set of multiple associated functions supported by the service and one or more RAN states of the network entity, transmitting, to the UE, a preferred service message indicating a subset of the set of multiple services available to the UE and preferred by the network entity or the set of multiple associated functions that are available to the UE and preferred by the network entity in accordance with the mapping, and communicating one or more messages with the UE using at least one preferred service of the subset of the set of multiple services or at least one preferred associated function of the subset of the set of multiple associated functions available to the UE and preferred by the network entity in accordance with the preferred service message.

A network entity for wireless communication is described. The network entity may include one or more memories storing processor executable code, and one or more processors coupled with the one or more memories. The one or more processors may individually or collectively operable to execute the code to cause the network entity to receive, from a service that is configured to communicate with the network entity and a UE, service capability information associated with a mapping between a set of multiple services or a set of multiple associated functions supported by the service and one or more RAN states of the network entity, transmit, to the UE, a preferred service message indicating a subset of the set of multiple services available to the UE and preferred by the network entity or the set of multiple associated functions that are available to the UE and preferred by the network entity in accordance with the mapping, and communicate one or more messages with the UE using at least one preferred service of the subset of the set of multiple services or at least one preferred associated function of the subset of the set of multiple associated functions available to the UE and preferred by the network entity in accordance with the preferred service message.

Another network entity for wireless communication is described. The network entity may include means for receiving, from a service that is configured to communicate with the network entity and a UE, service capability information associated with a mapping between a set of multiple services or a set of multiple associated functions supported by the service and one or more RAN states of the network entity, means for transmitting, to the UE, a preferred service message indicating a subset of the set of multiple services available to the UE and preferred by the network entity or the set of multiple associated functions that are available to the UE and preferred by the network entity in accordance with the mapping, and means for communicating one or more messages with the UE using at least one preferred service of the subset of the set of multiple services or at least one preferred associated function of the subset of the set of multiple associated functions available to the UE and preferred by the network entity in accordance with the preferred service message.

A non-transitory computer-readable medium storing code for wireless communication is described. The code may include instructions executable by a processor to receive, from a service that is configured to communicate with the network entity and a UE, service capability information associated with a mapping between a set of multiple services or a set of multiple associated functions supported by the service and one or more RAN states of the network entity, transmit, to the UE, a preferred service message indicating a subset of the set of multiple services available to the UE and preferred by the network entity or the set of multiple associated functions that are available to the UE and preferred by the network entity in accordance with the mapping, and communicate one or more messages with the UE using at least one preferred service of the subset of the set of multiple services or at least one preferred associated function of the subset of the set of multiple associated functions available to the UE and preferred by the network entity in accordance with the preferred service message.

In some examples of the method, network entities, and non-transitory computer-readable medium described herein, the preferred service message indicating the subset of the set of multiple services available to the UE and preferred by the network entity or the set of multiple associated functions that may be available to the UE and preferred by the network entity may be based on a current RAN state of the network entity.

In some examples of the method, network entities, and non-transitory computer-readable medium described herein, transmitting the preferred service message may include operations, features, means, or instructions for transmitting dedicated signaling or system information that instructs the UE to activate or prioritize the at least one preferred service of the subset of the set of multiple services or the at least one preferred associated function of the subset of the set of multiple associated functions available to the UE and preferred by the network entity.

In some examples of the method, network entities, and non-transitory computer-readable medium described herein, the dedicated signaling or the system information that instructs the UE to activate or prioritize the at least one preferred service of the subset of the set of multiple services or the at least one preferred associated function of the subset of the set of multiple associated functions available to the UE and preferred by the network entity may be based on a current RAN state of the network entity.

In some examples of the method, network entities, and non-transitory computer-readable medium described herein, receiving the service capability information may include operations, features, means, or instructions for receiving the service capability information that indicates a set of non-AI or ML functions, AI or ML functions, or AI or ML models supported by the service on a per-function basis, a per-feature basis, or a per-feature group basis.

Some examples of the method, network entities, and non-transitory computer-readable medium described herein may further include operations, features, means, or instructions for determining that the at least one preferred service or function of the service may be preferred based on a codebook index of the network entity, a MIMO scheme of the network entity, a CSI reporting configuration of the UE, a location of the UE, or a combination thereof.

In some examples of the method, network entities, and non-transitory computer-readable medium described herein, transmitting the preferred service message may include operations, features, means, or instructions for transmitting the preferred service message that includes a request or instruction for the UE to activate or prioritize the at least one preferred service or associated function available to the UE and preferred by the network entity.

In some examples of the method, network entities, and non-transitory computer-readable medium described herein, receiving the service capability information may include operations, features, means, or instructions for receiving the service capability information that indicates the set of multiple services and the set of multiple associated functions supported by the service, the mapping between the set of multiple associated functions supported by the service and the one or more RAN states of the network entity, an area configuration for the service, or any combination thereof.

In some examples of the method, network entities, and non-transitory computer-readable medium described herein, the area configuration corresponds to a PLMN, a tracking area, or a RAN notification area associated with the network entity.

In some examples of the method, network entities, and non-transitory computer-readable medium described herein, transmitting the preferred service message may include operations, features, means, or instructions for transmitting the preferred service message in accordance with the mapping and a current RAN state of the network entity that corresponds to a codebook index of the network entity, a MIMO scheme of the network entity, a location of the UE relative to the network entity, a channel quality metric, a signal strength of the one or more messages, or any combination thereof.

In some examples of the method, network entities, and non-transitory computer-readable medium described herein, the preferred service message further indicates routing information to use for service establishment between the UE and the service.

A method for wireless communication by a UE is described. The method may include receiving monitoring input data from an AI or ML service that is configured to communicate with the UE and a network entity of a RAN, transmitting a monitoring report to the AI or ML service based on the monitoring input data provided by the AI or ML service and a reporting configuration of the UE, the monitoring report including feedback information associated with a first inference or model of the AI or ML service, and communicating one or more messages with the network entity of the RAN using a second inference or model of the AI or ML service in accordance with the monitoring report provided by the UE.

A UE for wireless communication is described. The UE may include one or more memories storing processor executable code, and one or more processors coupled with the one or more memories. The one or more processors may individually or collectively operable to execute the code to cause the UE to receive monitoring input data from an AI or ML service that is configured to communicate with the UE and a network entity of a RAN, transmit a monitoring report to the AI or ML service based on the monitoring input data provided by the AI or ML service and a reporting configuration of the UE, the monitoring report including feedback information associated with a first inference or model of the AI or ML service, and communicate one or more messages with the network entity of the RAN using a second inference or model of the AI or ML service in accordance with the monitoring report provided by the UE.

Another UE for wireless communication is described. The UE may include means for receiving monitoring input data from an AI or ML service that is configured to communicate with the UE and a network entity of a RAN, means for transmitting a monitoring report to the AI or ML service based on the monitoring input data provided by the AI or ML service and a reporting configuration of the UE, the monitoring report including feedback information associated with a first inference or model of the AI or ML service, and means for communicating one or more messages with the network entity of the RAN using a second inference or model of the AI or ML service in accordance with the monitoring report provided by the UE.

A non-transitory computer-readable medium storing code for wireless communication is described. The code may include instructions executable by a processor to receive monitoring input data from an AI or ML service that is configured to communicate with the UE and a network entity of a RAN, transmit a monitoring report to the AI or ML service based on the monitoring input data provided by the AI or ML service and a reporting configuration of the UE, the monitoring report including feedback information associated with a first inference or model of the AI or ML service, and communicate one or more messages with the network entity of the RAN using a second inference or model of the AI or ML service in accordance with the monitoring report provided by the UE.

Some examples of the method, UEs, and non-transitory computer-readable medium described herein may further include operations, features, means, or instructions for receiving second monitoring input data from the network entity of the RAN that may be configured to communicate with the UE and the AI or ML service, where the monitoring report may be based on the second monitoring input data.

In some examples of the method, UEs, and non-transitory computer-readable medium described herein, transmitting the monitoring report may include operations, features, means, or instructions for transmitting the monitoring report that indicates at least one of a minimum mean square error (MMSE) threshold, latency data, network loading information, uplink or downlink throughout information, packet loss data, or radio link failure (RLF) rate information associated with the first inference or model of the AI or ML service.

In some examples of the method, UEs, and non-transitory computer-readable medium described herein, transmitting the monitoring report may include operations, features, means, or instructions for transmitting the monitoring report to the AI or ML service based on the monitoring input data satisfying one or more event-based trigger conditions associated with the reporting configuration of the UE.

Some examples of the method, UEs, and non-transitory computer-readable medium described herein may further include operations, features, means, or instructions for transmitting first AI or ML input data to the AI or ML service and receiving, from the AI or ML service, AI or ML output data including positioning data or feedback information associated with the first inference or model of the AI or ML service.

Some examples of the method, UEs, and non-transitory computer-readable medium described herein may further include operations, features, means, or instructions for transmitting, to the AI or ML service, a lifecycle management (LCM) control indication including a request to deactivate, switch, revert, or reconfigure a current model of the AI or ML service based on the monitoring input data.

Some examples of the method, UEs, and non-transitory computer-readable medium described herein may further include operations, features, means, or instructions for receiving, from the AI or ML service, LCM control signaling associated with deactivating, switching, reverting, or reconfiguring the current model of the AI or ML service in accordance with the LCM control signaling.

Some examples of the method, UEs, and non-transitory computer-readable medium described herein may further include operations, features, means, or instructions for receiving control signaling that indicates the reporting configuration of the UE, where transmitting the monitoring report may be based on the control signaling.

In some examples of the method, user equipment (UEs), and non-transitory computer-readable medium described herein, the one or more messages may be communicated with the network entity of the RAN based on one or more communication parameters, the one or more communication parameters based on the second inference or model of the AI or ML service.

A method for wireless communication by a network entity is described. The method may include receiving monitoring input data from an AI or ML service that is configured to communicate with the network entity and a UE, transmitting a monitoring report to the AI or ML service based on the monitoring input data provided by the AI or ML service and a reporting configuration of the network entity, the monitoring report including feedback information associated with a first inference or model of the AI or ML service, and communicating one or more messages with the UE using a second inference or model of the AI or ML service in accordance with the monitoring report provided by the network entity.

A network entity for wireless communication is described. The network entity may include one or more memories storing processor executable code, and one or more processors coupled with the one or more memories. The one or more processors may individually or collectively operable to execute the code to cause the network entity to receive monitoring input data from an AI or ML service that is configured to communicate with the network entity and a UE, transmit a monitoring report to the AI or ML service based on the monitoring input data provided by the AI or ML service and a reporting configuration of the network entity, the monitoring report including feedback information associated with a first inference or model of the AI or ML service, and communicate one or more messages with the UE using a second inference or model of the AI or ML service in accordance with the monitoring report provided by the network entity.

Another network entity for wireless communication is described. The network entity may include means for receiving monitoring input data from an AI or ML service that is configured to communicate with the network entity and a UE, means for transmitting a monitoring report to the AI or ML service based on the monitoring input data provided by the AI or ML service and a reporting configuration of the network entity, the monitoring report including feedback information associated with a first inference or model of the AI or ML service, and means for communicating one or more messages with the UE using a second inference or model of the AI or ML service in accordance with the monitoring report provided by the network entity.

A non-transitory computer-readable medium storing code for wireless communication is described. The code may include instructions executable by a processor to receive monitoring input data from an AI or ML service that is configured to communicate with the network entity and a UE, transmit a monitoring report to the AI or ML service based on the monitoring input data provided by the AI or ML service and a reporting configuration of the network entity, the monitoring report including feedback information associated with a first inference or model of the AI or ML service, and communicate one or more messages with the UE using a second inference or model of the AI or ML service in accordance with the monitoring report provided by the network entity.

Some examples of the method, network entities, and non-transitory computer-readable medium described herein may further include operations, features, means, or instructions for transmitting second monitoring input data to the UE, where the monitoring report may be based on the second monitoring input data, and where the second inference or model of the AI or ML service may be based on feedback information associated with the second monitoring input data provided by the network entity.

In some examples of the method, network entities, and non-transitory computer-readable medium described herein, transmitting the monitoring report may include operations, features, means, or instructions for transmitting the monitoring report that triggers deactivation of the first inference or model of the AI or ML service when the feedback information indicates that a performance of the first inference or model may be below a threshold.

In some examples of the method, network entities, and non-transitory computer-readable medium described herein, transmitting the monitoring report may include operations, features, means, or instructions for transmitting the monitoring report that triggers a switch from the first inference or model of the AI or ML service to the second inference or model of the AI or ML service when the feedback information indicates that a performance of the first inference or model may be below a threshold.

Some examples of the method, network entities, and non-transitory computer-readable medium described herein may further include operations, features, means, or instructions for receiving, from the AI or ML service, AI or ML output data generated using the second inference or model of the AI or ML service.

Some examples of the method, network entities, and non-transitory computer-readable medium described herein may further include operations, features, means, or instructions for receiving, from the AI or ML service, LCM control signaling that indicates a reconfiguration from an AI or ML-based model to a non-AI or ML-based model, where the reconfiguration may be based on the monitoring report.

Some examples of the method, network entities, and non-transitory computer-readable medium described herein may further include operations, features, means, or instructions for receiving, from the AI or ML service, LCM control signaling that indicates a reconfiguration from a non-AI or ML-based model to an AI or ML-based model, where the reconfiguration may be based on the monitoring report.

In some examples of the method, network entities, and non-transitory computer-readable medium described herein, the second inference or model of the AI or ML service includes the first inference or model of the AI or ML service.

Some examples of the method, network entities, and non-transitory computer-readable medium described herein may further include operations, features, means, or instructions for receiving, from the AI or ML service, control signaling that indicates the reporting configuration of the network entity, where transmitting the monitoring report may be based on the control signaling.

In some examples of the method, network entities, and non-transitory computer-readable medium described herein, the one or more messages may be communicated with the UE based on one or more communication parameters, the one or more communication parameters based on the second inference or model of the AI or ML service.

A method for wireless communication by an AI or ML service is described. The method may include transmitting monitoring input data to one or both of a UE or a network entity of a RAN, receiving, from one or both of the UE or the network entity, at least one monitoring report based on the monitoring input data provided by the AI or ML service and a reporting configuration of the UE or the network entity, the at least one monitoring report including feedback information associated with a first inference or model of the AI or ML service, and performing one or more LCM operations associated with the first inference or model of the AI or ML service in accordance with the at least one monitoring report provided by one or both of the UE or the network entity.

An AI or ML service for wireless communication is described. The AI or ML service may include one or more memories storing processor executable code, and one or more processors coupled with the one or more memories. The one or more processors may individually or collectively operable to execute the code to cause the AI or ML service to transmit monitoring input data to one or both of a UE or a network entity of a RAN, receive, from one or both of the UE or the network entity, at least one monitoring report based on the monitoring input data provided by the AI or ML service and a reporting configuration of the UE or the network entity, the at least one monitoring report including feedback information associated with a first inference or model of the AI or ML service, and perform one or more LCM operations associated with the first inference or model of the AI or ML service in accordance with the at least one monitoring report provided by one or both of the UE or the network entity.

Another AI or ML service for wireless communication is described. The AI or ML service may include means for transmitting monitoring input data to one or both of a UE or a network entity of a RAN, means for receiving, from one or both of the UE or the network entity, at least one monitoring report based on the monitoring input data provided by the AI or ML service and a reporting configuration of the UE or the network entity, the at least one monitoring report including feedback information associated with a first inference or model of the AI or ML service, and means for performing one or more LCM operations associated with the first inference or model of the AI or ML service in accordance with the at least one monitoring report provided by one or both of the UE or the network entity.

A non-transitory computer-readable medium storing code for wireless communication is described. The code may include instructions executable by a processor to transmit monitoring input data to one or both of a UE or a network entity of a RAN, receive, from one or both of the UE or the network entity, at least one monitoring report based on the monitoring input data provided by the AI or ML service and a reporting configuration of the UE or the network entity, the at least one monitoring report including feedback information associated with a first inference or model of the AI or ML service, and perform one or more LCM operations associated with the first inference or model of the AI or ML service in accordance with the at least one monitoring report provided by one or both of the UE or the network entity.

In some examples of the method, AIs, and non-transitory computer-readable medium described herein, receiving the at least one monitoring report may include operations, features, means, or instructions for receiving the at least one monitoring report that indicates at least one of a MMSE threshold, latency data, network loading information, uplink or downlink throughout information, packet loss data, or RLF rate information associated with the first inference or model of the AI or ML service.

In some examples of the method, AIs, and non-transitory computer-readable medium described herein, receiving the at least one monitoring report may include operations, features, means, or instructions for receiving the at least one monitoring report from the UE based on the monitoring input data satisfying one or more event-based trigger conditions associated with the reporting configuration of the UE.

In some examples of the method, AIs, and non-transitory computer-readable medium described herein, receiving the at least one monitoring report may include operations, features, means, or instructions for receiving the at least one monitoring report from the network entity based on the monitoring input data satisfying one or more event-based trigger conditions associated with the reporting configuration of the network entity.

In some examples of the method, AIs, and non-transitory computer-readable medium described herein, receiving the at least one monitoring report may include operations, features, means, or instructions for receiving the at least one monitoring report from one or both of the UE or the network entity in accordance with one or more periodic reporting criteria associated with the reporting configuration of the UE or the network entity.

In some examples of the method, AIs, and non-transitory computer-readable medium described herein, receiving the at least one monitoring report may include operations, features, means, or instructions for receiving respective monitoring reports from the UE and the network entity and performing one or more LCM operations associated with the first inference or model of the AI or ML service based on the respective monitoring reports provided by the UE and the network entity.

Some examples of the method, AIs, and non-transitory computer-readable medium described herein may further include operations, features, means, or instructions for receiving first AI or ML input data from the UE and transmitting, to the UE, AI or ML output data including CSI, positioning data, or feedback information generated using a second inference or model of the AI or ML service.

In some examples of the method, AIs, and non-transitory computer-readable medium described herein, performing the one or more LCM operations may include operations, features, means, or instructions for receiving, from the UE, an LCM control indication including a request to deactivate, switch, revert, or reconfigure the first inference or model of the AI or ML service based on the monitoring input data.

In some examples of the method, AIs, and non-transitory computer-readable medium described herein, performing the one or more LCM operations may include operations, features, means, or instructions for transmitting, to the UE, LCM control signaling associated with deactivating, switching, reverting, or reconfiguring the first inference or model of the AI or ML service in accordance with the LCM control signaling.

In some examples of the method, AIs, and non-transitory computer-readable medium described herein, performing the one or more LCM operations may include operations, features, means, or instructions for transmitting one or more control messages associated with updating or reconfiguring the first inference or model of the AI or ML service based on the monitoring input data.

In some examples of the method, AIs, and non-transitory computer-readable medium described herein, the AI or ML service runs on one or more processors of a network node that may be separate from the RAN.

In some examples of the method, AIs, and non-transitory computer-readable medium described herein, the AI or ML service runs on one or more processors of the UE that may be capable of performing one or more AI or ML functions.

DETAILED DESCRIPTION

Figure 1:
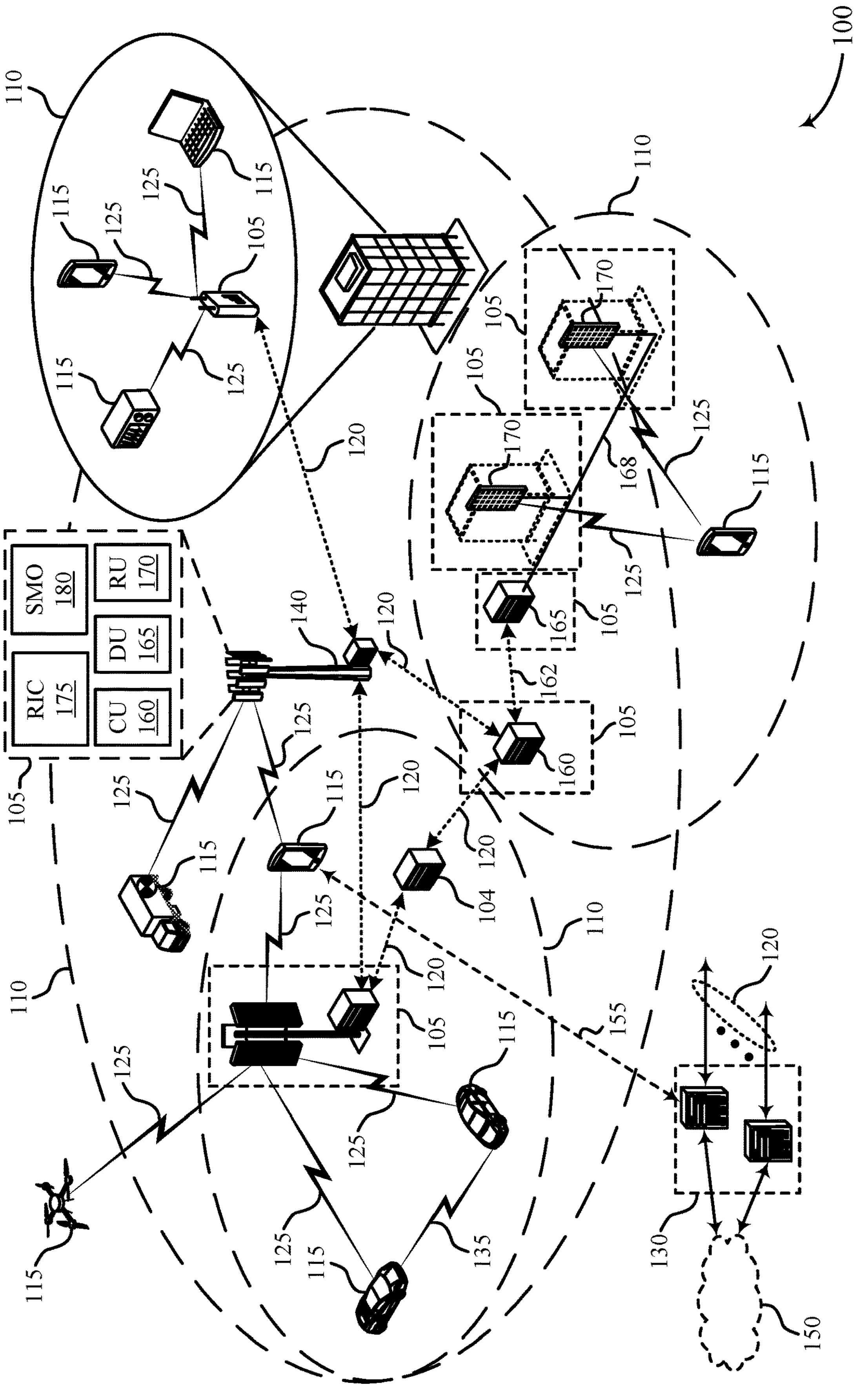
FIG. 1 shows an example of a wireless communications system 100 that supports techniques for non-transparent service establishment and inference monitoring in accordance with one or more aspects of the present disclosure.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others.

The described examples can be implemented in any device, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

In some wireless communications systems, a number of services may be available to the UE or radio access network (RAN), where services can communicate independently to UE or RAN. In some cases, the data, control, and policies between the service and UE is not exposed to the RAN, i.e., data, control, and policies between UE and services are non-transparent to the RAN. In some wireless systems, the RAN (e.g., network entities) may interface with a service-based network in order to connect UEs to network services maintained at carious network addresses within the service-based network. In the context of a service-based system, operations and functions may be distributed across a number of network services that may be hosted at different network addresses, such as in cloud-based architecture. As a result, UEs in a service-based system may be able to establish and maintain connections with (e.g., "subscribe" to) different network services or groups thereof on an à la carte basis, where each network service offers or provides a respective network functionality or service. For example, a service-based system may include a mobility service, a security service, a privacy service, a location service, AI/ML services, and the like.

In some wireless communications systems, some services may implement one or more AI/ML or non-AI/ML functions. These services may establish (e.g., activate) communication and provide services to the UE in a non-transparent way, such that the service data or policies are not exposed to a network entity of a radio access network. In some scenarios, these services may additionally communicate and provide service data or policies to the network entity of a radio access network to improve the efficiency and/or reliability of wireless communications between the UE and the RAN.

In some wireless communications systems, although UE can directly communicate with the services (e.g., data or control messages between UE and services are non-transparent to the RAN), the RAN can provide its preference for the services available to the UE and preferred by the network entity. RAN may provide its preference for the services, as they may be additionally providing control or policies based on the service between them and UE.

In some wireless communications systems, services, e.g., AI/ML services, may implement one or more artificial intelligence (AI) or machine learning (ML) functions, where these AI/ML functions may support an AI/ML model that can predict or otherwise extrapolate future channel state information (CSI) based on past CSI trends, dynamically allocate resources based on real time network conditions, select optimal beamforming parameters, mitigate potential sources of interference, etc. In this regard, each UE within a service-based system may be able to select which network services the UE will subscribe to based on the individualized characteristics or needs of the respective UE.

Some AI/ML services may be configured as cross-node services (also referred to as end-to-end AI/ML services) that are collectively hosted or provided by two or more distributed nodes (such as UEs, RAN devices, network entities, or any combination thereof). In some cases, a UE may interact or otherwise communicate with (e.g., use) a cross-node AI/ML service in a transparent manner, such that the RAN is aware of inference data provided to the service by UE and control or policies provided by the service to UE. In the cross-node AI/ML inference, the inference output may be provided to the RAN based on the inference data received from the UE. However, exposing both inference input data and output of the inference to the RAN may cause risk to model security, which may be undesirable. Therefore, end-to-end cross-node AI/ML operation may be desirable, where the inference data from the UE to service, and control or policies from the services to the UE are not exposed to the RAN, i.e., communication between UE and services remains non-transparent to the RAN. Only the expected inference output is exposed to the RAN by service for the optimization of wireless communication systems.

Accessing cross-node AI/ML services in a non-transparent manner (e.g., where the UE connects directly to the cross-node AI/ML service) may provide greater isolation between the UE, the RAN, and the cross-node AI/ML service, thereby enabling the UE to access the cross-code AI/ML service without exposing any of the underlying AI/ML models (which may include proprietary information/software) to the RAN. For example, a cross-node AI/ML service that supports CSI encoding/decoding functionality may receive compressed CSI from the UE, decode the compressed CSI using various AI/ML models, and forward the decompressed CSI to the RAN. By communicating with the UE in a non-transparent manner, the cross-node AI/ML service can provide the decompressed (e.g., decoded) CSI to the RAN without exposing the underlying CSI (de) compression algorithms to the RAN, thereby promoting greater network isolation, reduced processing overhead, etc.

In some implementations, the RAN may opportunistically transmit a service prioritization message to the UE based on a state or configuration of the RAN. For example, if the RAN determines that a function of the cross node AI/ML service (e.g., CSI decompression) is preferable for (e.g., compatible with) a state of the RAN (such as a codebook or MIMO scheme the RAN is using to communicate with the UE), the RAN may transmit a service prioritization message, instructing the UE to prioritize (e.g., establish, activate) the function by interacting with the cross node AI/ML service in a non-transparent manner. Thus, by prioritizing the function by interacting with the cross node AI/ML service in a non-transparent manner, the UE may perform inference procedures with the AI/ML service with enhanced efficiently. Further, such prioritization may improve the inference capability of the system, specifically at the RAN and at the UE in communication with the AI/ML service.

In some other implementations, the AI/ML service may configure the RAN and/or the UE to independently monitor and report various metrics for lifecycle management (LCM). For example, the UE may transmit a first monitoring report to the AI/ML service after a first reporting event (e.g., trigger condition) is detected by the UE, and the RAN may transmit a second monitoring report to the AI/ML service after a second reporting event is detected by the RAN. Accordingly, the AI/ML service may evaluate key performance indicators (KPIs) and/or switch to a different AI/ML model based on the aggregate monitoring data provided by the UE and the RAN.

Aspects of the disclosure are initially described in the context of wireless communications systems. Aspects of the disclosure are further illustrated by and described with reference to process flows. Aspects of the disclosure are further illustrated by and described with reference to apparatus diagrams, system diagrams, and flowcharts that relate to techniques for non-transparent inference monitoring.

FIG. 1 shows an example of a wireless communications system 100 that supports techniques for non-transparent inference monitoring in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a RAN node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for non-transparent inference monitoring as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, MIMO communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In accordance with one or more aspects of the present disclosure, a UE 115 may identify (e.g., obtain, receive, select, or choose) service capability information associated with multiple services and multiple associated functions supported by a service that is configured to communicate with the UE 115 and a network entity 105 of a RAN. The UE 115 may receive, from the network entity 105, a preferred service message indicating a subset of the multiple services available to the UE 115 and preferred by the network entity 105 or the subset of the multiple associated functions that are available to the UE 115 and preferred by the network entity 105. The UE 115 may transmit, to the service, a request to activate or use at least one preferred service of the subset of the multiple services or at least one preferred associated function of the subset of the multiple associated functions available to the UE 115 and preferred by the network entity for communications between the UE 115 and the network entity 105 in accordance with the preferred service message.

Additionally, or alternatively, the UE 115 may receive monitoring input data from an AI or ML service that is configured to communicate with the UE 115 and the network entity 105. The UE 115 may transmit a monitoring report to the AI or ML service based on the monitoring input data provided by the AI or ML service and a reporting configuration of the UE 115. The monitoring report may include feedback information associated with a first inference or model of the AI or ML service. The UE 115 may communicate one or more messages with the network entity 105 using a second inference or model of the AI or ML service in accordance with the monitoring report provided by the UE 115.

In some examples, a CSI feedback (CSF) encoder may be deployed at the UE 115. In some examples, the CSF encoder at the UE 115 may provide compressed CSI to the network. In some systems, the CSF decoder may be deployed at an AI/ML service. In some examples, the CSF decoder may provide a decompressed output (e.g., decompressed CSI) to the network entity 105. In some implementations, the UE 115 may be a consumer of the AI/ML service. In these implementations, the AI/ML service may forward the output of the AI/ML service inference to the UE 115. In such examples, a cross-node service that may run end-to-end may be enabled.

Figure 2:
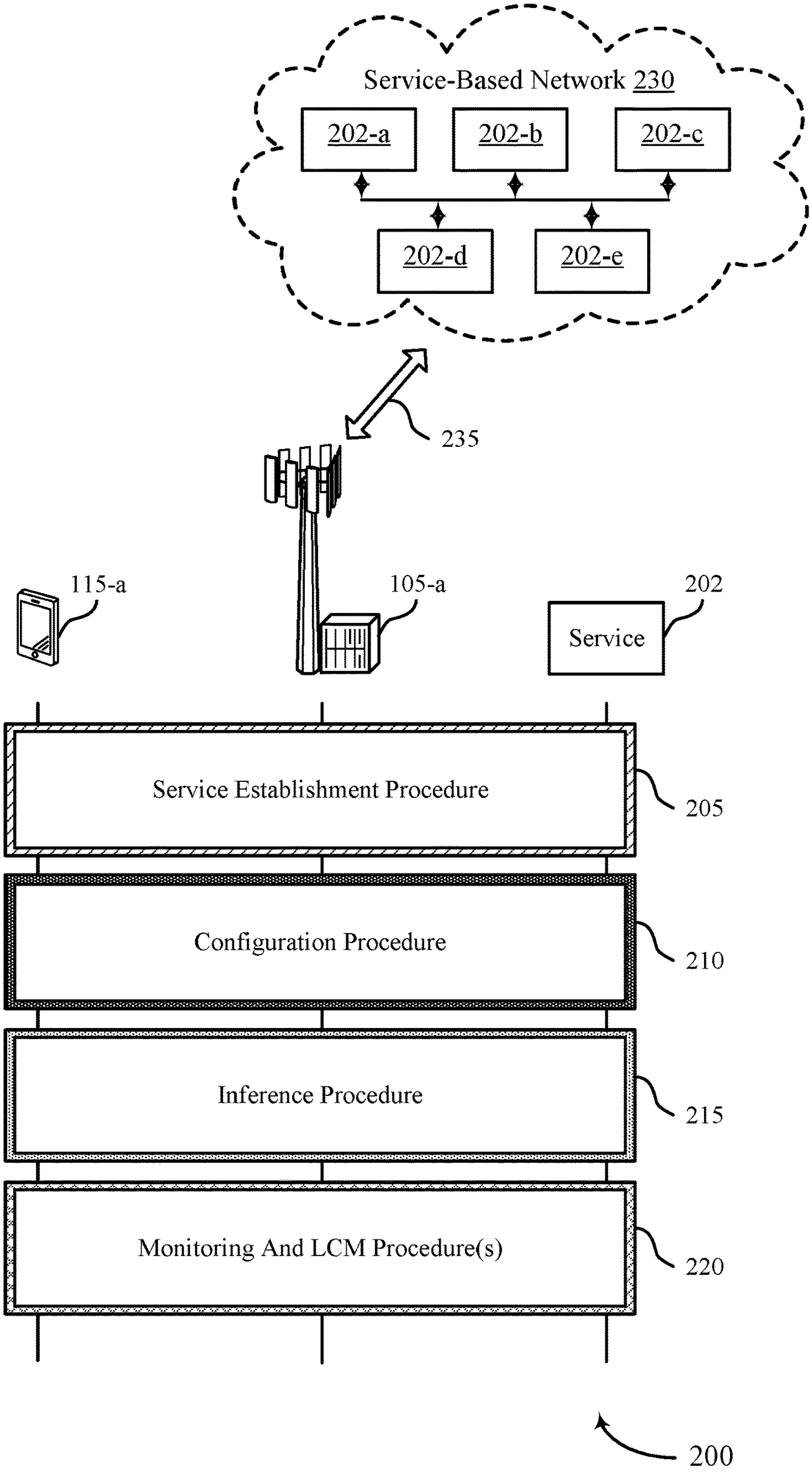
FIG. 2 shows an example of a wireless communications system 200 that supports techniques for non-transparent service establishment and inference monitoring in accordance with one or more aspects of the present disclosure.

FIG. 2 shows an example of a wireless communications system 200 that supports techniques for non-transparent inference monitoring in accordance with one or more aspects of the present disclosure. In some cases, the wireless communications system 200 may implement or be implemented by aspects of the wireless communications system 100. The wireless communications system 200 may include a UE 115-*a* and a network entity 105-*a*, which may be examples of the corresponding devices as described with respect to FIG. 1. In some cases, the UE 115-*a* may refer to one or more UEs 115. In some implementations, the network entity 105-*a* may refer to one or more network entities 105. In some implementations, the network entity 105-*a* may refer to a RAN of one or more network entities 105. For brevity, the network entity 105-*a* is discussed, but a RAN may also be used in its place.

The wireless communications system 200 also includes a service-based network 230. In some examples, the network entity 105-*a* may be configured to connect the UE 115-*a* to one or more services 202 (e.g., network services) of the service-based network 230. In particular, the network entity 105-*a* may be configured to relay communications between the UE 115-*a* and the one or more various services 202 of the service-based network 230 via one or more communication links 235 to enable the UE 115-*a* to establish and maintain wireless connections with the respective one or more services 202 in order to exchange communications associated with the various functionalities that are supported by the respective one or more services 202. In other words, the wireless communications system 200 may enable the UE 115-*a* to "subscribe" to the respective one or more services 202 on an à la carte basis depending on the needs or requirements of the UE 115-*a*. In this regard, different UEs 115 within the wireless communications system 200 may be able to subscribe to different subsets of one or more services 202 depending on the capabilities of the UEs 115, applications executed at the UEs 115, a mobility of the UEs 115, etc.

Each service 202 may be associated with a respective network address within the service-based network 230. Stated differently, each service 202 may be hosted at one or more components of a cloud-based network, where the components of each service 202 may be associated with a respective network address. The respective one or more services 202 may be provided by network providers, third-party entities, etc., where each service 202 is configured to support a respective service or functionality offered to the components of the wireless communications system 200 (e.g., UE 115-*a*, network entity 105-*a*).

Different services, functionalities, and functions that may be supported or offered by the respective services 202-*a* through 202-*e* may include, but are not limited to, a mobility service, a security service, a privacy service, a location service, etc. In other words, the service 202 may refer to any of one or more services (e.g., 202-*a*, 202-*b*, 202-*c*, 202-*d*, or 202-*e*) provided to the UE 115-*a*, the network entity 105-*a*, or both. In some implementations, the service 202 may be an AI, ML, or AI and ML service.

Some wireless communications systems may support non-transparent cross-node procedures. In some examples, non-transparent procedures may include procedures where the UE 115-*a* connects directly to a service 202 (e.g., a cross-node AI/ML service). In some examples, non-transparent cross-node procedures may include a service establishment procedure 205, a configuration procedure 210, an inference procedure 215, one or more monitoring and LCM procedures 220, or any combination thereof.

In some examples, the UE 115-*a* may discover an available service 202 in the service establishment procedure 205. Additionally, or alternatively, UE 115-*a* may establish a connection with the service 202 during the service establishment procedure 205. In some examples, the service establishment procedure 205 may include a capability exchange. The capability exchange is further discussed with reference to FIG. 3.

In some implementations, the service 202 may transmit configuration signaling to the UE 115-*a* during the configuration procedure 210. In some implementations, the configuration procedure 210 is a cross-node AI/ML configuration procedure. In some examples, the service 202 may transmit signaling to configure the UE 115-*a* for AI/ML procedures. In some examples, the service 202 may configure the UE 115-*a* and the network entity 105-*a* (e.g., to perform the configuration procedure). Additionally, or alternatively, the network entity 105-*a* may provide additional configuration signaling to the UE 115-*a*, the service 202, or both. For example, the network entity 105-*a* may provide lower layer configuration signaling. In some cases, the network entity 105-*a* may configure an interface for the UE 115-*a* (e.g., an air interface, Uu link, access link, etc.). For example, the network entity 105-*a* may transmit an indication of a configuration of the interface for the UE 115-*a* to perform the configuration procedure 210. The configuration procedure 210 is further discussed with reference to FIG. 6.

In some examples, the UE 115-*a* may input data to the service 202 during the inference procedure 215 (e.g., encoder output at the UE 115-*a*). In some implementations, the inference procedure 215 may be a cross-node AI/ML inference procedure. In some examples, the UE 115-*a* may input an inference result of an AI/ML model to the network entity 105-*a*. Additionally, or alternatively, the service 202 may input data to the UE 115-*a* (e.g., encoder output at the service 202). In some examples, the service 202 may output data during the inference procedure 215. For example, the service 202 may output data to the network entity 105-*a* (e.g., decoder output from the service 202). Additionally, or alternatively, the UE 115-*a* may output data the network entity 105-*a* (e.g., decoder output from the UE 115-*a*). The inference procedure 215 is further discussed with reference to FIGS. 7-9.

In some examples, the UE 115-*a*, network entity 105-*a*, service 202, or any combination thereof may monitor input signaling during the monitoring and LCM procedure(s) 220. In some examples, the LCM procedure may be based on the output of the monitoring by the UE 115-*a*, network entity 105-*a*, service 202, or any combination thereof. In some examples, the LCM procedure(s) may include activate, deactivate, fallback, switch, or reconfigure procedures. The monitoring and LCM procedure(s) 220 are further discussed with reference to FIGS. 10-12.

Figure 3:
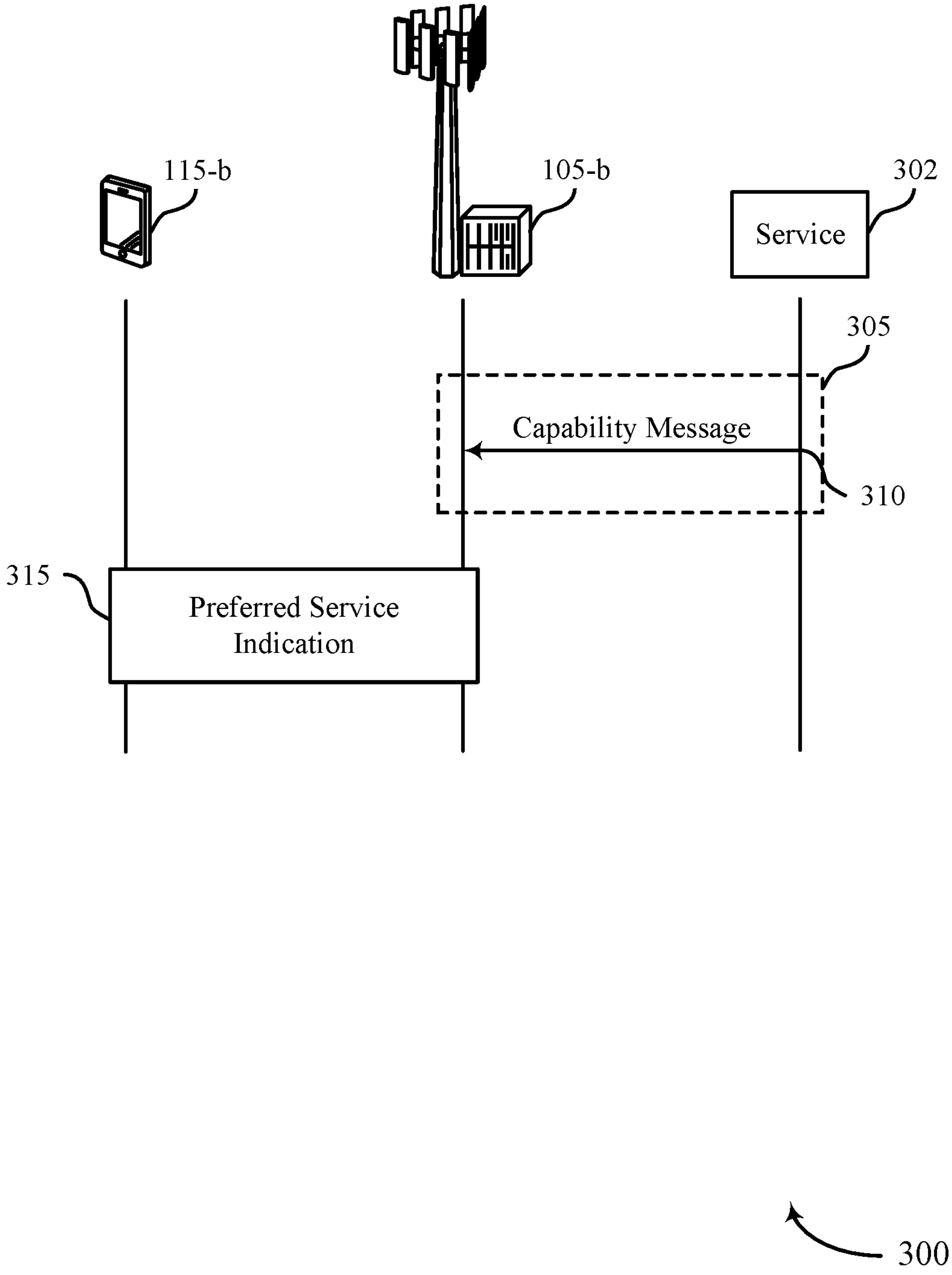
FIG. 3 shows an example of a process flow 300 that supports techniques for non-transparent service establishment and inference monitoring in accordance with one or more aspects of the present disclosure.

FIG. 3 shows an example of a process flow 300 in a system that supports techniques for non-transparent inference monitoring in accordance with one or more aspects of the present disclosure. The process flow 300 includes a UE 115-*b* and a network entity 105-*b*, which may be examples of the corresponding devices as described with respect to FIGS. 1 and 2. In some cases, the UE 115-*b* may refer to one or more UEs 115. In some implementations, the network entity 105-*b* may refer to one or more network entities 105. In some implementations, the network entity 105-*b* may refer to one or more RANs of one or more network entities 105. The process flow 300 also includes a service 302. The service 302 may refer to any service provided to the UE 115-*b*, the network entity 105-*b*, or both. In some implementations, the service 302 may be an AI, ML, or AI and ML service.

In the following description of the process flow 300, the operation between the UE 115-*b*, the network entity 105-*b*, and the service 302 may be transmitted in a different order shown. Some operations may also be omitted from the process flow 300, and other operations may be added to the process flow 300. Further, although some operations or signaling may be shown to occur at different times for discussion purposes, these operations may occur at the same time.

In some implementations, the process flow 300 may support RAN triggered service establishment. For example, the process flow 300 may support procedures for the network entity 105-*b* to indicate one or more preferred services, one or more functions of a service, or both. In some implementations, the service 302 may include one or more services. For example, while one service 302 is illustrated, a service capability exchange 305 may occur between multiple services (e.g., a subscription service or a service common to one or more UEs 115). In some examples, the service capability exchange 305 may occur between multiple services and the network entity 105-*b* concurrently.

At 305, the network entity 105-*b* and the service 302 may perform a service capability exchange 305. In the service capability exchange 305, the service 302 may indicate (e.g., advertise) service capability information to the network entity 105-*b*. For example, the service 302 may indicate a list of one or more supported functions of the service, a mapping of one or more RAN states and one or more functions of the service, an area configuration, or any combination thereof. In some examples, the service 302 may indicate the service capability information to the network entity 105-*b* via a capability message 310 as part of the service capability exchange 305. In some examples, the capability message 310 may be specific to the UE 115-*b*. In other examples, the capability message 310 may not be specific to the UE 115-*b* (e.g., for advertising a service capability).

In some examples, the service capability information may include a list of supported service functions per feature, feature group, or both. For example, the list of supported service functions may include one or more supported AI/ML models per function, feature, or feature group. In some implementations, the service 302, network entity 105-*b*, the UE 115-*b*, or any combination thereof may provide the AI/ML models. In some examples, the area configuration for the service 302 may be an area configuration for an AI/ML service, model, functions, or any combination thereof. For example, the area configuration may correspond to a public land mobile network (PLMN), a tracking area, or a RAN notification area associated with the network entity 105-*b*, or any combination thereof.

In some implementations, the network entity 105-*b* may transmit a preferred service indication 315 to the UE 115-*b*. In some examples, the network entity 105-*b* may transmit the preferred service indication 315 based on the service capability information. In some implementations, the preferred service indication 315 may include one or more preferred functions of the service 302. In some examples, the preferred service indication 315 may include one or more preferred services among multiple services 302. Additionally, or alternatively, the preferred service indication 315 may include one or more supported functions of the service 302 (e.g., one or more functions supported by the service, the network entity 105-*b*, or both), routing information, or both. In some cases, the network entity 105-*b* may indicate to the UE 115-*b* to perform service establishment with the service 302 in the network, for a service being offered by the network entity 105-*b*. In some cases, the routing information may be used for service establishment between the UE 115-*b* and the service 302.

In some examples, the network entity 105-*b* may transmit the preferred service indication 315 to the UE 115-*b* via dedicated signaling. Additionally, or alternatively, the network entity 105-*b* may transmit the preferred service indication 315 to the UE 115-*b* via system information (e.g., broadcast, unicast, on-demand, multicast, or the like). In some examples, the network entity 105-*b* may transmit the preferred service indication 315 to the UE 115-*b* over a control plane or a user plane.

In some examples, the preferred service indication 315 may be determined by the network entity 105-*b*. For example, the network entity 105-*b* may determine the preferred service indication 315 based on the state of the RAN, provided mapping of RAN states and functions from the service 302, or both. In some examples, the RAN state may be based on a codebook index, a multiple-input multiple-output (MIMO) scheme (e.g., MIMO rank), a location of the UE 115-*b* relative to the network entity 105-*b*, or the like. The network entity 105-*b* may determine the preferred service indication 315 based on one or more RAN states (e.g., the codebook index, the MIMO scheme, and the location of the UE 115-*b*). In some cases, the network entity 105-*b* determines the preferred service indication 315 based on all RAN states. In some implementations, the UE 115-*b*, network entity 105-*b*, and service 302 may perform a configuration procedure based on the preferred service indication 315, as further discussed with reference to FIG. 6.

Figure 4:
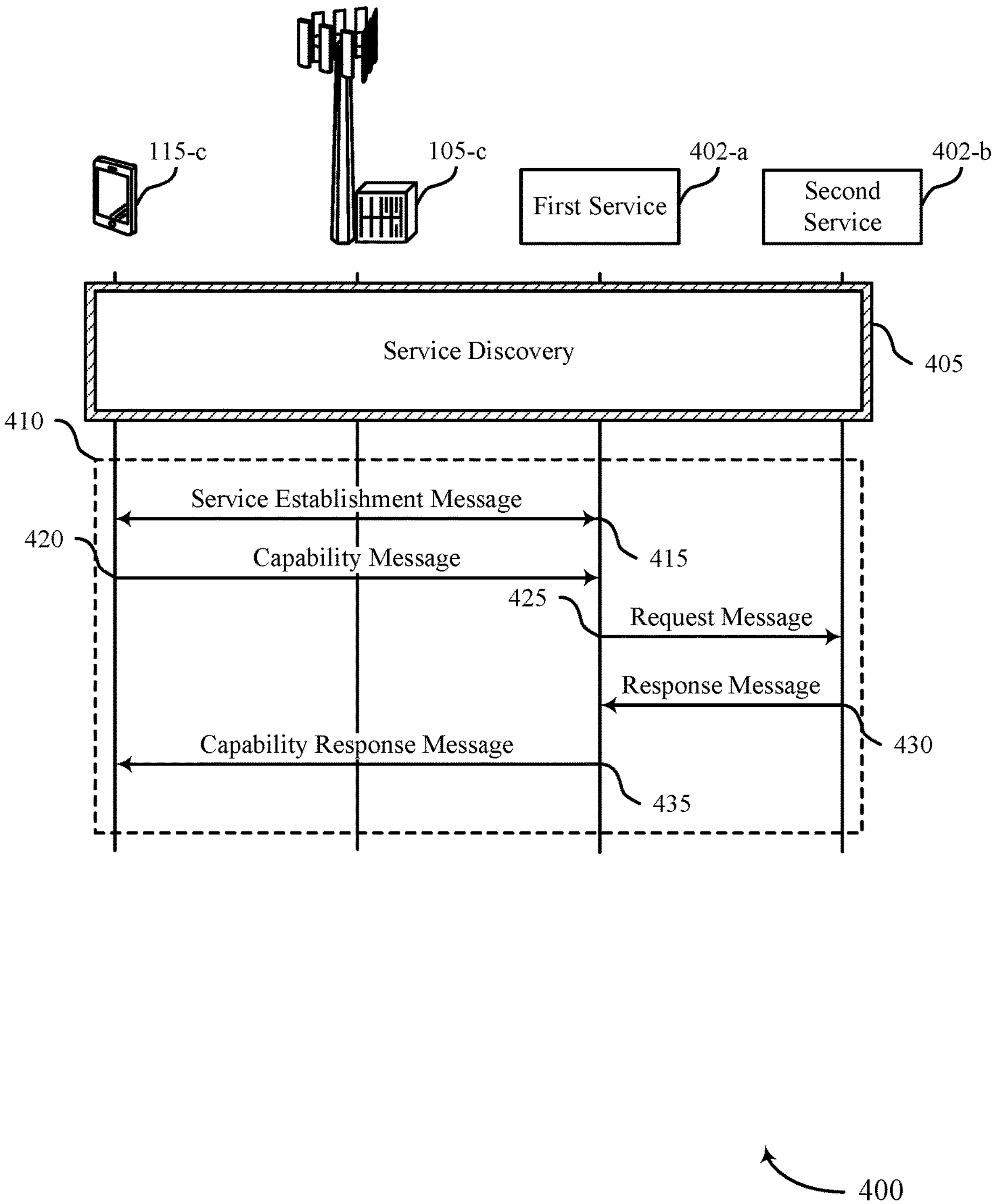
FIG. 4 shows an example of a process flow 400 that supports techniques for non-transparent service establishment and inference monitoring in accordance with one or more aspects of the present disclosure.

FIG. 4 shows an example of a process flow 400 in a system that supports techniques for non-transparent inference monitoring in accordance with one or more aspects of the present disclosure. The process flow 400 includes a UE 115-*c* and a network entity 105-*c*, which may be examples of the corresponding devices as described with respect to FIGS. 1 and 2. In some cases, the UE 115-*c* may refer to one or more UEs 115. In some implementations, the network entity 105-*c* may refer to one or more network entities 105. In some implementations, the network entity 105-*c* may refer to one or more RANs of one or more network entities 105. The process flow 400 also includes a service 402. The service 402 may refer to any service provided (e.g., provisioned) to the UE 115-*c*, the network entity 105-*c*, or both. In some implementations, the service 402 may be an AI/ML, non-AI/ML, or both per UE or RAN feature or feature groups.

In the following description of the process flow 400, the operation between the UE 115-*c*, the network entity 105-*c*, the first service 402-*a*, and the second service 402-*b* may be transmitted in a different order shown. Some operations may also be omitted from the process flow 400, and other operations may be added to the process flow 400. Further, although some operations or signaling may be shown to occur at different times for discussion purposes, these operations may occur at the same time.

In some implementations, the process flow 400 may support UE 115-triggered service establishment. For example, the process flow 400 may support procedures for the UE 115-*c* to discover and establish connections with one or more services 402. In some examples, the first service 402-*a* may refer to an AI/ML or non-AI/ML service. In some examples, the second service 402-*b* may refer to a subscription service. In some cases, the subscription service may contain the user subscriptions to an AI/ML or non-AI/ML, or both per UE feature or feature group. Subscription services is checked by the first service to determine whether user (UE) is allowed to access a AI/ML or non-AI/ML service for a UE feature or feature group.

At 405, a service discovery procedure may occur. In some examples, the UE 115-*c* may discover the first service 402-*a*, the second service 402-*b*, or more than the two services 402-*a* and 402-*b* implementing or supporting a same UE feature or feature group.

The UE 115-*c*, the first service 402-*a*, and the second service 402-*b* may perform a service capability exchange as part of a service establishment 410. In some examples, the UE 115-*c*, first service 402-*a*, and the second service 402-*b* may perform the service establishment 410 based on performing the service discovery 405. In some examples, the service establishment 410 may include a service establishment message 415.

The UE 115-*c* may establish a signaling, or control path, with the services via the service establishment message 415. The service establishment message 415 may include a service establishment request from the UE 115-*c* to the first service 402-*a*. The service message 415 may include a service establishment response from the first service 402-*a* to the UE 115-*c*. In some examples, the UE 115-*c* may establish a signaling and control path with multiple services to determine if the functions are supported by one or more services.

The UE 115-*c* may transmit a capability message 420 to the first service 402-*a* during the service establishment 410. In some examples, the capability message 420 may include UE 115 capability information. For example, the UE 115-*c* capability information may indicate whether the UE 115-*c* supports at least some AI/ML functions (e.g., support for native AI/ML functions). Additionally, or alternatively, the UE capability information may indicate whether the UE 115-*c* supports functions of the first service 402-*a*, or models per feature of the service, or feature groups of the service, or any combination thereof. Additionally, or alternatively, the capability message 420 may include an identifier (ID) of the UE 115-*c*. Additionally, or alternatively, the capability message request service to provide service capability information to the UE for service or function selection at the UE.

In some examples, the first service 402-*a* may transmit a request message 425 to the second service 402-*b*. In some implementations, the request message 425 may be a subscription request, where the first service 402-*a* transmits the UE 115-*c* ID to the second service 402-*b*. In some cases, the request message 425 may ask the second service 402-*b* whether the UE 115-*c* is a allowed to access service. Additionally, or alternatively, the request message 425 may ask the second service 402-*b* which functions, or models per feature, or feature groups the UE 115-*c* is allowed to access.

In some examples, the second service 402-*b* may transmit a response message 430 to the first service 402-*a*. In some cases, the response message 430 may include the ID of the UE 115-*c*, an indication whether the UE is allowed to access first service or functions implemented by the first service.

The UE 115-*c* may discover supported functions of the service via a capability response message 435. For example, the first service 402-*a* may provide AI/ML capabilities, non-AI/ML capabilities, or both to the UE 115-*c* via the capability response message 435. In some cases, the first service 402-*a* service may provide AI/ML or non-AI/ML, or both capabilities based on the UE 115-*c* indicating its capability information in the capability message 420. In some cases, the first service 402-*a* may provide AI/ML or non-AI/ML or both capabilities in the capability response message 435 based on the UE 115-*c* request in the capability message 420.

In some implementations, the capability response message 435 may include a rejection message to the UE 115-*c*, rejecting service to the UE 115-*c*. For example, the UE 115-*c* may not be allowed to access first service 402-*a* based on the user (UE) subscription check with second service 402-*b* by first service 402-*a*. In some implementations, the UE 115-*c* may decide which service functions to use based on the capability response message 435. In some implementations, the UE 115-*c*, network entity 105-*c*, and first service 402-*a* may perform a configuration procedure based on the service establishment 410, as further discussed with reference to FIG. 6.

Figure 5:
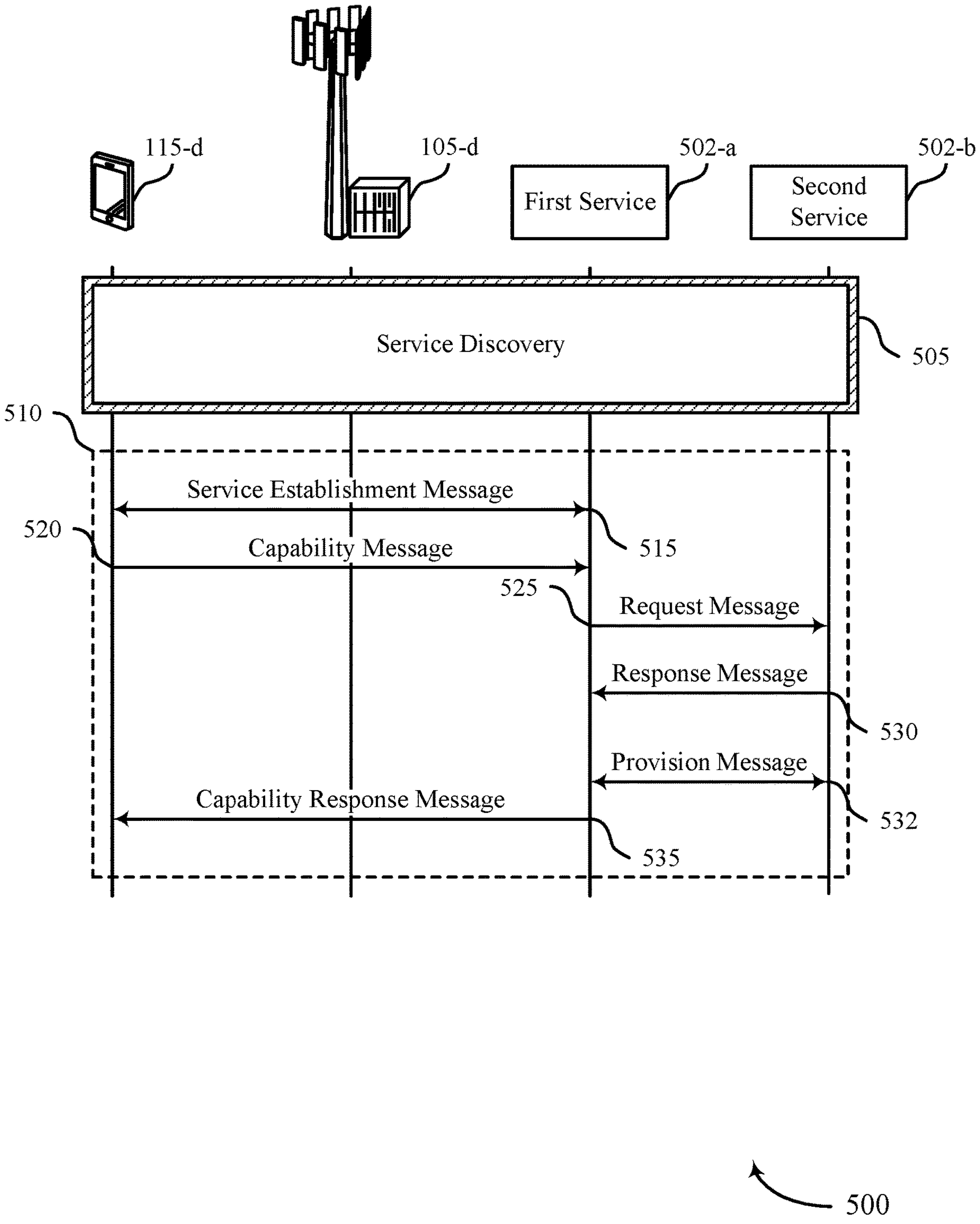
FIG. 5 shows an example of a process flow 500 that supports techniques for non-transparent service establishment and inference monitoring in accordance with one or more aspects of the present disclosure.

FIG. 5 shows an example of a process flow 500 in a system that supports techniques for non-transparent inference monitoring in accordance with one or more aspects of the present disclosure. The process flow 500 includes a UE 115-*d* and a network entity 105-*d*, which may be examples of the corresponding devices as described with respect to FIGS. 1 and 2. In some cases, the UE 115-*d* may refer to one or more UEs 115. In some implementations, the network entity 105-*d* may refer to one or more network entities 105. In some implementations, the network entity 105-*d* may refer to one or more RANs of one or more network entities 105. The process flow 500 also includes a service 502. The service 502 may refer to any service provided to the UE 115-*d*, the network entity 105-*d*, or both. In some implementations, the service 502 may be AI/ML, non-AI/ML, or both per UE or RAN feature or feature groups.

In the following description of the process flow 500, the operation between the UE 115-*d*, the network entity 105-*d*, the first service 502-*a*, and the second service 502-*b* may be transmitted in a different order shown. Some operations may also be omitted from the process flow 500, and other operations may be added to the process flow 500. Further, although some operations or signaling may be shown to occur at different times for discussion purposes, these operations may occur at the same time.

In some implementations, the process flow 500 may support UE triggered service establishment. For example, the process flow 500 may support procedures for the UE 115-*d* to access services from a first service 502-*a*. In some examples, the first service 502-*a* may be a service common to the UE 115-*d* and the network entity 105-*d*, a service common to the UE 115-*d* and one or more other UEs 115, a service common to the UE 115-*d* and one or more other network entities 105-*d*, or any combination thereof. In some examples, the second service 502-*b* may refer to a subscription service, as described with reference to the second service 402-*b* of FIG. 4.

At 505, a service discovery procedure may occur. In some examples, the UE 115-*d* may discover the first service 502-*a*. In some cases, the first service 402-*a* (e.g., may discover second service in the network implementing requested functions or supports services for requested UE or RAN feature or feature groups.

The UE 115-*d*, the first service 502-*a*, may perform a service capability exchange as part of a service establishment 510. In some examples, the UE 115-*d*, the first service 502-*a* may perform the service establishment 510 based on performing the service discovery 505. In some examples, the service establishment 510 may include a service establishment message 515.

The UE 115-*d* may establish a signaling, or control path, with the services via the service establishment message 515. The service establishment message 515 may include a service establishment request from the UE 115-*d* to the first service 502-*a*. The service establishment message 515 may include a service establishment response from the first service 502-*a* to the UE 115-*d*.

The UE 115-*d* may transmit a capability message 520 to the first service 502-*a* during the service establishment 510. In some examples, the capability message 520 may include UE capability information. For example, the UE 115-*d* capability information may indicate whether the UE 115-*d* supports at least some AI/ML functions (e.g., native AI/ML functions). Additionally, or alternatively, the UE capability information may indicate whether the UE 115-*d* supports functions of the first service 502-*a*, or models per feature of the service, or feature groups of the service, or any combination thereof. Additionally, or alternatively, the capability message 520 may include an ID of the UE 115-*d*. Additionally, or alternatively, the capability message request service to provide service capability information to the UE for service or function selection at the UE.

In some examples, the first service 502-*a* may work as an anchor point and transmit a request message 525 to the second service 502-*b*. The request message 525 may be used to discover AI/ML, or non-AI/ML or both functions supported at the second service 502-*b*. In some examples, the first service 502-*a* determines the service 502-*b* provisioned in the network that can be made available to the UE for supporting a UE feature or feature group during cross-node procedures. In some cases, the first service 502-*a* selects the second service 502-*b* for supporting a UE feature or feature group during cross-node procedures, it routes data from UE or RAN to the second service 502-*b*, and data, control or policies from service 502-*b* to RAN or UE.

In some examples, the second service 502-*b* may transmit a response message 530 to the first service 502-*a*. In some cases, the response message 530 may include the ID of the UE 115-*d*, an indication of functions supported by the second service 502-*b*, models per feature supported by the second service 502-*b*, feature groups of the second service 502-*b*, or any combination thereof. The first service 502-*a* and the second service 502 may communicate a provision message 532. The provision message 532 may determine a service for the first service 502-*a*. For example, the provision message 532 may determine the first service 502-*a* in a PLMN or a tracking area.

The UE 115-*d* may discover supported functions of the service via a capability response message 535. For example, the first service 502-*a* may provide AI/ML capabilities, non-AI/ML capabilities, or both to the UE 115-*d* via the capability response message 535. In some cases, the first service 502-*a* may provide AI/ML or non-AI/ML, or both capabilities based on the UE 115-*d* indicating its capability information in the capability message 520. In some cases, the first service 502-*a* may provide AI/ML or non-AI/ML or both capabilities in the capability response message 535 based on the UE 115-*d* request in the capability message 520.

Additionally, or alternatively, the first service 502-*a* may provide supported functions in the network. For example, the capability response message 535 may include supported functions within an area configuration including PLMN, a tracking area, a RAN notification area, or any combination thereof. In some examples, the first service 502-*a* may provide a service ID, both AI/ML and non-AI/ML capabilities (e.g., if the UE 115-*d* supports AI/ML), routing information, or any combination thereof. In some examples, the first service 502-*a* may work as an anchor point and route the expected data, control or policies to second service 502-*b* supporting expected function, if the first service 502-*a* does not supported requested function or feature.

Figure 6:
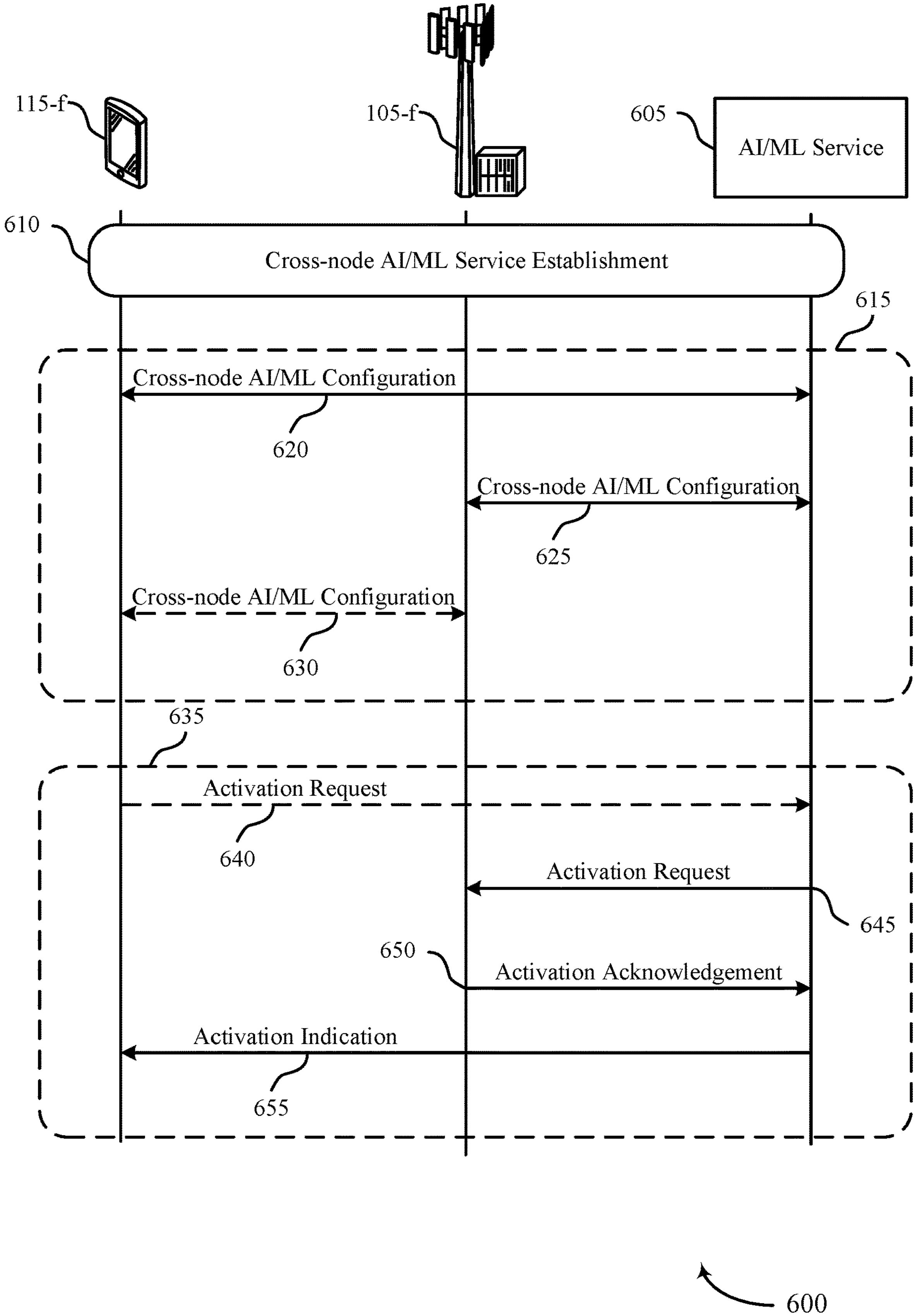
FIG. 6 shows an example of a process flow 600 that supports techniques for non-transparent service establishment and inference monitoring in accordance with one or more aspects of the present disclosure.

FIG. 6 shows an example of a process flow 600 that supports techniques for non-transparent inference monitoring after service establishment with AI/ML service in accordance with one or more aspects of the present disclosure. The process flow 600 includes a UE 115-*f* and a network entity of a RAN 105-*f*, which may be examples of the corresponding devices as described with respect to FIGS. 1 and 2. In some cases, the UE 115-*f* may refer to one or more UEs 115. The network entity of the RAN 105-*f* may refer to one or more network entities of the RAN 105-*f*. The process flow 600 also includes an AI or ML (AI/ML) Service 605. In some cases, the AI/ML Service 605 may run on one or more processors of a network node that is separate from the RAN 105-*f*. In some cases, the AI/ML Service 605 may run on one or more processors of the UE 115-*f* that is capable of performing one or more AI/ML functions. The UE 115-*f*, the network entity of the RAN 105-*f*, and the AI/ML Service 605, either individually or collectively, may perform a cross-node AI/ML Service Establishment procedure 610, which may correspond to the cross-node AI/ML Service Establishment procedure described with reference to FIGS. 4 and 5.

In the following description of the process flow 600, the operations between the UE 115-*f*, the network entity of the RAN 105-*f*, and the AI/ML Service 605 may be transmitted in a different order than the example order shown. Some operations may also be omitted from the process flow 600, and other operations may be added to the process flow 600. Further, although some operations or signaling may be shown to occur at different times for discussion purposes, these operations may actually occur at the same time.

At 615, the UE 115-*f*, the network entity of the RAN 105-*f*, and the AI/ML Service 605, either individually or collectively, may perform a cross-node AI/ML configuration procedure. The cross-node AI/ML configuration procedure may include transmitting one or more messages between the UE 115-*f*, the network entity of the RAN 105-*f*, the AI/ML Service 605, or any combination thereof. The one or more messages may include AI/ML configuration information. The AI/ML configuration information may include configuration information for AI/ML input and output data (e.g., triggers or periodicity of the input and output data). The AI/ML configuration information may also include monitoring configuration information (e.g., monitoring events, monitoring Key Performance Indicators (KPIs) configurations, monitoring reporting configurations, etc.).

At 620, the AI/ML Service 605 may transmit (e.g., provide) first AI/ML configuration information to the UE 115-*f* using (e.g., over) a Non-Access Stratum (NAS) transport protocol or over user-plane. At 625, the AI/ML Service 605 may similarly transmit second AI/ML configuration information to the network entity of the RAN 105-*f*. In some cases, the AI/ML Service 605 may transmit the first AI/ML configuration information and the second AI/ML configuration information separately to the UE 115-*f* using a NAS transport protocol, over user plane, or any combination thereof. Alternatively, the AI/ML Service 605 may transmit both the first AI/ML configuration information and the second AI/ML configuration to the network entity of the RAN 105-*f* using a control plane. For example, the AI/ML Service 605 may transmit the configuration information to the network entity of the RAN 105-*f* using a common public radio interface (CPRI), an enhanced CPRI (eCPRI), a stream control transmission protocol (SCTP), or any combination thereof.

At 630, the network entity of the RAN 105-*f* may transmit the first AI/ML configuration information (e.g., required lower layer configuration information) to the UE 115-*f* using a control plane. For example, if the network entity of the RAN 105-*f* obtained the first AI/ML configuration information from the AI/ML Service 605, the network entity of the RAN 105-*f* may transmit the first AI/ML configuration information to the UE 115-*f* over the control plane (e.g., a CPRI, an eCPRI, an SCTP, etc.).

At 635, the UE 115-*f*, the network entity of the RAN 105-*f*, and the AI/ML Service 605, either individually or collectively, may perform a cross-node AI/ML activation procedure. The cross-node AI/ML activation procedure may include transmitting one or more messages between the UE 115-*f*, the network entity of the RAN 105-*f*, the AI/ML Service 605, or any combination thereof.

At 640, the UE 115-*f* may request activation of one or more cross-node AI/ML inference functions or one or more AI/ML models. In some cases, the UE 115-*f* may transmit an activation request to the AI/ML Service 605 using NAS or UP. The UE 115-*f* may also request activation of one or more functions of a service.

In some examples, the AI/ML Service 605 may activate the one or more cross-node AI/ML inference functions based on RAN state information. For example, at 645, the AI/ML Service 605 may transmit an activation request to the network entity of the RAN 105-*f*. The activation request may include an ID of the UE 115-*f*, one or more AI/ML inference functions for activation, or both. At 650, the AI/ML Service 605 may receive an activation acknowledgement from the network entity of the RAN 105-*f*. The activation acknowledgement may include the ID of the UE 115-*f*, an indication whether a service, one or more AI/ML inference functions, or both, are being activated. In some cases, the AI/ML Service 605 may receive the RAN state information as part of the activation acknowledgement or as part of another message. In some examples, the AI/ML Service 605 may activate the one or more cross-node AI/ML inference functions after receiving the RAN state information (e.g., after checking the RAN state supports the service being activated, the one or more functions being activated, or both).

At 655, the AI/ML Service 605 may transmit an activation indication to the UE 115-*f*. For example, the activation indication may indicate that the AI/ML Service 605 activated the one or more cross-node AI/ML inference functions, the one or more AI/ML models, or both.

Figure 7:
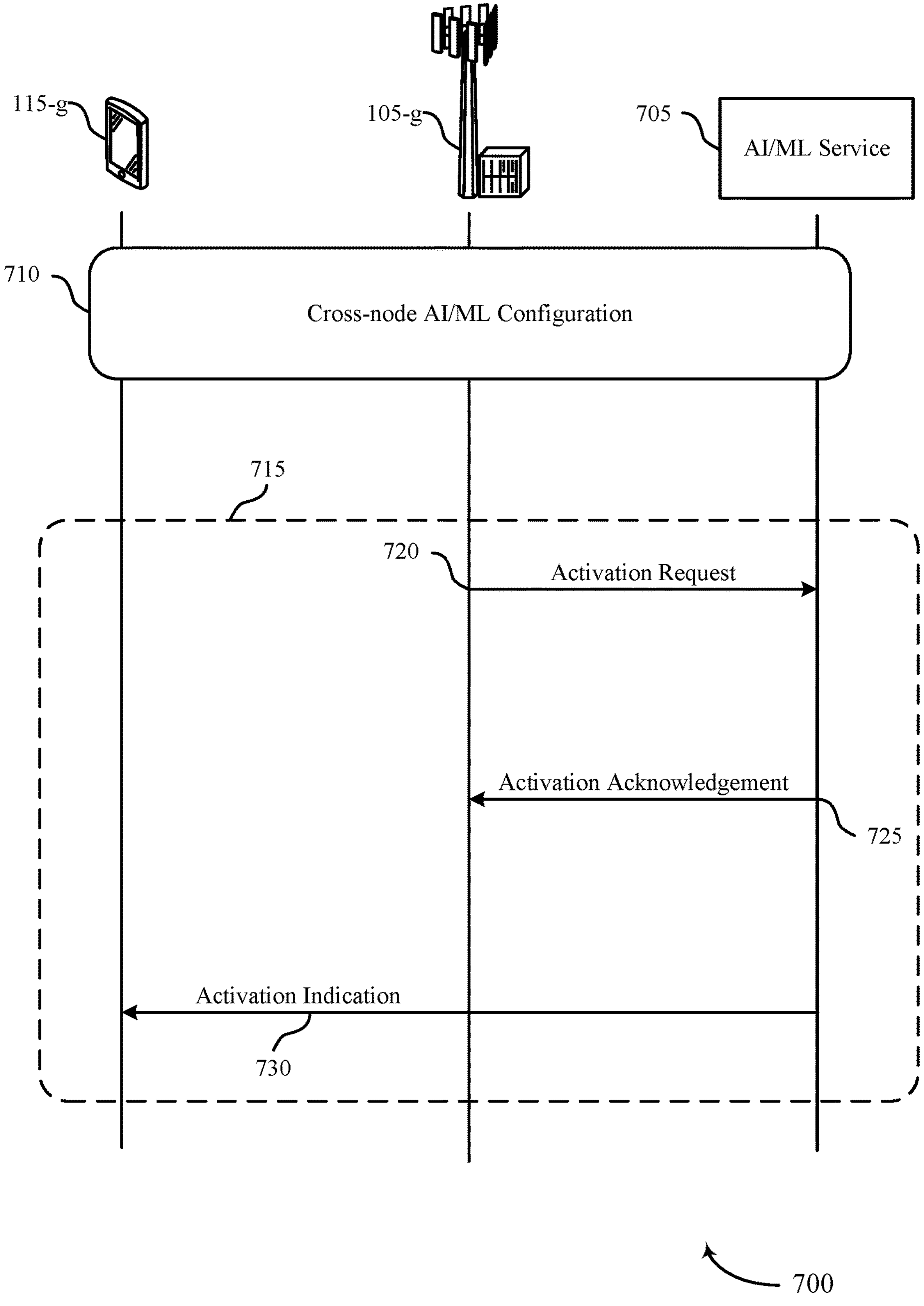
FIG. 7 shows an example of a process flow 700 that supports techniques for non-transparent service establishment and inference monitoring in accordance with one or more aspects of the present disclosure.

FIG. 7 shows an example of a process flow 700 that supports techniques for non-transparent inference monitoring in accordance with one or more aspects of the present disclosure. The process flow 700 includes a UE 115-*g* and a network entity of a RAN 105-*g*, which may be examples of the corresponding devices as described with respect to FIGS. 1 and 2. In some cases, the UE 115-*g* may refer to one or more UEs 115. The network entity of the RAN 105-*g* may refer to one or more network entities of the RAN 105-*g*. The process flow 700 also includes an AI/ML Service 705. The UE 115-*g*, the network entity of the RAN 105-*g*, and the AI/ML Service 705, either individually or collectively, may perform a cross-node AI/ML configuration procedure 710, which may correspond to the cross-node AI/ML configuration procedure described with reference to FIG. 6.

In the following description of the process flow 700, the operations between the UE 115-*g*, the network entity of the RAN 105-*g*, and the AI/ML Service 705 may be transmitted in a different order than the example order shown. Some operations may also be omitted from the process flow 700, and other operations may be added to the process flow 700. Further, although some operations or signaling may be shown to occur at different times for discussion purposes, these operations may actually occur at the same time.

At 715, the UE 115-*g*, the network entity of the RAN 105-*g*, and the AI/ML Service 705, either individually or collectively, may perform a cross-node AI/ML Service activation procedure. The cross-node AI/ML activation procedure may include transmitting one or more messages between the UE 115-*g*, the network entity of the RAN 105-*g*, the AI/ML Service 705, or any combination thereof.

At 720, the network entity of the RAN 105-*g* may request activation of a cross-node AI/ML inference. For example, the network entity of the RAN 105-*g* may transmit an activation request to the AI/ML Service 705. The activation request may include an indication for the AI/ML Service to activate a configured AI/ML operation based on RAN state information, and an ID of the UE 115-*g*. In some cases, the network entity of the RAN 105-*g* may transmit the activation request based on the RAN state information. In some examples, the network entity of the RAN 105-*g* may optionally transmit, to the AI/ML Service 705, a list of one or more functions that the UE 115-*g* may activate. The network entity of the RAN 105-*g* may also transmit, with the list of one or more functions, a request for the UE to activate at least a subset of the one or more functions.

At 725, the AI/ML Service 705 may transmit an activation acknowledgement to the network entity of the RAN 105-*g*. The activation acknowledgement may contain information indicating that the AI/ML Service 705 received the activation request, the list of one or more functions, the ID of the UE 115-*g*, or any combination thereof. At 730, the AI/ML Service 705 may also transmit an activation indication to the UE 115-*g*. The activation indication may include information similar to the information included in the activation acknowledgement. The activation indication may also include an indication that the AI/ML Service activated the cross-node AI/ML inference, the list of one or more functions, the request for the UE to activate the at least subset of the one or more functions, or any combination thereof.

Figure 8:
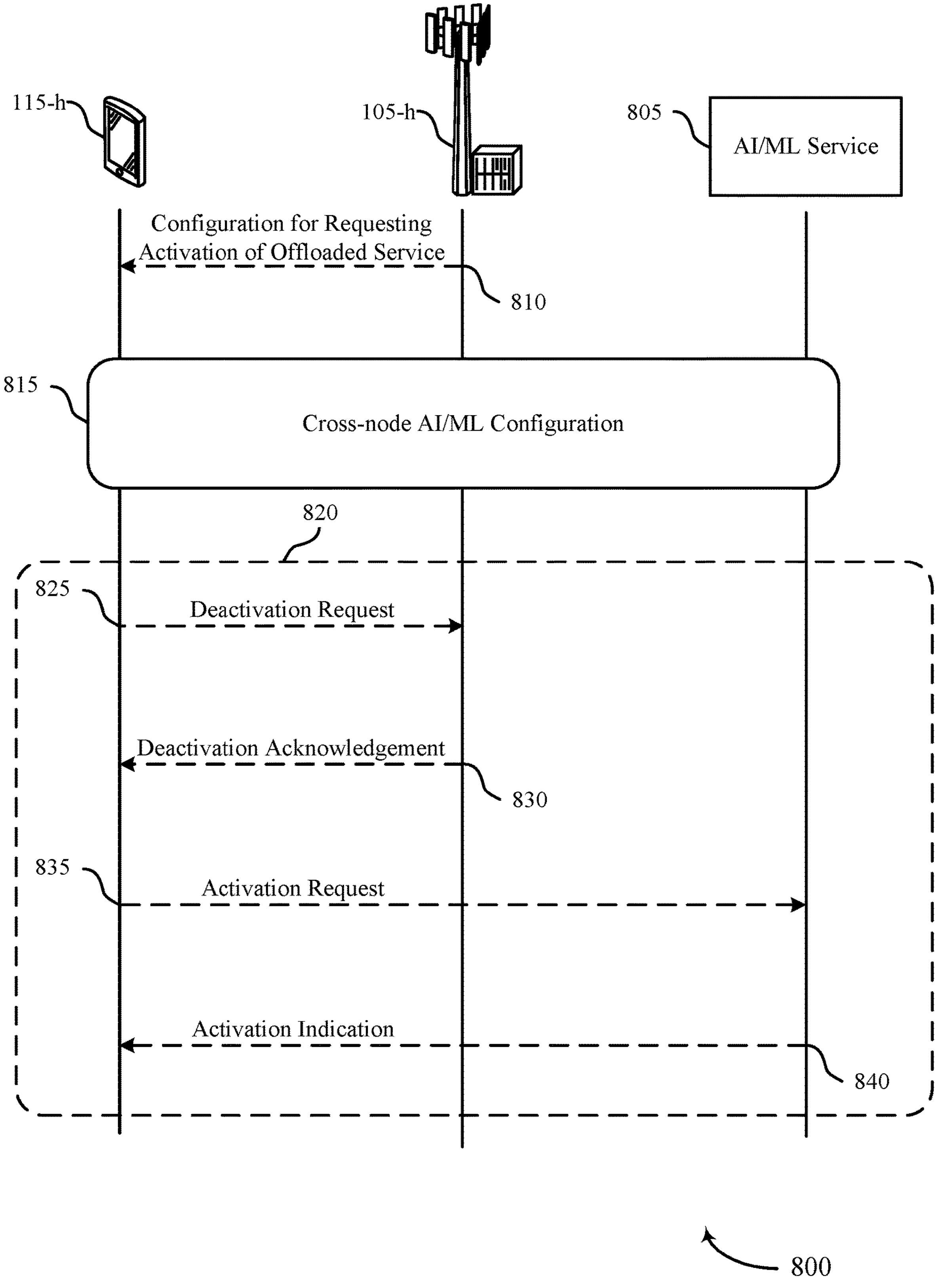
FIG. 8 shows an example of a process flow 800 that supports techniques for non-transparent service establishment and inference monitoring in accordance with one or more aspects of the present disclosure.

FIG. 8 shows an example of a process flow 800 that supports techniques for non-transparent inference monitoring in accordance with one or more aspects of the present disclosure. The process flow 800 includes a UE 115-*h* and a network entity of a RAN 105-*h*, which may be examples of the corresponding devices as described with respect to FIGS. 1 and 2. In some cases, the UE 115-*h* may refer to one or more UEs 115. The network entity of the RAN 105-*h* may refer to one or more network entities of the RAN 105-*h*. The process flow 800 also includes an AI/ML Service 805. The UE 115-*h*, the network entity of the RAN 105-*h*, and the AI/ML Service 805, either individually or collectively, may perform a cross-node AI/ML configuration procedure 815, which may correspond to the cross-node AI/ML configuration procedure described with reference to FIG. 6.

In the following description of the process flow 800, the operations between the UE 115-*h*, the network entity of the RAN 105-*h*, and the AI/ML Service 805 may be transmitted in a different order than the example order shown. Some operations may also be omitted from the process flow 800, and other operations may be added to the process flow 800. Further, although some operations or signaling may be shown to occur at different times for discussion purposes, these operations may actually occur at the same time. The process flow 800 may provide a procedure for a UE to request offloading of services (after end-to-end configuration).

At 810, the network entity of the RAN 105-*h* may transmit a message including configuration information for requesting activation of offloaded service. For example, the configuration information may indicate a cross-node AI/ML activation procedure, a cross-node AI/ML offload service procedure, or both.

At 820, the UE 115-*h*, the network entity of the RAN 105-*h*, and the AI/ML Service 805, either individually or collectively, may perform the indicated cross-node AI/ML activation procedure, the cross-node AI/ML offload service procedure, or both. The configuration information may also indicate a configuration for the UE 115-*h* to transmit UE assistance information to the network entity of the RAN 105-*h* after the cross-node AI/ML configuration procedure 815 (e.g., after an end-to end configuration of services offloaded by the network entity of the RAN 105-*h*).

At 825, the UE 115-*h* may transmit a deactivation request to the network entity of the RAN 105-*h* (e.g., after the cross-node AI/ML configuration 815). The deactivation request may include a request for the network entity of the RAN 105-*h* to offload one or more services, one or more functions, or both, to the AI/ML Service 805. In some cases, the deactivation request may include an indication of the one or more services, the one or more functions, or both. That is, the network entity of the RAN 105-*h* may receive the deactivation request and offload the one or more services, the one or more functions, or both, such that the AI/ML Service 805 may provide or perform at least a subset of the one or more services, the one or more functions, or both.

At 830, the network entity of the RAN 105-*h* may transmit a deactivation acknowledgement to the UE 115-*h* after receiving the deactivation request. The deactivation acknowledgement may include an indication of the one or more services, the one or more functions, or both, that the network entity of the RAN 105-*h* may offload to the AI/ML Service 805.

At 835, the UE 115-*h* may transmit an activation request to the AI/ML Service 805 after receiving the deactivation acknowledgement. The activation request may include an indication of the one or more services, the one or more functions, or both, which the network entity of the RAN 105-*h* may offload to the AI/ML Service 805.

At 840, the AI/ML Service 805 may transmit an activation indication to the UE 115-*h*. In some cases, the activation indication may indicate the at least subset of the one or more services, the one or more functions, or both, that the AI/ML Service 805 may perform. The activation indication may also indicate that the AI/ML Service has activated the at least subset of the one or more services, the one or more functions, or both.

Figure 9:
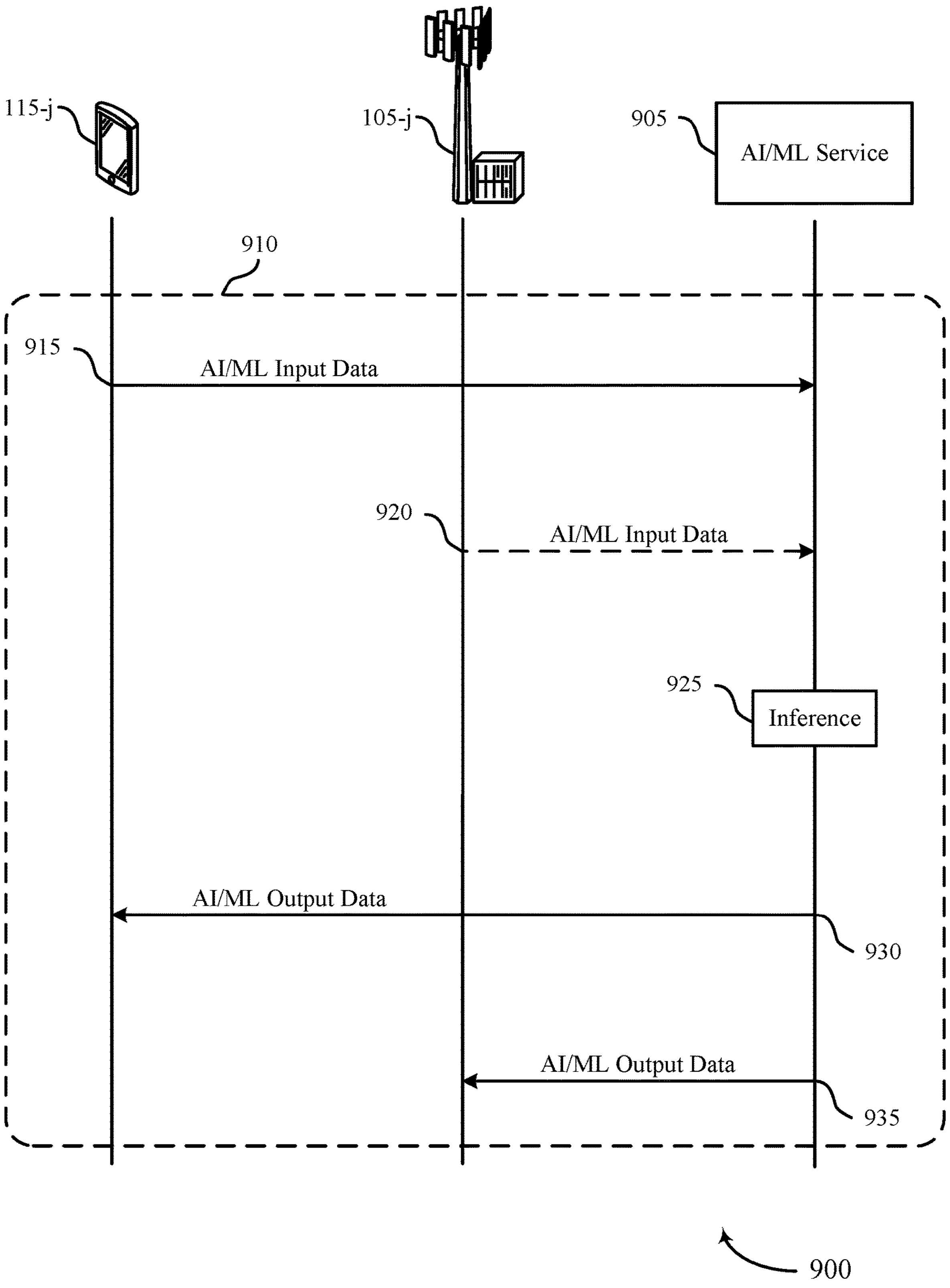
FIG. 9 shows an example of a process flow 900 that supports techniques for non-transparent service establishment and inference monitoring in accordance with one or more aspects of the present disclosure.

FIG. 9 shows an example of a process flow 900 that supports techniques for non-transparent inference monitoring in accordance with one or more aspects of the present disclosure. The process flow 900 includes a UE 115-*j* and a network entity of a RAN 105-*j*, which may be examples of the corresponding devices as described with respect to FIGS. 1 and 2. In some cases, the UE 115-*j* may refer to one or more UEs 115. The network entity of the RAN 105-*j* may refer to one or more network entities of the RAN 105-*j*. The process flow 900 also includes an AI/ML Service 905. The UE 115-*j*, the network entity of the RAN 105-*j*, and the AI/ML Service 905, either individually or collectively, may perform a cross-node AI/ML Service Establishment procedure before the operations in the following description, which may correspond to the cross-node AI/ML Service Establishment procedure described with reference to FIGS. 4 and 5.

In the following description of the process flow 900, the operations between the UE 115-*j*, the network entity of the RAN 105-*j*, and the AI/ML Service 905 may be transmitted in a different order than the example order shown. Some operations may also be omitted from the process flow 900, and other operations may be added to the process flow 900. Further, although some operations or signaling may be shown to occur at different times for discussion purposes, these operations may actually occur at the same time. The process flow may provide a procedure for AI/ML input output data flow between the UE and the AI/ML service, and the AI/ML Service and the RAN.

At 910, the UE 115-*j*, the network entity of the RAN 105-*j*, and the AI/ML Service 905, either individually or collectively, may perform a cross-node AI/ML Inference Procedure. The cross-node AI/ML Inference Procedure may include transmitting one or more messages between the UE 115-*j*, the network entity of the RAN 105-*j*, the AI/ML Service 905, or any combination thereof. The one or more messages may include AI/ML input or output data.

At 915, the UE 115-*j* may transmit first AI/ML input data (e.g., a UE's model inference result) to the AI/ML Service 905 via a first channel between the UE 115-*j* and the AI/ML Service 905. For example, the first AI/ML input data may include one or more inputs to at least one AI/ML Service side model (e.g., input to one or more decoder models) which the AI/ML Service may use. At 920, the network entity of the RAN 105-*j* may optionally transmit second AI/ML input data to the AI/ML Service 905. Similarly, the second AI/ML input data may include one or more inputs to a second set of AI/ML Service side models which may include the at least one AI/ML Service side model.

At 925, the AI/ML Service 905 may perform an inference procedure. The inference procedure may be based on the at least one AI/ML Service side model. For example, the inference procedure may be an example of an AI/ML Service side model inference procedure. In some cases, the inference procedure may also be based on the first AI/ML input data, the second AI/ML input data, or both. The AI/ML Service 905 may generate or produce one or more sets of AI/ML output data based on the inference procedure. The one or more sets of AI/ML output data may include first AI/ML output data and second AI/ML output data.

In some cases, the AI/ML Service 905 may perform the inference procedure using a service which may require a bounded response time (e.g., to meet latency requirements). In such cases, the AI/ML Service 905 may identify which cross-node AI/ML features that it can deploy (e.g., the latency requirements may limit whether at least some cross-node AI/ML features can be deployed as a separate service).

At 930, the AI/ML Service 905 may transmit the first AI/ML output data to the UE 115-*j*. In some cases (e.g., depending on use case requirements), the first output data may include positioning data, feedback information, or both, associated with the inference procedure or model of the AI/ML Service 905. Similarly, at 935, the AI/ML Service 905 may transmit the second AI/ML output data to the network entity of the RAN 105-*j* (e.g., via a third channel between the AI/ML Service 905 and the network entity of the RAN 105-*j*). In some cases, the second AI/ML output data may include decoded channel state information (CSI). In some examples, the AI/ML Service 905 may transmit the first output data and the second output data to both the UE 115-*j* and the network entity of the RAN 105-*j*.

Figure 10:
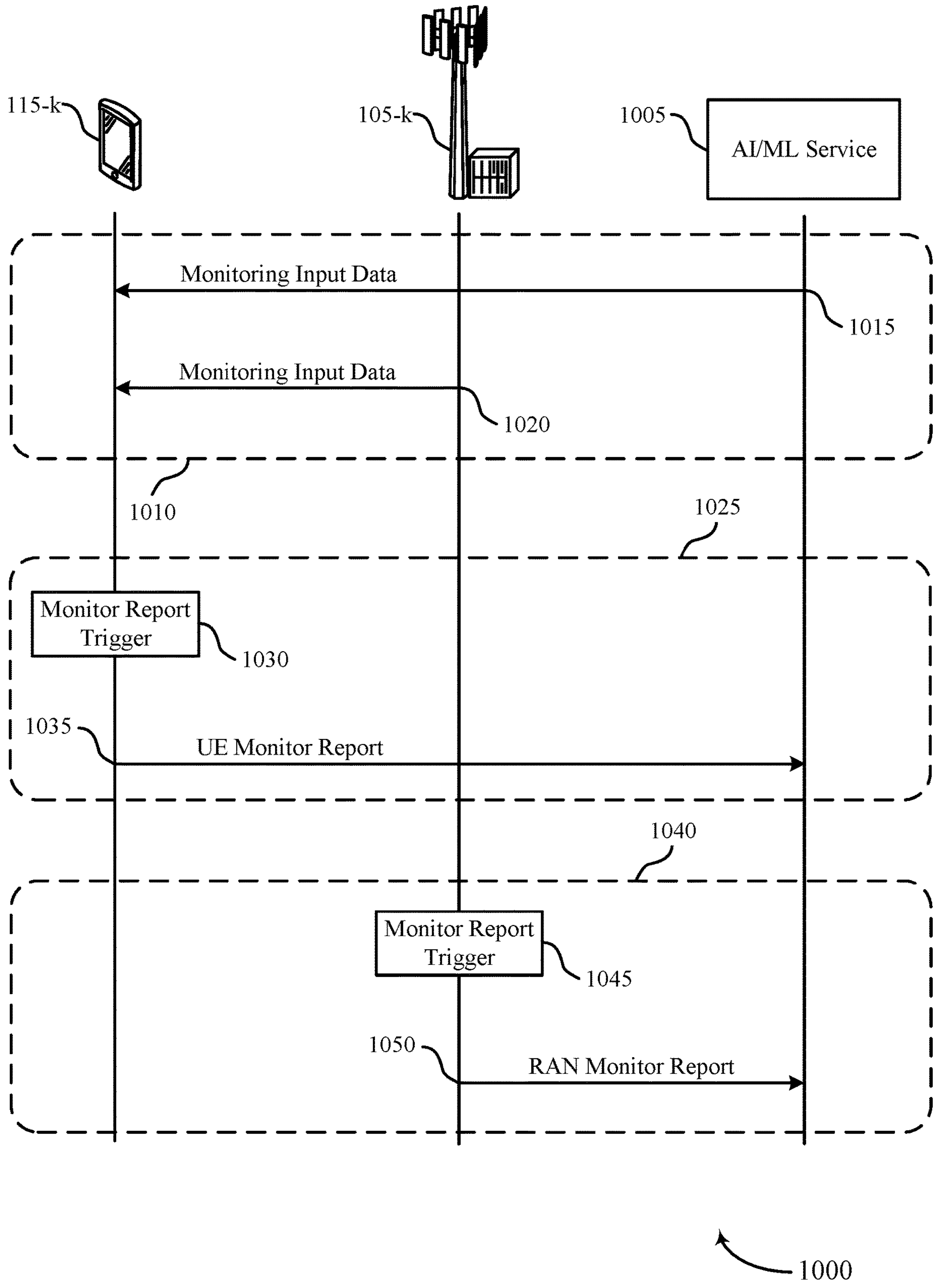
FIG. 10 shows an example of a process flow 1000 that supports techniques for non-transparent service establishment and inference monitoring in accordance with one or more aspects of the present disclosure.

FIG. 10 shows an example of a process flow 1000 that supports techniques for non-transparent inference monitoring in accordance with one or more aspects of the present disclosure. The process flow 1000 includes a UE 115-*k* and a network entity of a RAN 105-*k*, which may be examples of the corresponding devices as described with respect to FIGS. 1 and 2. In some cases, the UE 115-*k* may refer to one or more UEs 115. The network entity of the RAN 105-*k* may refer to one or more network entities of the RAN 105-*k*. The process flow 1000 also includes an AI/ML Service 1005. The UE 115-*k*, the network entity of the RAN 105-*k*, and the AI/ML Service 1005, either individually or collectively, may perform a procedure similar to the cross-node AI/ML Inference procedure described with reference to FIG. 9, before or during the operations in the following description.

In the following description of the process flow 1000, the operations between the UE 115-*k*, the network entity of the RAN 105-*k*, and the AI/ML Service 1005 may be transmitted in a different order than the example order shown. Some operations may also be omitted from the process flow 1000, and other operations may be added to the process flow 1000. Further, although some operations or signaling may be shown to occur at different times for discussion purposes, these operations may actually occur at the same time. The process flow may provide a procedure for a UE, a RAN, or both, to monitor and provide monitoring report to AI/ML Service for LCM At 1010, the UE 115-*k* may receive one or more sets of monitoring input data via a first channel between the UE 115-*k* and the AI/ML Service 1005 that is configured to communicate with the UE 115-*k* and a network entity of the RAN 105-*k*. For example, at 1015, the UE 115-*k* may receive first monitoring input data from the AI/ML Service 1005 either directly or indirectly (e.g., via the network entity of the RAN 105-*k*, other UEs 115, or both). The first monitoring input data may include information or a configuration for evaluating feedback KPIs, model switching conditions (e.g., conditions associated with switching AI/ML models), AI/ML Service output sample(s), or any combination thereof.

In some cases, the network entity of the RAN 105-*k* may receive second monitoring input data via a third channel between the network entity of the RAN 105-*k* and the AI/ML Service 1005 that is configured to communicate with the network entity of the RAN 105-*k* and the UE 115-*k* (e.g., from the AI/ML Service 1005).

Similarly, at 1020, the UE 115-*k* may receive the second monitoring input data via a second channel between the UE 115-*k* and the network entity of the RAN 105-*k* that is configured to communicate with the UE 115-*k* and the AI/ML Service 1005. For example, the network entity of the RAN 105-*k* may relay the second monitoring input data to the UE 115-*k*. In some cases, the network entity of the RAN 105-*k* may transmit the second monitoring input data to the UE 115-*k* without receiving the second monitoring input data from the AI/ML Service 1005 (e.g., the network entity of the RAN 105-*k* may generate or calculate the second monitoring input data independently of the AI/ML Service 1005). The second monitoring input data may include information or a configuration for monitoring model switching conditions. In some cases, the UE 115-*k* may use the one or more sets of monitoring input data to evaluate AI/ML Service KPIs (e.g., to track inference performance with respect to ground truth information). For example, the UE 115-*k* may use the one or more sets of monitoring input data to evaluate Minimum Mean Square Error (MMSE) thresholds compared to ground truth information, inference latency data, network loading information, uplink or downlink throughput information, packet loss data, radio link failure (RLF) rate information, or any combination thereof, associated with a first inference or model of the AI/ML Service 1005.

In some implementations, the AI/ML Service 1005 may transmit AI/ML configuration information to the UE 115-*k*, the network entity of the RAN 105-*k*, or any combination thereof. In some cases, the AI/ML Service 1005 may transmit the AI/ML configuration information in a same transmission as the monitoring input data or in a separate transmission. The AI/ML configuration may include a list of one or more performance KPIs to monitor and report, monitoring events (e.g., one or more thresholds, UE environment, configuration changes for the UE 115-*k* or the network entity of the RAN 105-*k*, etc.), reporting configurations (e.g., reporting event information, period information, etc.), or any combination thereof.

At 1025, the UE 115-*k* may perform a UE monitoring report procedure. At 1030, the UE 115-*k* may detect or initiate a monitoring report trigger. In some cases, the monitoring report trigger may include an indication that the UE 115-*k* received the first monitoring input data, the second monitoring input data, or any combination thereof. The monitoring report trigger may also include an indication that the UE 115-*k* has met configured monitoring or reporting conditions.

At 1035, the UE 115-*k* may transmit a UE monitoring report via the first channel between the UE 115-*k* and the AI/ML Service 1005 based on the monitoring input data provided by the AI/ML Service 1005, the second monitoring input data provided by the network entity of the RAN 105-*k*, a reporting configuration of the UE 115-*k*, or any combination thereof. The monitoring report may include first feedback information associated with the first inference or model of the AI/ML Service 1005, such as one or more feedback KPIs. In some cases, the UE 115-*k* may receive control signaling indicating the reporting configuration of the UE 115-*k* from the AI/ML Service 1005. In such cases, the UE 115-*k* may transmit the UE monitoring report based on the control signaling.

The UE monitoring report may include an indication of second feedback information including one or more feedback KPIs (e.g., AI/ML Service KPIs, system KPIs, or both). The UE 115-*k* may compute the system KPIs based on the monitoring input data, the AI/ML configuration information, or any combination thereof. In some cases, the UE 115-*k* or the AI/ML Service 1005 may use the system KPIs to track overall system performance (e.g., when the AI/ML Service 1005 is in operation). The system KPIs may include information indicating MMSE thresholds compared to ground truth information, inference latency data, network loading information, uplink or downlink throughput information, packet loss data, radio link failure, RLF, rate information, or any combination thereof. In some cases, the UE monitoring report may also include feedback KPIs with event-based feedback, periodic feedback (e.g., with a configured periodicity), or any combination thereof. The event-based feedback may be based on configured events such as a performance KPI exceeding or failing to exceed a threshold. In some cases, the UE 115-*k* may transmit the UE monitoring report based on the monitoring input data satisfying one or more event-based trigger conditions (e.g., detecting or initiating the monitor report trigger) associated with the reporting configuration of the UE 115-*k*.

In some cases, the UE 115-*k* may communicate one or more messages with the network entity of the RAN 105-*k* via the second channel using a second inference or model of the AI/ML Service 1005 in accordance with the UE monitoring report. In some implementations, the UE 115-*k* may communicate the one or more messages with the network entity of the RAN based on one or more communication parameters. The one or more communication parameters may be based on the second inference or model of the AI or ML service. For example, the second inference or model may output the one or more communication parameters (e.g., frequency, amplitude, time-frequency resources, and so on) based on network characteristics, a RAN state, or other similar parameters. In some cases, the second inference or model of the AI/ML Service 1005 may be based on the second feedback information associated with the second monitoring input data provided by the network entity. In some examples, the second inference or model of the AI/ML Service 1005 may be an example of the first inference or model of the AI/ML Service 1005.

At 1040, the network entity of the RAN 105-*k* may similarly perform a RAN monitoring report procedure. For example, at 1045, the network entity of the RAN 105-*k* may detect or initiate a monitoring report trigger. In some cases, the monitoring report trigger may include an indication that the network entity transmitted the second monitoring input data to the UE 115-*k*. The monitoring report trigger may also include an indication that the network entity of the RAN 105-*k* has met configured monitoring or reporting conditions.

At 1050, the network entity of the RAN 105-*k* may transmit a RAN monitoring report via the third channel between the network entity and the AI/ML Service 1005 based at least in part on the monitoring input data provided by the AI/ML Service 1005 and a reporting configuration of the network entity. In some cases, the network entity of the RAN 105-*k* may receive control signaling (e.g., via the third channel) from the AI/ML Service 1005 which indicates the reporting configuration of the network entity. In such cases, the network entity of the RAN 105-*k* may transmit the RAN monitoring report based at least in part on the control signaling. The RAN monitoring report may include an indication of one or more feedback KPIs associated with the first inference or model of the AI/ML Service 1005. The network entity of the RAN 105-*k* may transmit the RAN monitoring report based on the second monitoring input data.

The RAN monitoring report may include AI/ML Service KPIs, system KPIs, or both. In some examples, the network entity of the RAN 105-*k* may compute the system KPIs. In some cases, the network entity of the RAN 105-*k* or the AI/ML Service 1005 may use the system KPIs to track overall system performance (e.g., when the AI/ML Service 1005 is in operation). The system KPIs may include information indicating network loading, uplink and downlink throughput, delay, packet loss, RLF rates, or any combination thereof. In some cases, the RAN monitoring report may also include feedback KPIs with event-based feedback, periodic feedback (e.g., with a configured periodicity), or any combination thereof. The event-based feedback may be based on configured events such as a performance KPI exceeding or failing to exceed a threshold.

In some examples, the UE monitoring report or the RAN monitoring report may trigger AI/ML inference or model switching or deactivation, when performance of an AI/ML inference or model degrades below a threshold (e.g., based on the UE or RAN monitoring report or network monitoring), or when there is a change in model usage scenario. For example, the change in model usage scenario may include a settings change (e.g., number of antennas, carriers in use), location or environment changes (e.g., indoor vs. outdoor), service changes, (e.g., changes in network slice, quality of service (QOS) flow, session), or any combination thereof. In some cases, the RAN monitoring report may indicate that the performance of an AI/ML inference or model is below a threshold. In some cases, the RAN monitoring report may trigger a switch from the first inference or model of the AI/ML Service 1005 to the second inference or model of the AI/ML Service 1005. For example, the RAN monitoring report may trigger the switch when the feedback information indicates that a performance of the first inference or model is below a threshold.

Figure 11:
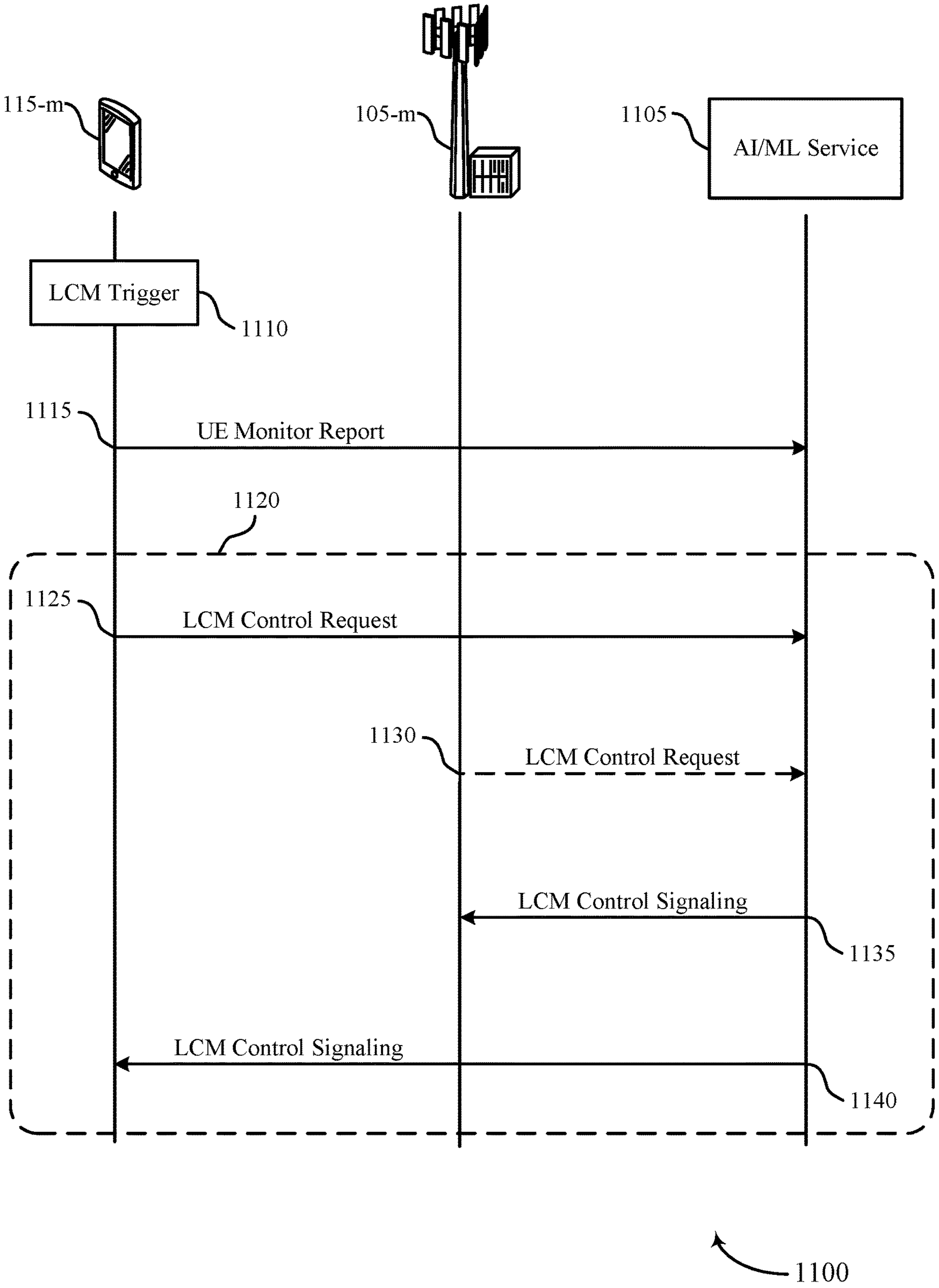
FIG. 11 shows an example of a process flow 1100 that supports techniques for non-transparent service establishment and inference monitoring in accordance with one or more aspects of the present disclosure.

FIG. 11 shows an example of a process flow 1100 that supports techniques for non-transparent inference monitoring in accordance with one or more aspects of the present disclosure. The process flow 1100 includes a UE 115-*m* and a network entity of a RAN 105-*m*, which may be examples of the corresponding devices as described with respect to FIGS. 1 and 2. In some cases, the UE 115-*m* may refer to one or more UEs 115. The network entity of the RAN 105-*m* may refer to one or more network entities of the RAN 105-*m*. The process flow 1100 also includes an AI/ML Service 1105. The UE 115-*m*, the network entity of the RAN 105-*m*, and the AI/ML Service 1105, either individually or collectively, may perform a procedure similar to the cross-node AI/ML Inference procedure described with reference to FIG. 9, before or during the operations in the following description. Additionally or alternatively, the UE 115-*m*, the network entity of the RAN 105-*m*, or both, may perform one or more monitoring report procedures described with reference to FIG. 10, before or during the operations in the following description.

In the following description of the process flow 1100, the operations between the UE 115-*m*, the network entity of the RAN 105-*m*, and the AI/ML Service 1105 may be transmitted in a different order than the example order shown. Some operations may also be omitted from the process flow 1100, and other operations may be added to the process flow 1100. Further, although some operations or signaling may be shown to occur at different times for discussion purposes, these operations may actually occur at the same time. The process flow 1100 may provide a procedure for a UE to request or indicate lifecycle management, LCM, signaling based on UE monitoring report.

At 1110, the UE 115-*m* may detect or initiate a lifecycle management (LCM) trigger. In some cases, the UE 115-*m* may perform one or more LCM procedures (e.g., operations) associated with a first inference or model of the AI/ML Service 1105 in response to the LCM trigger. For example, the UE 115-*m* may perform the one or more LCM procedures and transmit an LCM indication to the AI/ML Service 1105, indicating that the UE 115-*m* performed the one or more LCM procedures. In some cases, the UE 115-*m* may transmit an LCM request to the AI/ML Service 1105, such that the AI/ML Service 1105 may perform the one or more LCM procedures.

At 1115, the UE 115-*m*, the network entity of the RAN 105-*m*, or both may additionally transmit one or more monitoring reports to the AI/ML Service 1105. The one or more monitoring reports may include feedback KPIs as with other monitoring reports described herein. The AI/ML Service 1105 may receive the one or more monitoring reports in accordance with one or more periodic reporting criteria associated with a reporting configuration of the UE or the network entity.

At 1120, the UE 115-*m*, the network entity of the RAN 105-*m*, and the AI/ML Service 1105, either individually or collectively, may perform an LCM Control Signaling procedure. For example, the LCM control signaling procedure may include transmission and reception of one or more control indications, requests, or signals associated with LCM operations.

For example, at 1125, the UE 115-*m* may transmit a first LCM control request message (e.g., an indication) to the AI/ML Service 1105. The first LCM control request message may include a request for the AI/ML Service 1105 to activate, deactivate, switch, revert, fallback, reconfigure, or any combination thereof, one or more services, functions, models, or procedures. Additionally or alternatively, the first LCM control request message may include a configuration request. The configuration request may include a request to configure or reconfigure procedures. For example, the configuration request may include a request for the AI/ML Service 1130 to switch from AI/ML based procedures to non-AI/ML based procedures or from non-AI/ML based procedures to AI/ML based procedures.

Similarly, at 1130, the network entity of the RAN 105-*m* may optionally transmit a second LCM control request message (e.g., an indication) to the AI/ML Service 1105. The second LCM control request message may include a request for the AI/ML Service 1105 to activate, deactivate, switch, revert, fallback, reconfigure, or any combination thereof, one or more services, functions, models, or procedures. Additionally or alternatively, the second LCM control request message may include a configuration request. The configuration request may include a request to configure or reconfigure procedures. For example, the configuration request may include a request for the AI/ML Service 1130 to switch from AI/ML based procedures to non-AI/ML based procedures or from non-AI/ML based procedures to AI/ML based procedures.

At 1135, the AI/ML Service 1105 may transmit first LCM control signaling to the network entity of the RAN 105-*m* (e.g., via a third channel between the network entity of the network entity of the RAN 105-*m* and the AI/ML Service 1105). In some cases, the AI/ML Service 1105 may transmit the first LCM control signaling based on (e.g., in response to) the LCM control request message or monitoring input data received from the UE 115-*m*. The first LCM control signaling may include a request or an indication for the network entity of the RAN 105-*m* to update, activate, deactivate, switch, revert, fallback, reconfigure, or any combination thereof, one or more services, functions, or procedures. Additionally or alternatively, the first LCM control signaling may include a configuration request. The configuration request may include a request to configure or reconfigure procedures. For example, the configuration request may include a request for the network entity of the RAN 105-*m* to switch from AI/ML based procedures to non-AI/ML based procedures or from non-AI/ML based procedures to AI/ML based procedures.

Similarly, at 1140, the AI/ML Service 1105 may transmit second LCM control signaling to the UE 115-*m* (e.g., via a first channel between the UE 115-*m* and the AI/ML Service 1105). In some cases, the AI/ML Service 1105 may transmit the second LCM control signaling based on (e.g., in response to) the LCM control request message or the monitoring input data received from the UE 115-*m*. The second LCM control signaling may include a request or an indication for the UE 115-*m* to update, activate, deactivate, switch, revert, fallback, reconfigure, or any combination thereof, one or more services, functions, models, or procedures. Additionally or alternatively, the second LCM control signaling may include a configuration request. The configuration request may include a request to configure or reconfigure procedures. For example, the configuration request may include a request for the UE 115-*m* to switch from AI/ML based procedures to non-AI/ML based procedures or from non-AI/ML based procedures to AI/ML based procedures.

Figure 12:
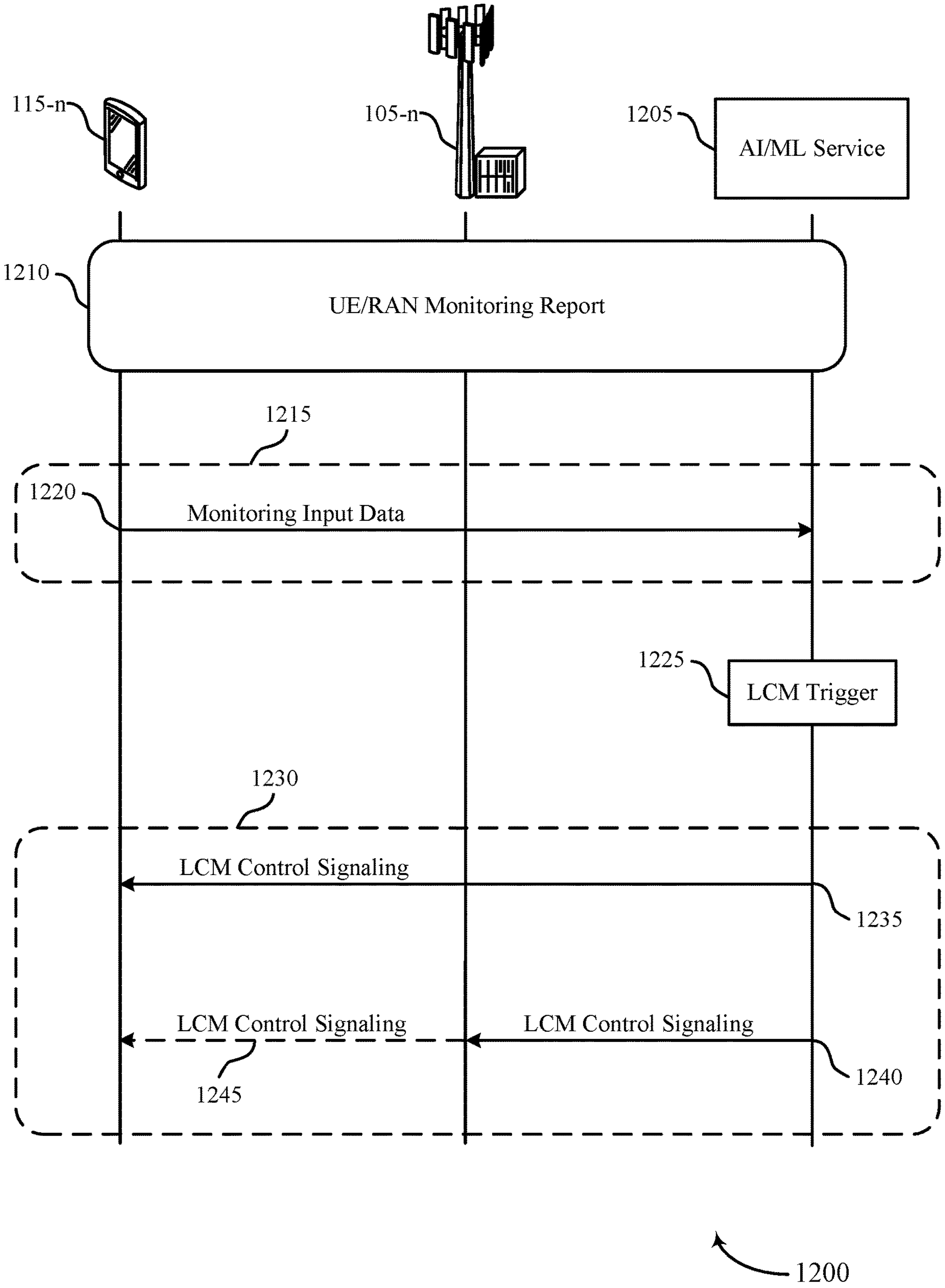
FIG. 12 shows an example of a process flow 1200 that supports techniques for non-transparent service establishment and inference monitoring in accordance with one or more aspects of the present disclosure.

FIG. 12 shows an example of a process flow 1200 that supports techniques for non-transparent inference monitoring in accordance with one or more aspects of the present disclosure. The process flow 1200 includes a UE 115-*n* and a network entity of the RAN 105-*n*, which may be examples of the corresponding devices as described with respect to FIGS. 1 and 2. In some cases, the UE 115-*n* may refer to one or more UEs 115. The network entity of the RAN 105-*n* may refer to one or more network entities of the RAN 105-*n*. The process flow 1200 also includes an AI/ML Service 1205. The UE 115-*n*, the network entity of the RAN 105-*n*, and the AI/ML Service 1205, either individually or collectively, may perform a procedure similar to the cross-node AI/ML Inference procedure described with reference to FIG. 9, before or during the operations in the following description. Additionally or alternatively, at 1210, the UE 115-*n*, the network entity of the RAN 105-*n*, or both, may perform one or more monitoring report procedures described with reference to FIG. 10, before or during the operations in the following description. For example, the UE 115-*n*, the network entity of the RAN 105-*n*, or both, may transmit one or more monitoring reports to the AI/ML Service 1205.

In the following description of the process flow 1200, the operations between the UE 115-*n*, the network entity of the RAN 105-*n*, and the AI/ML Service 1205 may be transmitted in a different order than the example order shown. Some operations may also be omitted from the process flow 1200, and other operations may be added to the process flow 1200. Further, although some operations or signaling may be shown to occur at different times for discussion purposes, these operations may actually occur at the same time. The process flow 1200 may provide a procedure for LCM control by service based on UE/RAN monitoring report or monitoring at AI/ML service.

At 1215, the UE 115-*n*, the AI/ML Service 1205, or both, may perform performance monitoring. For example, at 1220, the UE 115-*n* may transmit monitoring input data (e.g., ground truth information for evaluating feedback KPIs at the AI/ML Service 1205) to the AI/ML Service 1205.

At 1225, the AI/ML Service 1205 may detect or initiate an LCM trigger. In some cases, the LCM trigger may be based on the AI/ML Service 1205 receiving the monitoring input data. In some cases, the AI/ML Service 1205 may perform one or more LCM procedures associated with a first inference or model of the AI/ML Service 1105 in response to the LCM trigger. The AI/ML Service 1205 may perform the one or more LCM procedures in accordance with at least one of the one or more monitoring reports (e.g., received from the UE 115-*n*, from the network entity of the RAN 105-*m*, or both, as described herein). In some cases, the AI/ML Service 1205 may evaluate AI/ML Service KPIs (e.g., perform an LCM procedure) based on the one or more monitoring reports. In some examples, the AI/ML Service 1205 may evaluate AI/ML Service KPIs based on the monitoring input data received from the UE 115-*n*.

At 1230, the AI/ML Service 1205 may perform LCM control signaling, which may include transmitting one or more control signaling messages to the UE 115-*n*, the network entity of the RAN 105-*n*, or both. The AI/ML Service 1205 may perform the LCM control signaling based on AI/ML Service KPIs received in the monitoring input data from the UE 115-*n*. In some cases, the AI/ML Service may obtain the AI/ML Service KPIs from another source (e.g., via another wireless device in the network entity of the RAN 105-*n*). The AI/ML Service 1205 may also perform the LCM control signaling or the one or more LCM procedures based on the one or more monitoring reports from the UE 115-*n* or the network entity of the RAN 105-*n*, or both.

At 1235, the AI/ML Service 1205 may transmit first LCM control signaling to the UE 115-*n*. In some cases, the AI/ML Service 1205 may transmit the first LCM control signaling based on (e.g., in response to) the LCM control request message received from the UE 115-*m*. The first LCM control signaling may include a request or an indication for the UE 115-*m* to activate, deactivate, switch, revert, fallback, reconfigure, or any combination thereof, one or more services, functions, or procedures. Additionally or alternatively, the first LCM control signaling may include a configuration request. The configuration request may include a request to configure or reconfigure. For example, the configuration request may include a request for the UE 115-*m* to switch from AI/ML based procedures to non-AI/ML based procedures or from non-AI/ML based procedures to AI/ML based procedures.

At 1240, the AI/ML Service 1205 may transmit second LCM control signaling to the network entity of the RAN 105-*n*. In some cases, the AI/ML Service 1205 may transmit the second LCM control signaling based on (e.g., in response to) the LCM control request message received from the network entity of the RAN 105-*n*. The second LCM control signaling may include a request or an indication for the network entity of the RAN 105-*n* to activate, deactivate, switch, revert, fallback, reconfigure, or any combination thereof, one or more services, functions, or procedures. Additionally or alternatively, the second LCM control signaling may include a configuration request. The configuration request may include a request to configure or reconfigure procedures. For example, the configuration request may include a request for the network entity of the RAN 105-*n* to switch from AI/ML based procedures to non-AI/ML based procedures or from non-AI/ML based procedures to AI/ML based procedures.

At 1245, the network entity of the RAN 105-*n* may transmit third LCM control signaling to the UE 115-*n*. In some cases, the third LCM control signaling may correspond to or may include information similar to the second LCM control signaling. In some cases, the network entity of the RAN 105-*n* may relay information from the second LCM control signaling to the UE 115-*n* (e.g., as part of the third LCM control signaling) based on receiving the second LCM control signaling.

Figure 13:
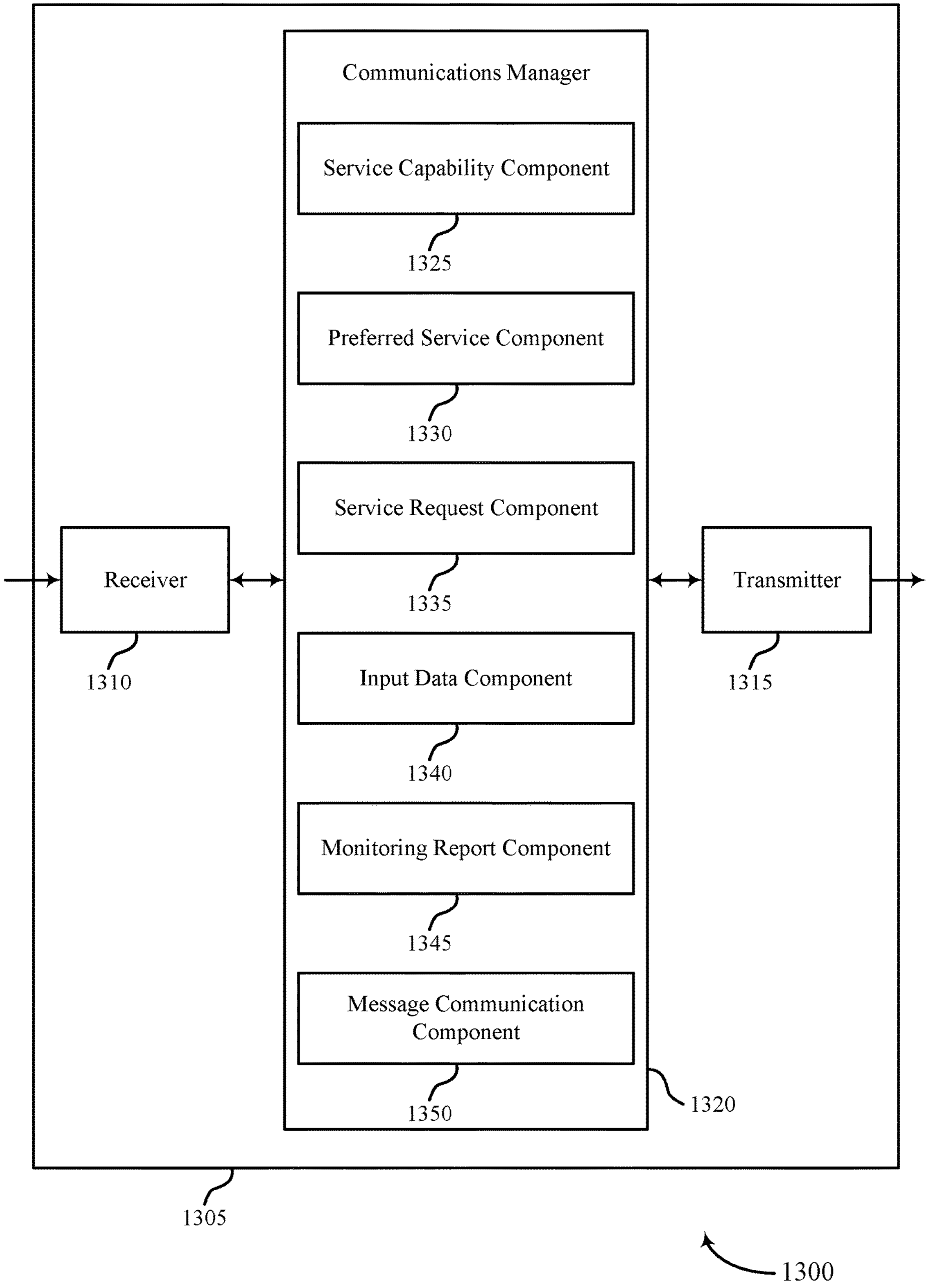
FIG. 13 shows a block diagram of an apparatus that supports techniques for non-transparent service establishment and inference monitoring in accordance with one or more aspects of the present disclosure.

FIG. 13 shows a block diagram 1300 of a device 1305 that supports techniques for non-transparent inference monitoring in accordance with one or more aspects of the present disclosure. The device 1305 may include a receiver 1310, a transmitter 1315, and a communications manager 1320. The device 1305, or one of more components of the device 1305 (e.g., the receiver 1310, the transmitter 1315, and the communications manager 1320), may include at least one processor, which may be coupled with at least one memory, to support the described techniques. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for non-transparent inference monitoring). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for non-transparent inference monitoring). In some examples, the transmitter 1315 may be co-located with a receiver 1310 in a transceiver module. The transmitter 1315 may utilize a single antenna or a set of multiple antennas.

For example, the communications manager 1320 may include a service capability component 1325, a preferred service component 1330, a service request component 1335, an input data component 1340, a monitoring report component 1345, a message communication component 1350, or any combination thereof. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication in accordance with examples disclosed herein. The service capability component 1325 is capable of, configured to, or operable to support a means for identifying service capability information associated with a set of multiple services and a set of multiple associated functions supported by a service that is configured to communicate with the UE and a network entity of a RAN. The preferred service component 1330 is capable of, configured to, or operable to support a means for receiving, from the network entity, a preferred service message indicating a subset of the set of multiple services available to the UE or the set of multiple associated functions that are available to the UE and preferred by the network entity. The service request component 1335 is capable of, configured to, or operable to support a means for transmitting, to the service, a request to activate or use at least one preferred service of the subset of the set of multiple services or at least one preferred associated function of the subset of the set of multiple associated functions available to the UE for communications between the UE and the network entity in accordance with the preferred service message.

Additionally, or alternatively, the communications manager 1320 may support wireless communication in accordance with other examples disclosed herein. The input data component 1340 is capable of, configured to, or operable to support a means for receiving monitoring input data from an AI or ML service that is configured to communicate with the UE and a network entity of a RAN. The monitoring report component 1345 is capable of, configured to, or operable to support a means for transmitting a monitoring report to the AI or ML service based on the monitoring input data provided by the AI or ML service and a reporting configuration of the UE, the monitoring report including feedback information associated with a first inference or model of the AI or ML service. The message communication component 1350 is capable of, configured to, or operable to support a means for communicating one or more messages with the network entity of the RAN using a second inference or model of the AI or ML service in accordance with the monitoring report provided by the UE.

Figure 14:
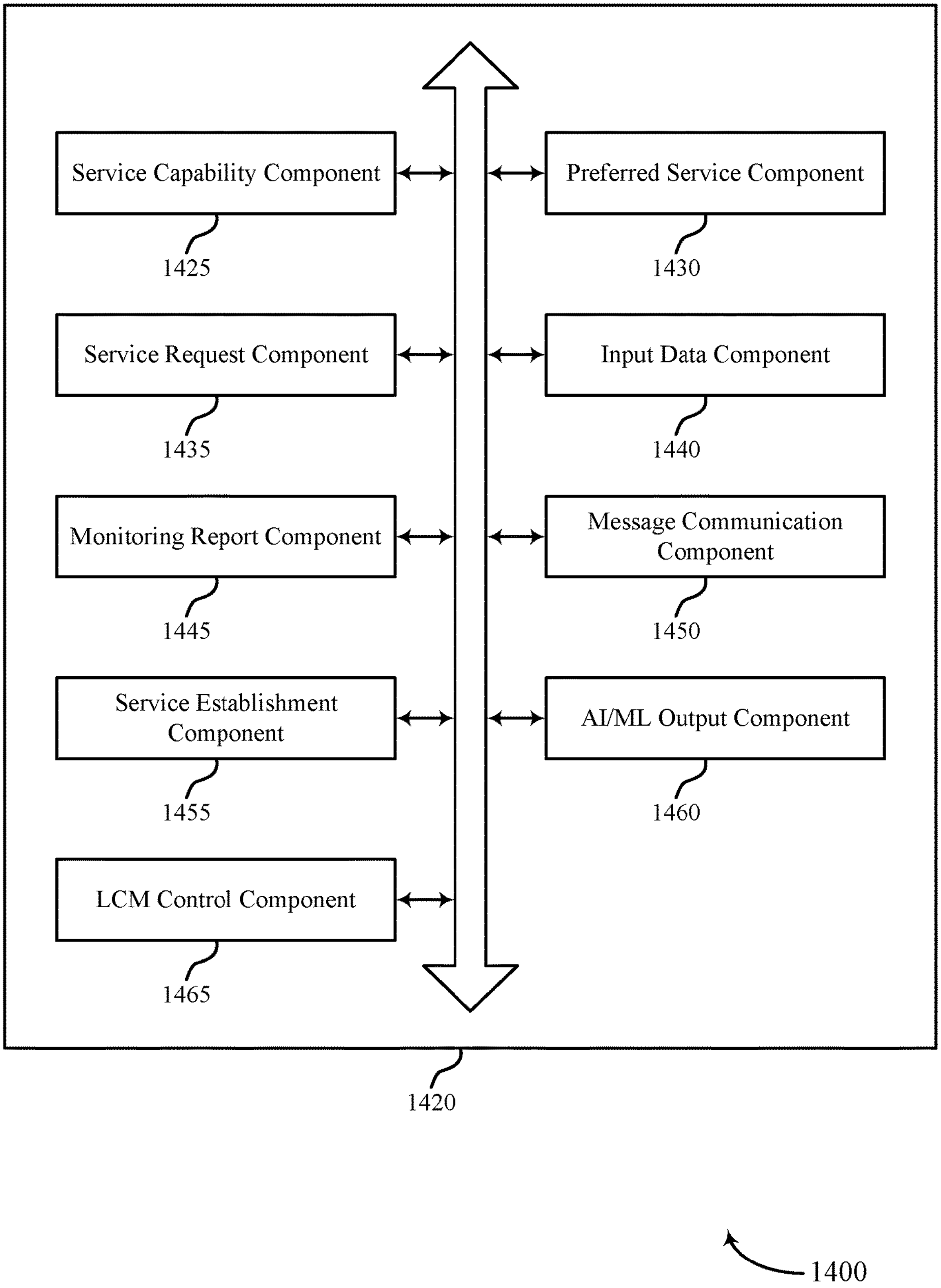
FIG. 14 shows a block diagram of a communications manager that supports techniques for non-transparent service establishment and inference monitoring in accordance with one or more aspects of the present disclosure.

FIG. 14 shows a block diagram 1400 of a communications manager 1420 that supports techniques for non-transparent inference monitoring in accordance with one or more aspects of the present disclosure. The communications manager 1420 may be an example of aspects of a communications manager 1420, as described herein. The communications manager 1420, or various components thereof, may be an example of means for performing various aspects of techniques for non-transparent inference monitoring as described herein. For example, the communications manager 1420 may include a service capability component 1425, a preferred service component 1430, a service request component 1435, an input data component 1440, a monitoring report component 1445, a message communication component 1450, a service establishment component 1455, an AI/ML output component 1460, an LCM control component 1465, or any combination thereof. Each of these components, or components or subcomponents thereof (e.g., one or more processors, one or more memories), may communicate, directly or indirectly, with one another (e.g., via one or more buses).

The communications manager 1420 may support wireless communication in accordance with examples disclosed herein. The service capability component 1425 is capable of, configured to, or operable to support a means for identifying service capability information associated with a set of multiple services and a set of multiple associated functions supported by a service that is configured to communicate with the UE and a network entity of a RAN. The preferred service component 1430 is capable of, configured to, or operable to support a means for receiving, from the network entity, a preferred service message indicating a subset of the set of multiple services available to the UE or the set of multiple associated functions that are available to the UE and preferred by the network entity. The service request component 1435 is capable of, configured to, or operable to support a means for transmitting, to the service, a request to activate or use at least one preferred service of the subset of the set of multiple services or at least one preferred associated function of the subset of the set of multiple associated functions available to the UE for communications between the UE and the network entity in accordance with the preferred service message.

In some examples, the preferred service message indicating the subset of the set of multiple services available to the UE or the set of multiple associated functions that are available to the UE is based on a current RAN state of the network entity.

In some examples, to support identifying the service capability information, the service capability component 1425 is capable of, configured to, or operable to support a means for receiving service capability information associated with a set of multiple functions supported by a service that is configured to communicate with the UE and a network entity of a RAN.

In some examples, to support receiving the service capability information, the service capability component 1425 is capable of, configured to, or operable to support a means for receiving the service capability information that indicates one or more set of AI or ML functions, AI or ML models and non AI or ML functions supported by the service on a per-function bases, a per-feature basis, or a per-feature group basis.

In some examples, to support receiving the service capability information, the service capability component 1425 is capable of, configured to, or operable to support a means for receiving a UE-specific or non-UE-specific message indicating the service capability information.

In some examples, the subset of the set of multiple services available to the UE or the set of multiple associated functions available to the UE are preferred for all RAN states of the network entity. In some examples, the request is transmitted via a control plane or user plane.

In some examples, to support receiving the preferred service message, the preferred service component 1430 is capable of, configured to, or operable to support a means for receiving dedicated signaling or system information instructing the UE to activate or prioritize the at least one preferred service of the subset of the set of multiple services or the at least one preferred associated function of the subset of the set of multiple associated functions available to the UE.

In some examples, the at least one preferred service of the subset of the set of multiple services or the at least one preferred associated function of the subset of the set of multiple associated functions available to the UE is based on a current RAN state of the network entity.

In some examples, the current RAN state of the network entity includes a codebook index of the network entity, a MIMO scheme of the network entity, a CSI reporting configuration of the UE, a location of the UE, or a combination thereof.

In some examples, the service request component 1435 is capable of, configured to, or operable to support a means for receiving, from the network entity, a request or instruction for the UE to activate or use the at least one preferred service of the subset of the set of multiple services or the at least one preferred associated function of the subset of the set of multiple associated functions available to the UE in accordance with the preferred service message indicating that the at least one preferred service or the at least one preferred associated function of the service is preferred by the network entity.

In some examples, to support receiving the preferred service message, the preferred service component 1430 is capable of, configured to, or operable to support a means for receiving the preferred service message in accordance with a mapping between the set of multiple services or the set of multiple associated functions supported by the service and one or more RAN states of the network entity, an area configuration for the service, or any combination thereof.

In some examples, the service establishment component 1455 is capable of, configured to, or operable to support a means for performing a RAN-triggered service establishment procedure with the service in accordance with the preferred service message from the network entity.

In some examples, the area configuration corresponds to a PLMN, a tracking area, or a RAN notification area associated with the network entity. In some examples, the preferred service message further indicates routing information to use for service establishment between the UE and the service.

Additionally, or alternatively, the communications manager 1420 may support wireless communication in accordance with examples disclosed herein. The input data component 1440 is capable of, configured to, or operable to support a means for receiving monitoring input data from an AI or ML service that is configured to communicate with the UE and a network entity of a RAN. The monitoring report component 1445 is capable of, configured to, or operable to support a means for transmitting a monitoring report to the AI or ML service based on the monitoring input data provided by the AI or ML service and a reporting configuration of the UE, the monitoring report including feedback information associated with a first inference or model of the AI or ML service. The message communication component 1450 is capable of, configured to, or operable to support a means for communicating one or more messages with the network entity of the RAN using a second inference or model of the AI or ML service in accordance with the monitoring report provided by the UE.

In some examples, the input data component 1440 is capable of, configured to, or operable to support a means for receiving second monitoring input data from the network entity of the RAN that is configured to communicate with the UE and the AI or ML service, where the monitoring report is based on the second monitoring input data.

In some examples, to support transmitting the monitoring report, the monitoring report component 1445 is capable of, configured to, or operable to support a means for transmitting the monitoring report that indicates at least one of an MMSE threshold, latency data, network loading information, uplink or downlink throughout information, packet loss data, or RLF rate information associated with the first inference or model of the AI or ML service.

In some examples, to support transmitting the monitoring report, the monitoring report component 1445 is capable of, configured to, or operable to support a means for transmitting the monitoring report to the AI or ML service based on the monitoring input data satisfying one or more event-based trigger conditions associated with the reporting configuration of the UE.

In some examples, the input data component 1440 is capable of, configured to, or operable to support a means for transmitting first AI or ML input data to the AI or ML service. In some examples, the AI/ML output component 1460 is capable of, configured to, or operable to support a means for receiving, from the AI or ML service, AI or ML output data including positioning data or feedback information associated with the first inference or model of the AI or ML service.

In some examples, the LCM control component 1465 is capable of, configured to, or operable to support a means for transmitting, to the AI or ML service, a LCM control indication including a request to deactivate, switch, revert, or reconfigure a current model of the AI or ML service based on the monitoring input data.

In some examples, the LCM control component 1465 is capable of, configured to, or operable to support a means for receiving, from the AI or ML service, LCM control signaling associated with deactivating, switching, reverting, or reconfiguring the current model of the AI or ML service in accordance with the LCM control signaling.

In some examples, the monitoring report component 1445 is capable of, configured to, or operable to support a means for receiving control signaling that indicates the reporting configuration of the UE, where transmitting the monitoring report is based on the control signaling.

Figure 15:
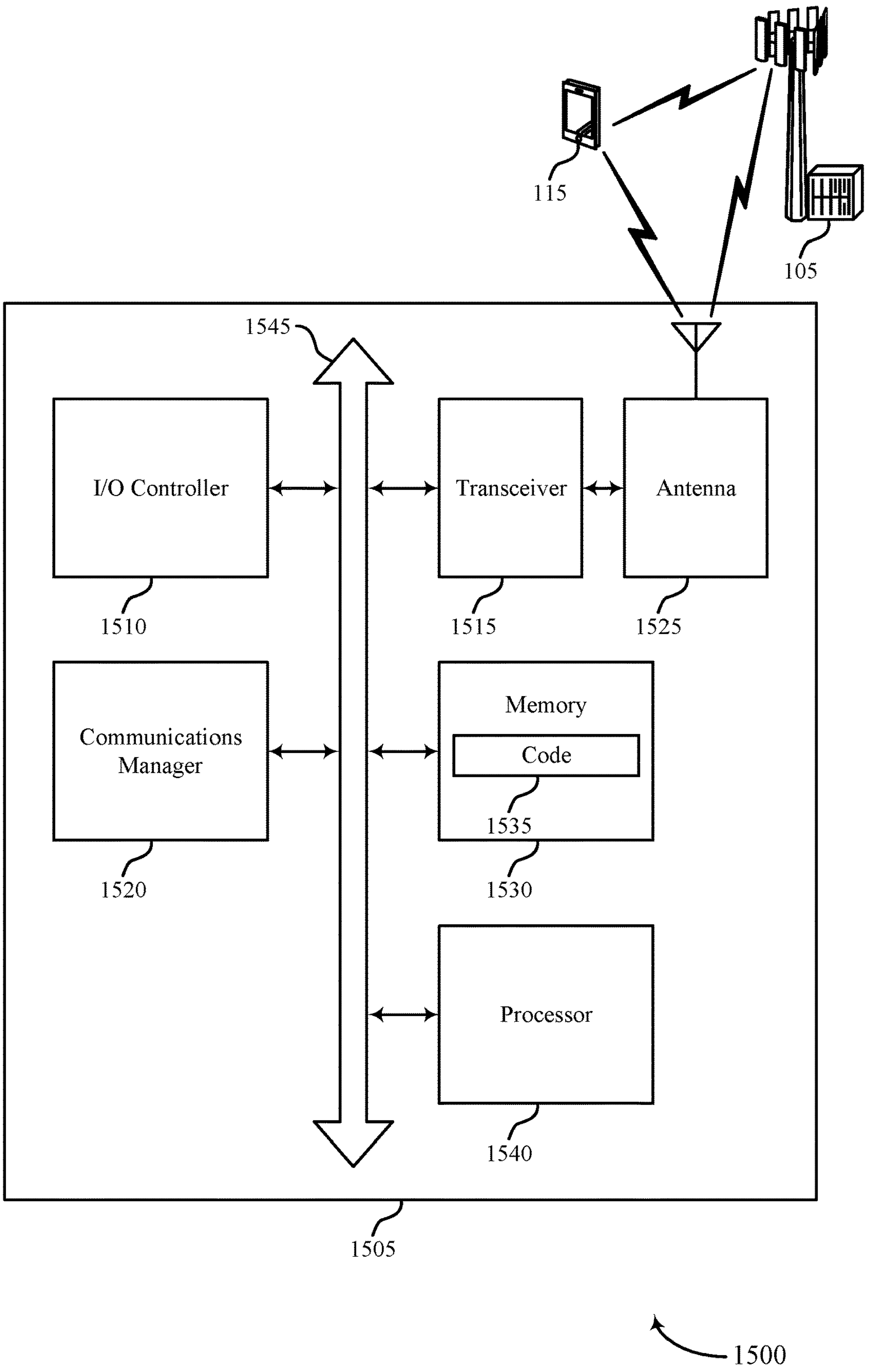
FIG. 15 shows a diagram of a system including a device that supports techniques for non-transparent service establishment and inference monitoring in accordance with one or more aspects of the present disclosure.

FIG. 15 shows a diagram of a system 1500 including a device 1505 that supports techniques for non-transparent inference monitoring in accordance with one or more aspects of the present disclosure. The device 1505 may be an example of or include the components of a device 1505, as described herein. The device 1505 may communicate (e.g., wirelessly) with one or more network entities 105, one or more UEs 115, or any combination thereof. The device 1505 may include components for bi-directional voice and data communications including components for transmitting and receiving communications, such as a communications manager 1520, an input/output (I/O) controller 1510, a transceiver 1515, an antenna 1525, at least one memory 1530, code 1535, and at least one processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally, or alternatively, the I/O controller 1510 may represent or interact with a modem, a keyboard, a mouse, a touchscreen, or a similar device. In some cases, the I/O controller 1510 may be implemented as part of one or more processors, such as the at least one processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1515, a receiver 1510, or any combination thereof or component thereof, as described herein.

The at least one memory 1530 may include random access memory (RAM) and read-only memory (ROM). The at least one memory 1530 may store computer-readable, computer-executable code 1535 including instructions that, when executed by the at least one processor 1540, cause the device 1505 to perform various functions described herein. The code 1535 may be stored in a non-transitory computer-readable medium such as system memory or another type of memory. In some cases, the code 1535 may not be directly executable by the at least one processor 1540 but may cause a computer (e.g., when compiled and executed) to perform functions described herein. In some cases, the at least one memory 1530 may contain, among other things, a basic I/O system (BIOS) which may control basic hardware or software operation such as the interaction with peripheral components or devices.

The at least one processor 1540 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the at least one processor 1540 may be configured to operate a memory array using a memory controller. In some other cases, a memory controller may be integrated into the at least one processor 1540.

The at least one processor 1540 may be configured to execute computer-readable instructions stored in a memory (e.g., the at least one memory 1530) to cause the device 1505 to perform various functions (e.g., functions or tasks supporting techniques for non-transparent inference monitoring). For example, the device 1505 or a component of the device 1505 may include at least one processor 1540 and at least one memory 1530 coupled with or to the at least one processor 1540, the at least one processor 1540 and at least one memory 1530 configured to perform various functions described herein. In some examples, the at least one processor 1540 may include multiple processors and the at least one memory 1530 may include multiple memories.

One or more of the multiple processors may be coupled with one or more of the multiple memories, which may, individually or collectively, be configured to perform various functions herein. In some examples, the at least one processor 1540 may be a component of a processing system, which may refer to a system (such as a series) of machines, circuitry (including, for example, one or both of processor circuitry (which may include the at least one processor 1540) and memory circuitry (which may include the at least one memory 1530)), or components, that receives or obtains inputs and processes the inputs to produce, generate, or obtain a set of outputs.

The processing system may be configured to perform one or more of the functions described herein. As such, the at least one processor 1540 or a processing system including the at least one processor 1540 may be configured to, configurable to, or operable to cause the device 1505 to perform one or more of the functions described herein. Further, as described herein, being "configured to," being "configurable to," and being "operable to" may be used interchangeably and may be associated with a capability, when executing code stored in the at least one memory 1530 or otherwise, to perform one or more of the functions described herein.

The communications manager 1520 may support wireless communication in accordance with examples disclosed herein. For example, the communications manager 1520 is capable of, configured to, or operable to support a means for identifying service capability information associated with a set of multiple services and a set of multiple associated functions supported by a service that is configured to communicate with the UE and a network entity of a RAN. The communications manager 1520 is capable of, configured to, or operable to support a means for receiving, from the network entity, a preferred service message indicating a subset of the set of multiple services available to the UE or the set of multiple associated functions that are available to the UE and preferred by the network entity. The communications manager 1520 is capable of, configured to, or operable to support a means for transmitting, to the service, a request to activate or use at least one preferred service of the subset of the set of multiple services or at least one preferred associated function of the subset of the set of multiple associated functions available to the UE for communications between the UE and the network entity in accordance with the preferred service message.

Additionally, or alternatively, the communications manager 1520 may support wireless communication in accordance with examples disclosed herein. For example, the communications manager 1520 is capable of, configured to, or operable to support a means for receiving monitoring input data from an AI or ML service that is configured to communicate with the UE and a network entity of a RAN. The communications manager 1520 is capable of, configured to, or operable to support a means for transmitting a monitoring report to the AI or ML service based on the monitoring input data provided by the AI or ML service and a reporting configuration of the UE, the monitoring report including feedback information associated with a first inference or model of the AI or ML service. The communications manager 1520 is capable of, configured to, or operable to support a means for communicating one or more messages with the network entity of the RAN using a second inference or model of the AI or ML service in accordance with the monitoring report provided by the UE.

By including or configuring the communications manager 1520 in accordance with examples described herein, the device 1505 may support techniques for non-transparent inference monitoring, which may result in improved inference capability, improved communication reliability, reduced latency, improved user experience related to reduced processing, reduced power consumption, more efficient utilization of communication resources, improved coordination between devices, longer battery life, improved utilization of processing capability, among other advantages.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the at least one processor 1540, the at least one memory 1530, the code 1535, or any combination thereof. For example, the code 1535 may include instructions executable by the at least one processor 1540 to cause the device 1505 to perform various aspects of techniques for non-transparent inference monitoring as described herein, or the at least one processor 1540 and the at least one memory 1530 may be otherwise configured to, individually or collectively, perform or support such operations.

Figure 16:
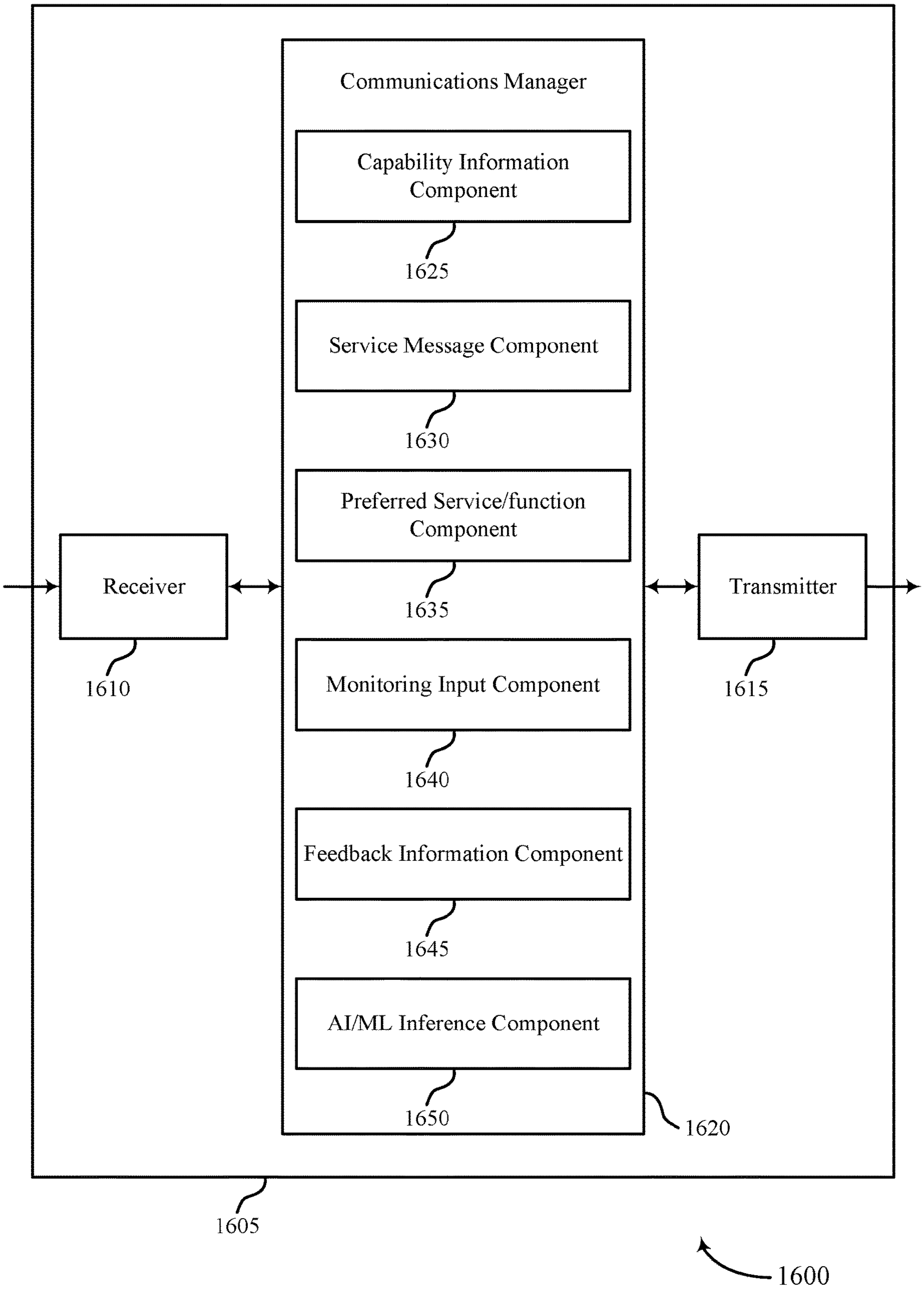
FIG. 16 shows a block diagram of an apparatus that supports techniques for non-transparent service establishment and inference monitoring in accordance with one or more aspects of the present disclosure.

FIG. 16 shows a block diagram 1600 of a device 1605 that supports techniques for non-transparent inference monitoring in accordance with one or more aspects of the present disclosure. The device 1605 may include a receiver 1610, a transmitter 1615, and a communications manager 1620. The device 1605, or one of more components of the device 1605 (e.g., the receiver 1610, the transmitter 1615, and the communications manager 1620), may include at least one processor, which may be coupled with at least one memory, to support the described techniques. Each of these components may be in communication with one another (e.g., via one or more buses).

The receiver 1610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1605. In some examples, the receiver 1610 may support obtaining information by receiving signals via one or more antennas. Additionally, or alternatively, the receiver 1610 may support obtaining information by receiving signals via one or more wired (e.g., electrical, fiber optic) interfaces, wireless interfaces, or any combination thereof.

The transmitter 1615 may provide a means for outputting (e.g., transmitting, providing, conveying, sending) information generated by other components of the device 1605. For example, the transmitter 1615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1615 may support outputting information by transmitting signals via one or more antennas. Additionally, or alternatively, the transmitter 1615 may support outputting information by transmitting signals via one or more wired (e.g., electrical, fiber optic) interfaces, wireless interfaces, or any combination thereof. In some examples, the transmitter 1615 and the receiver 1610 may be co-located in a transceiver, which may include or be coupled with a modem.

For example, the communications manager 1620 may include a capability information component 1625, a service message component 1630, a preferred service/function component 1635, a monitoring input component 1640, a feedback information component 1645, an AI/ML inference component 1650, or any combination thereof. In some examples, the communications manager 1620, or various components thereof, may be configured to perform various operations (e.g., receiving, obtaining, monitoring, outputting, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to obtain information, output information, or perform various other operations as described herein.

The communications manager 1620 may support wireless communication in accordance with examples disclosed herein. The capability information component 1625 is capable of, configured to, or operable to support a means for receiving, from a service that is configured to communicate with the network entity and a UE, service capability information associated with a mapping between a set of multiple services or a set of multiple associated functions supported by the service and one or more RAN states of the network entity. The service message component 1630 is capable of, configured to, or operable to support a means for transmitting, to the UE, a preferred service message indicating a subset of the set of multiple services available to the UE or the set of multiple associated functions that are available to the UE and preferred by the network entity in accordance with the mapping. The preferred service/function component 1635 is capable of, configured to, or operable to support a means for communicating one or more messages with the UE using at least one preferred service of the subset of the set of multiple services or at least one preferred associated function of the subset of the set of multiple associated functions available to the UE in accordance with the preferred service message.

Additionally, or alternatively, the communications manager 1620 may support wireless communication in accordance with examples disclosed herein. The monitoring input component 1640 is capable of, configured to, or operable to support a means for receiving monitoring input data from an AI or ML service that is configured to communicate with the network entity and a UE. The feedback information component 1645 is capable of, configured to, or operable to support a means for transmitting a monitoring report to the AI or ML service based on the monitoring input data provided by the AI or ML service and a reporting configuration of the network entity, the monitoring report including feedback information associated with a first inference or model of the AI or ML service. The AI/ML inference component 1650 is capable of, configured to, or operable to support a means for communicating one or more messages with the UE using a second inference or model of the AI or ML service in accordance with the monitoring report provided by the network entity.

Figure 17:
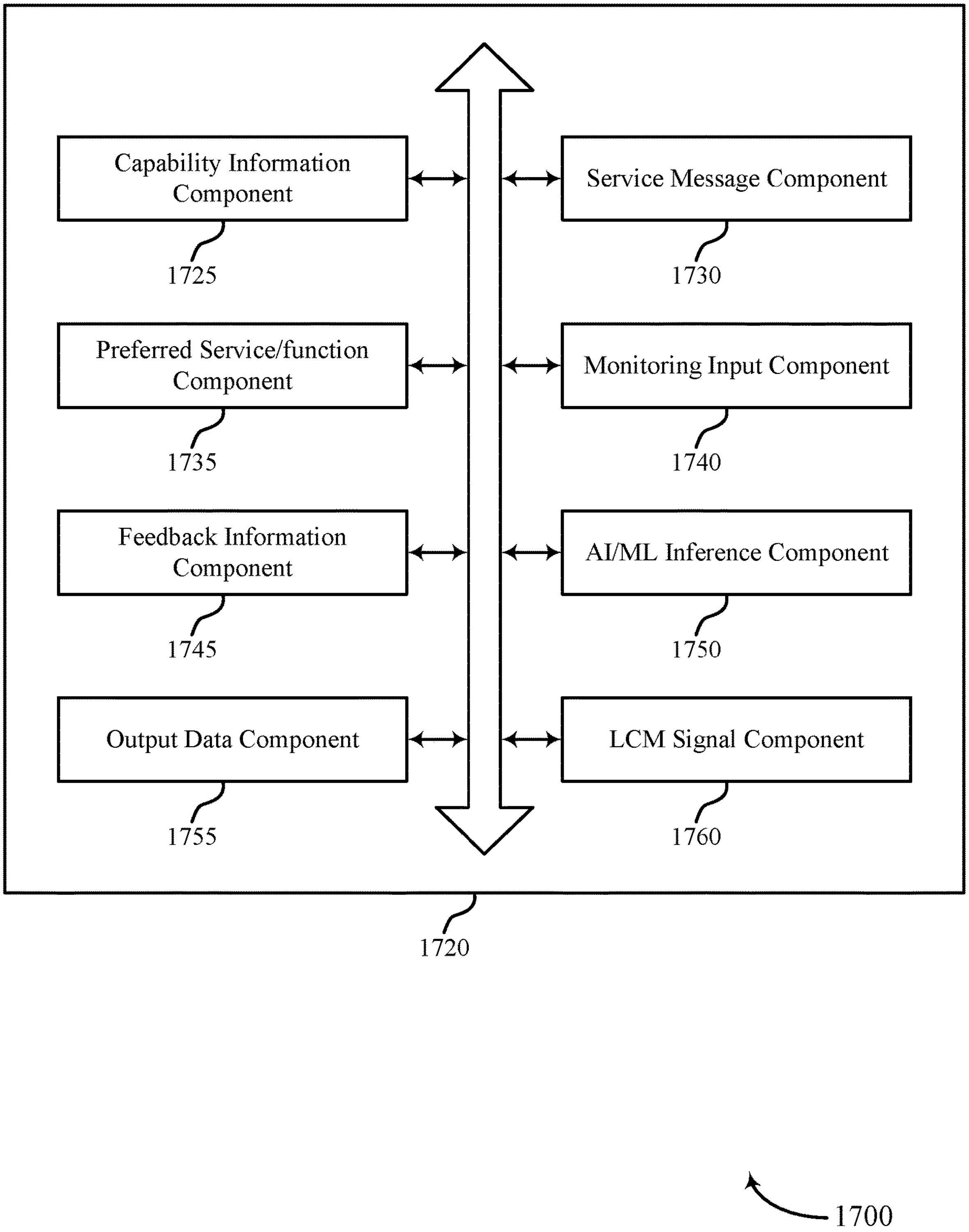
FIG. 17 shows a block diagram of a communications manager that supports techniques for non-transparent service establishment and inference monitoring in accordance with one or more aspects of the present disclosure.

FIG. 17 shows a block diagram 1700 of a communications manager 1720 that supports techniques for non-transparent inference monitoring in accordance with one or more aspects of the present disclosure. The communications manager 1720 may be an example of aspects of a communications manager 1620, as described herein. The communications manager 1720, or various components thereof, may be an example of means for performing various aspects of techniques for non-transparent inference monitoring as described herein. For example, the communications manager 1720 may include a capability information component 1725, a service message component 1730, a preferred service/function component 1735, a monitoring input component 1740, a feedback information component 1745, an AI/ML inference component 1750, an output data component 1755, an LCM signal component 1760, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1720 may support wireless communication in accordance with examples disclosed herein. The capability information component 1725 is capable of, configured to, or operable to support a means for receiving, from a service that is configured to communicate with the network entity and a UE, service capability information associated with a mapping between a set of multiple services or a set of multiple associated functions supported by the service and one or more RAN states of the network entity. The service message component 1730 is capable of, configured to, or operable to support a means for transmitting, to the UE, a preferred service message indicating a subset of the set of multiple services available to the UE or the set of multiple associated functions that are available to the UE and preferred by the network entity in accordance with the mapping. The preferred service/function component 1735 is capable of, configured to, or operable to support a means for communicating one or more messages with the UE using at least one preferred service of the subset of the set of multiple services or at least one preferred associated function of the subset of the set of multiple associated functions available to the UE in accordance with the preferred service message.

In some examples, the preferred service message indicating the subset of the set of multiple services available to the UE or the set of multiple associated functions that are available to the UE and preferred by the network entity is based on a current RAN state of the network entity.

In some examples, to support transmitting the preferred service message, the service message component 1730 is capable of, configured to, or operable to support a means for transmitting dedicated signaling or system information that instructs the UE to activate or prioritize the at least one preferred service of the subset of the set of multiple services or the at least one preferred associated function of the subset of the set of multiple associated functions available to the UE.

In some examples, the dedicated signaling or the system information that instructs the UE to activate or prioritize the at least one preferred service of the subset of the set of multiple services or the at least one preferred associated function of the subset of the set of multiple associated functions available to the UE is based on a current RAN state of the network entity.

In some examples, to support receiving the service capability information, the capability information component 1725 is capable of, configured to, or operable to support a means for receiving the service capability information that indicates a set of non-AI or ML functions, AI or ML functions, or AI or ML models supported by the service on a per-function basis, a per-feature basis, or a per-feature group basis.

In some examples, the preferred service/function component 1735 is capable of, configured to, or operable to support a means for determining that the at least one preferred service or function of the service is preferred based on a codebook index of the network entity, a MIMO scheme of the network entity, a CSI reporting configuration of the UE, a location of the UE, or a combination thereof.

In some examples, to support transmitting the preferred service message, the service message component 1730 is capable of, configured to, or operable to support a means for transmitting the preferred service message that includes a request or instruction for the UE to activate or prioritize the at least one preferred service or associated function available to the UE and preferred by the network entity.

In some examples, to support receiving the service capability information, the capability information component 1725 is capable of, configured to, or operable to support a means for receiving the service capability information that indicates the set of multiple services and the set of multiple associated functions supported by the service, the mapping between the set of multiple associated functions supported by the service and the one or more RAN states of the network entity, an area configuration for the service, or any combination thereof.

In some examples, to support transmitting the preferred service message, the service message component 1730 is capable of, configured to, or operable to support a means for transmitting the preferred service message in accordance with the mapping and a current RAN state of the network entity that corresponds to a codebook index of the network entity, a MIMO scheme of the network entity, a location of the UE relative to the network entity, a channel quality metric, a signal strength of the one or more messages, or any combination thereof.

In some examples, the preferred service message further indicates routing information to use for service establishment between the UE and the service. In some examples, the area configuration corresponds to a PLMN, a tracking area, or a RAN notification area associated with the network entity.

Additionally, or alternatively, the communications manager 1720 may support wireless communication in accordance with examples disclosed herein. The monitoring input component 1740 is capable of, configured to, or operable to support a means for receiving monitoring input data from an AI or ML service that is configured to communicate with the network entity and a UE. The feedback information component 1745 is capable of, configured to, or operable to support a means for transmitting a monitoring report to the AI or ML service based on the monitoring input data provided by the AI or ML service and a reporting configuration of the network entity, the monitoring report including feedback information associated with a first inference or model of the AI or ML service. The AI/ML inference component 1750 is capable of, configured to, or operable to support a means for communicating one or more messages with the UE using a second inference or model of the AI or ML service in accordance with the monitoring report provided by the network entity.

In some examples, the monitoring input component 1740 is capable of, configured to, or operable to support a means for transmitting second monitoring input data to the UE, where the monitoring report is based on the second monitoring input data, and where the second inference or model of the AI or ML service is based on feedback information associated with the second monitoring input data provided by the network entity.

In some examples, to support transmitting the monitoring report, the feedback information component 1745 is capable of, configured to, or operable to support a means for transmitting the monitoring report that triggers deactivation of the first inference or model of the AI or ML service when the feedback information indicates that a performance of the first inference or model is below a threshold.

In some examples, to support transmitting the monitoring report, the feedback information component 1745 is capable of, configured to, or operable to support a means for transmitting the monitoring report that triggers a switch from the first inference or model of the AI or ML service to the second inference or model of the AI or ML service when the feedback information indicates that a performance of the first inference or model is below a threshold.

In some examples, the output data component 1755 is capable of, configured to, or operable to support a means for receiving, from the AI or ML service, AI or ML output data generated using the second inference or model of the AI or ML service.

In some examples, the LCM signal component 1760 is capable of, configured to, or operable to support a means for receiving, from the AI or ML service, LCM control signaling that indicates a reconfiguration from an AI or ML-based model to a non-AI or ML-based model, where the reconfiguration is based on the monitoring report.

In some examples, the LCM signal component 1760 is capable of, configured to, or operable to support a means for receiving, from the AI or ML service, LCM control signaling that indicates a reconfiguration from a non-AI or ML-based model to an AI or ML-based model, where the reconfiguration is based on the monitoring report.

In some examples, the second inference or model of the AI or ML service includes the first inference or model of the AI or ML service.

In some examples, the feedback information component 1745 is capable of, configured to, or operable to support a means for receiving, from the AI or ML service, control signaling that indicates the reporting configuration of the network entity, where transmitting the monitoring report is based on the control signaling.

Figure 18:
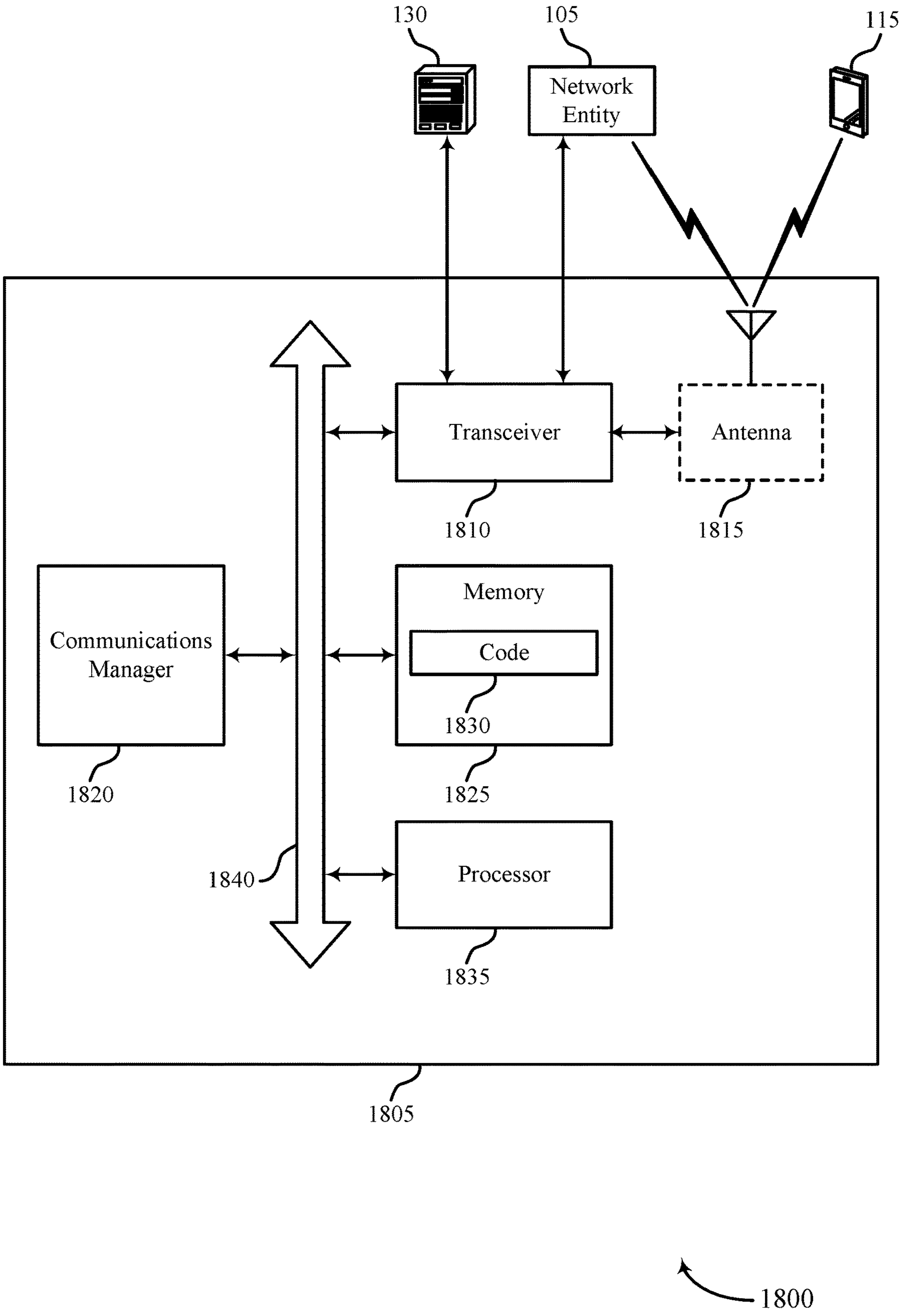
FIG. 18 shows a diagram of a system including a device that supports techniques for non-transparent service establishment and inference monitoring in accordance with one or more aspects of the present disclosure.

FIG. 18 shows a diagram of a system 1800 including a device 1805 that supports techniques for non-transparent inference monitoring in accordance with one or more aspects of the present disclosure. The device 1805 may be an example of or include the components of a device 1605 as described herein. The device 1805 may communicate with one or more network entities 105, one or more UEs 115, or any combination thereof, which may include communications over one or more wired interfaces, over one or more wireless interfaces, or any combination thereof. The device 1805 may include components that support outputting and obtaining communications, such as a communications manager 1820, a transceiver 1810, an antenna 1815, at least one memory 1825, code 1830, and at least one processor 1835. These components may be in electronic communication or otherwise coupled (e.g., operatively, communicatively, functionally, electronically, electrically) via one or more buses (e.g., a bus 1840).

The transceiver 1810 may support bi-directional communications via wired links, wireless links, or both as described herein. In some examples, the transceiver 1810 may include a wired transceiver and may communicate bi-directionally with another wired transceiver. Additionally, or alternatively, in some examples, the transceiver 1810 may include a wireless transceiver and may communicate bi-directionally with another wireless transceiver. In some examples, the device 1805 may include one or more antennas 1815, which may be capable of transmitting or receiving wireless transmissions (e.g., concurrently).

The transceiver 1810 may also include a modem to modulate signals, to provide the modulated signals for transmission (e.g., by one or more antennas 1815, by a wired transmitter), to receive modulated signals (e.g., from one or more antennas 1815, from a wired receiver), and to demodulate signals. In some implementations, the transceiver 1810 may include one or more interfaces, such as one or more interfaces coupled with the one or more antennas 1815 that are configured to support various receiving or obtaining operations, or one or more interfaces coupled with the one or more antennas 1815 that are configured to support various transmitting or outputting operations, or a combination thereof. In some implementations, the transceiver 1810 may include or be configured for coupling with one or more processors or one or more memory components that are operable to perform or support operations based on received or obtained information or signals, or to generate information or other signals for transmission or other outputting, or any combination thereof.

In some implementations, the transceiver 1810, or the transceiver 1810 and the one or more antennas 1815, or the transceiver 1810 and the one or more antennas 1815 and one or more processors or one or more memory components (e.g., the at least one processor 1835, the at least one memory 1825, or both), may be included in a chip or chip assembly that is installed in the device 1805. In some examples, the transceiver 1810 may be operable to support communications via one or more communications links (e.g., a communication link 125, a backhaul communication link 120, a midhaul communication link 162, a fronthaul communication link 168).

The at least one memory 1825 may include RAM, ROM, or any combination thereof. The at least one memory 1825 may store computer-readable, computer-executable code 1830 including instructions that, when executed by one or more of the at least one processor 1835, cause the device 1805 to perform various functions described herein. The code 1830 may be stored in a non-transitory computer-readable medium such as system memory or another type of memory. In some cases, the code 1830 may not be directly executable by a processor of the at least one processor 1835 but may cause a computer (e.g., when compiled and executed) to perform functions described herein. In some cases, the at least one memory 1825 may contain, among other things, a BIOS which may control basic hardware or software operation such as the interaction with peripheral components or devices. In some examples, the at least one processor 1835 may include multiple processors and the at least one memory 1825 may include multiple memories. One or more of the multiple processors may be coupled with one or more of the multiple memories which may, individually or collectively, be configured to perform various functions herein (for example, as part of a processing system).

The at least one processor 1835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1835 may be configured to operate a memory array using a memory controller. In some other cases, a memory controller may be integrated into one or more of the at least one processor 1835.

The at least one processor 1835 may be configured to execute computer-readable instructions stored in a memory (e.g., one or more of the at least one memory 1825) to cause the device 1805 to perform various functions (e.g., functions or tasks supporting techniques for non-transparent inference monitoring). For example, the device 1805 or a component of the device 1805 may include at least one processor 1835 and at least one memory 1825 coupled with one or more of the at least one processor 1835, the at least one processor 1835 and the at least one memory 1825 configured to perform various functions described herein. The at least one processor 1835 may be an example of a cloud-computing platform (e.g., one or more physical nodes and supporting software such as operating systems, virtual machines, or container instances) that may host the functions (e.g., by executing code 1830) to perform the functions of the device 1805.

The at least one processor 1835 may be any one or more suitable processors capable of executing scripts or instructions of one or more software programs stored in the device 1805 (such as within one or more of the at least one memory 1825). In some examples, the at least one processor 1835 may include multiple processors and the at least one memory 1825 may include multiple memories. One or more of the multiple processors may be coupled with one or more of the multiple memories, which may, individually or collectively, be configured to perform various functions herein. In some examples, the at least one processor 1835 may be a component of a processing system, which may refer to a system (such as a series) of machines, circuitry (including, for example, one or both of processor circuitry (which may include the at least one processor 1835) and memory circuitry (which may include the at least one memory 1825)), or components, that receives or obtains inputs and processes the inputs to produce, generate, or obtain a set of outputs.

The processing system may be configured to perform one or more of the functions described herein. As such, the at least one processor 1835 or a processing system including the at least one processor 1835 may be configured to, configurable to, or operable to cause the device 1805 to perform one or more of the functions described herein. Further, as described herein, being "configured to," being "configurable to," and being "operable to" may be used interchangeably and may be associated with a capability, when executing code stored in the at least one memory 1825 or otherwise, to perform one or more of the functions described herein.

In some examples, a bus 1840 may support communications of (e.g., within) a protocol layer of a protocol stack. In some examples, a bus 1840 may support communications associated with a logical channel of a protocol stack (e.g., between protocol layers of a protocol stack), which may include communications performed within a component of the device 1805, or between different components of the device 1805 that may be co-located or located in different locations (e.g., where the device 1805 may refer to a system in which one or more of the communications manager 1820, the transceiver 1810, the at least one memory 1825, the code 1830, and the at least one processor 1835 may be located in one of the different components or divided between different components).

In some examples, the communications manager 1820 may manage aspects of communications with a core network 130 (e.g., via one or more wired or wireless backhaul links). For example, the communications manager 1820 may manage the transfer of data communications for client devices, such as one or more UEs 115. In some examples, the communications manager 1820 may manage communications with other network entities 105, and may include a controller or scheduler for controlling communications with UEs 115 in cooperation with other network entities 105. In some examples, the communications manager 1820 may support an X2 interface within an LTE/LTE-A wireless communications network technology to provide communication between network entities 105.

The communications manager 1820 may support wireless communication in accordance with examples disclosed herein. For example, the communications manager 1820 is capable of, configured to, or operable to support a means for receiving, from a service that is configured to communicate with the network entity and a UE, service capability information associated with a mapping between a set of multiple services or a set of multiple associated functions supported by the service and one or more RAN states of the network entity. The communications manager 1820 is capable of, configured to, or operable to support a means for transmitting, to the UE, a preferred service message indicating a subset of the set of multiple services available to the UE or the set of multiple associated functions that are available to the UE and preferred by the network entity in accordance with the mapping. The communications manager 1820 is capable of, configured to, or operable to support a means for communicating one or more messages with the UE using at least one preferred service of the subset of the set of multiple services or at least one preferred associated function of the subset of the set of multiple associated functions available to the UE in accordance with the preferred service message.

Additionally, or alternatively, the communications manager 1820 may support wireless communication in accordance with examples disclosed herein. For example, the communications manager 1820 is capable of, configured to, or operable to support a means for receiving monitoring input data from an AI or ML service that is configured to communicate with the network entity and a UE. The communications manager 1820 is capable of, configured to, or operable to support a means for transmitting a monitoring report to the AI or ML service based on the monitoring input data provided by the AI or ML service and a reporting configuration of the network entity, the monitoring report including feedback information associated with a first inference or model of the AI or ML service. The communications manager 1820 is capable of, configured to, or operable to support a means for communicating one or more messages with the UE using a second inference or model of the AI or ML service in accordance with the monitoring report provided by the network entity.

By including or configuring the communications manager 1820 in accordance with examples described herein, the device 1805 may support techniques for non-transparent inference monitoring, which may result in improved inference capability, improved communication reliability, reduced latency, improved user experience related to reduced processing, reduced power consumption, more efficient utilization of communication resources, improved coordination between devices, longer battery life, improved utilization of processing capability, among other advantages.

In some examples, the communications manager 1820 may be configured to perform various operations (e.g., receiving, obtaining, monitoring, outputting, transmitting) using or otherwise in cooperation with the transceiver 1810, the one or more antennas 1815 (e.g., where applicable), or any combination thereof. Although the communications manager 1820 is illustrated as a separate component, in some examples, one or more functions described with reference to the communications manager 1820 may be supported by or performed by the transceiver 1810, one or more of the at least one processor 1835, one or more of the at least one memory 1825, the code 1830, or any combination thereof (for example, by a processing system including at least a portion of the at least one processor 1835, the at least one memory 1825, the code 1830, or any combination thereof). For example, the code 1830 may include instructions executable by one or more of the at least one processor 1835 to cause the device 1805 to perform various aspects of techniques for non-transparent inference monitoring as described herein, or the at least one processor 1835 and the at least one memory 1825 may be otherwise configured to, individually or collectively, perform or support such operations.

Figure 19:
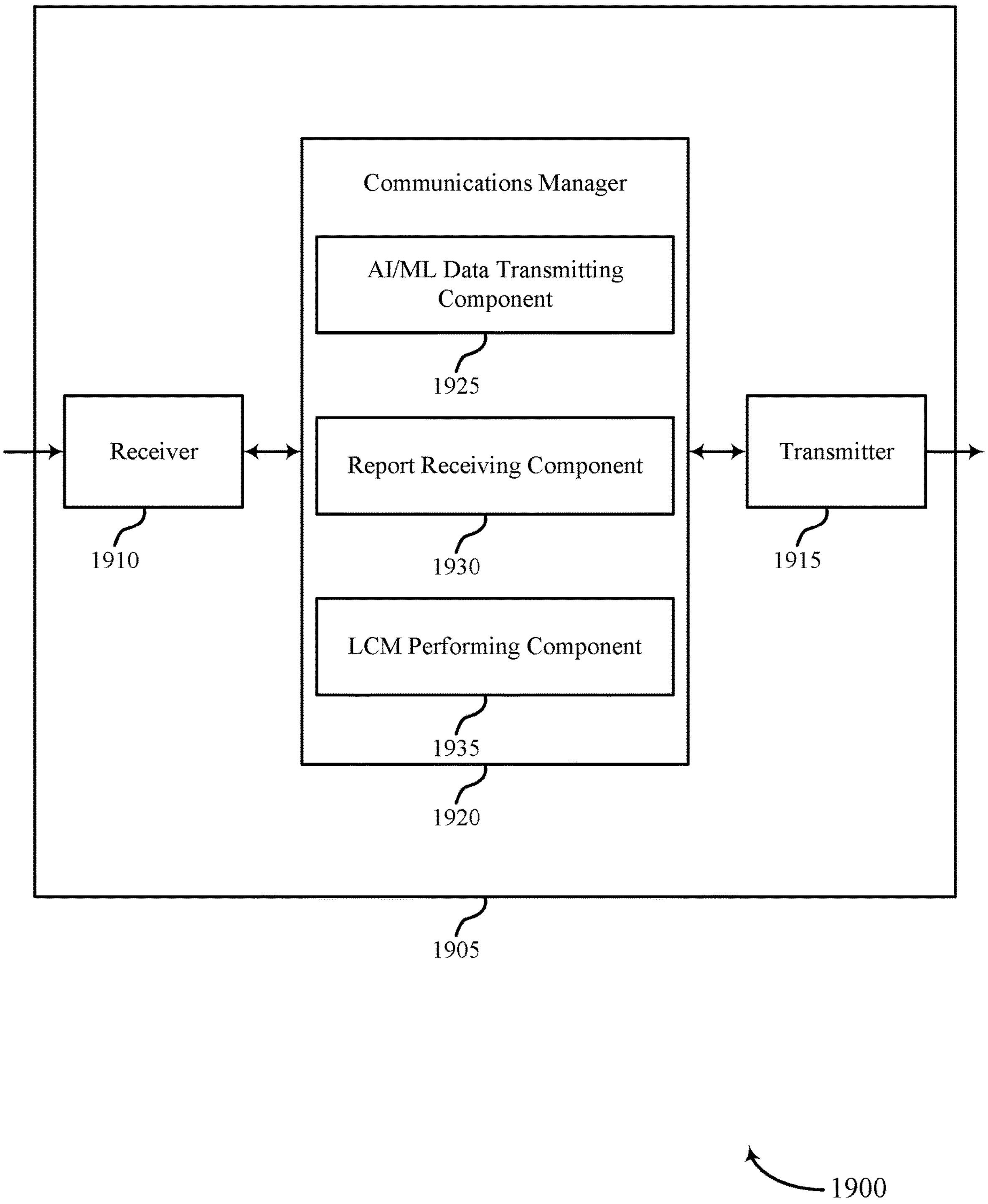
FIG. 19 shows a block diagram of an apparatus that supports techniques for non-transparent service establishment and inference monitoring in accordance with one or more aspects of the present disclosure.

FIG. 19 shows a block diagram 1900 of a device 1905 that supports techniques for non-transparent inference monitoring in accordance with one or more aspects of the present disclosure. The device 1905 may include a receiver 1910, a transmitter 1915, and a communications manager 1920. The device 1905, or one of more components of the device 1905 (e.g., the receiver 1910, the transmitter 1915, and the communications manager 1920), may include at least one processor, which may be coupled with at least one memory, to support the described techniques. Each of these components may be in communication with one another (e.g., via one or more buses).

The receiver 1910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1905. In some examples, the receiver 1910 may support obtaining information by receiving signals via one or more antennas. Additionally, or alternatively, the receiver 1910 may support obtaining information by receiving signals via one or more wired (e.g., electrical, fiber optic) interfaces, wireless interfaces, or any combination thereof.

The transmitter 1915 may provide a means for outputting (e.g., transmitting, providing, conveying, sending) information generated by other components of the device 1905. For example, the transmitter 1915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1915 may support outputting information by transmitting signals via one or more antennas. Additionally, or alternatively, the transmitter 1915 may support outputting information by transmitting signals via one or more wired (e.g., electrical, fiber optic) interfaces, wireless interfaces, or any combination thereof. In some examples, the transmitter 1915 and the receiver 1910 may be co-located in a transceiver, which may include or be coupled with a modem.

For example, the communications manager 1920 may include an AI/ML data transmitting component 1925, a report receiving component 1930, an LCM performing component 1935, or any combination thereof. In some examples, the communications manager 1920, or various components thereof, may be configured to perform various operations (e.g., receiving, obtaining, monitoring, outputting, transmitting) using or otherwise in cooperation with the receiver 1910, the transmitter 1915, or both. For example, the communications manager 1920 may receive information from the receiver 1910, send information to the transmitter 1915, or be integrated in combination with the receiver 1910, the transmitter 1915, or both to obtain information, output information, or perform various other operations as described herein.

The communications manager 1920 may support wireless communication in accordance with examples disclosed herein. The AI/ML data transmitting component 1925 is capable of, configured to, or operable to support a means for transmitting monitoring input data to one or both of a UE or a network entity of a RAN. The report receiving component 1930 is capable of, configured to, or operable to support a means for receiving, from one or both of the UE or the network entity, at least one monitoring report based on the monitoring input data provided by the AI or ML service and a reporting configuration of the UE or the network entity, the at least one monitoring report including feedback information associated with a first inference or model of the AI or ML service. The LCM performing component 1935 is capable of, configured to, or operable to support a means for performing one or more LCM operations associated with the first inference or model of the AI or ML service in accordance with the at least one monitoring report provided by one or both of the UE or the network entity.

Figure 20:
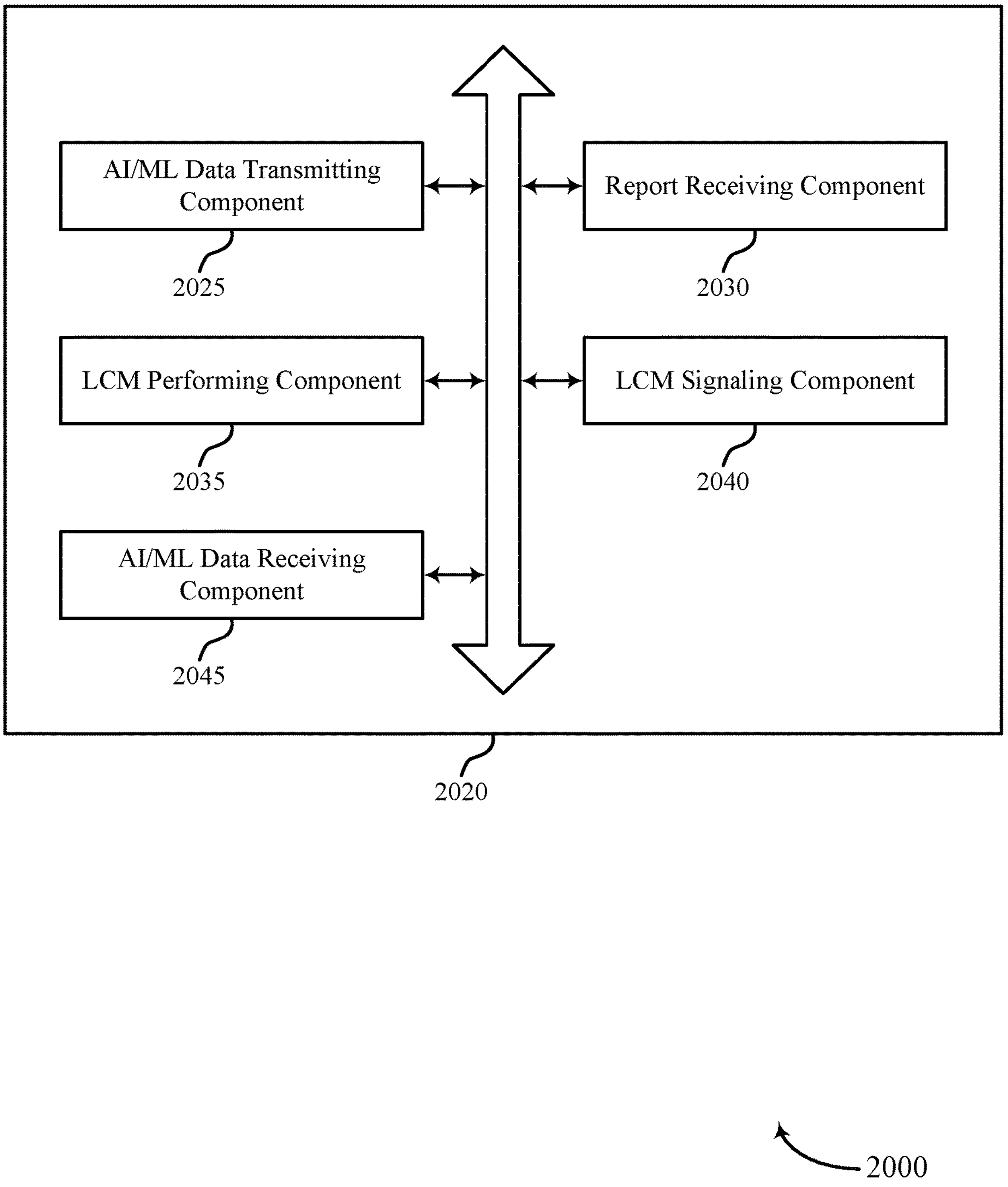
FIG. 20 shows a block diagram of a communications manager that supports techniques for non-transparent service establishment and inference monitoring in accordance with one or more aspects of the present disclosure.

FIG. 20 shows a block diagram 2000 of a communications manager 2020 that supports techniques for non-transparent inference monitoring in accordance with one or more aspects of the present disclosure. The communications manager 2020 may be an example of aspects of a communications manager 1920, as described herein. The communications manager 2020, or various components thereof, may be an example of means for performing various aspects of techniques for non-transparent inference monitoring as described herein. For example, the communications manager 2020 may include an AI/ML data transmitting component 2025, a report receiving component 2030, an LCM performing component 2035, an LCM signaling component 2040, an AI/ML data receiving component 2045, or any combination thereof. Each of these components, or components or subcomponents thereof (e.g., one or more processors, one or more memories), may communicate, directly or indirectly, with one another (e.g., via one or more buses).

The communications manager 2020 may support wireless communication in accordance with examples disclosed herein. The AI/ML data transmitting component 2025 is capable of, configured to, or operable to support a means for transmitting monitoring input data to one or both of a UE or a network entity of a RAN. The report receiving component 2030 is capable of, configured to, or operable to support a means for receiving, from one or both of the UE or the network entity, at least one monitoring report based on the monitoring input data provided by the AI or ML service and a reporting configuration of the UE or the network entity, the at least one monitoring report including feedback information associated with a first inference or model of the AI or ML service. The LCM performing component 2035 is capable of, configured to, or operable to support a means for performing one or more LCM operations associated with the first inference or model of the AI or ML service in accordance with the at least one monitoring report provided by one or both of the UE or the network entity.

In some examples, to support receiving the at least one monitoring report, the report receiving component 2030 is capable of, configured to, or operable to support a means for receiving the at least one monitoring report that indicates at least one of an MMSE threshold, latency data, network loading information, uplink or downlink throughout information, packet loss data, or RLF rate information associated with the first inference or model of the AI or ML service.

In some examples, to support receiving the at least one monitoring report, the report receiving component 2030 is capable of, configured to, or operable to support a means for receiving the at least one monitoring report from the UE based on the monitoring input data satisfying one or more event-based trigger conditions associated with the reporting configuration of the UE.

In some examples, to support receiving the at least one monitoring report, the report receiving component 2030 is capable of, configured to, or operable to support a means for receiving the at least one monitoring report from the network entity based on the monitoring input data satisfying one or more event-based trigger conditions associated with the reporting configuration of the network entity.

In some examples, to support receiving the at least one monitoring report, the report receiving component 2030 is capable of, configured to, or operable to support a means for receiving the at least one monitoring report from one or both of the UE or the network entity in accordance with one or more periodic reporting criteria associated with the reporting configuration of the UE or the network entity.

In some examples, to support receiving the at least one monitoring report, the report receiving component 2030 is capable of, configured to, or operable to support a means for receiving respective monitoring reports from the UE and the network entity. In some examples, to support receiving the at least one monitoring report, the LCM signaling component 2040 is capable of, configured to, or operable to support a means for performing one or more LCM operations associated with the first inference or model of the AI or ML service based on the respective monitoring reports provided by the UE and the network entity.

In some examples, the AI/ML data receiving component 2045 is capable of, configured to, or operable to support a means for receiving first AI or ML input data from the UE. In some examples, the AI/ML data transmitting component 2025 is capable of, configured to, or operable to support a means for transmitting, to the UE, AI or ML output data including CSI, positioning data, or feedback information generated using a second inference or model of the AI or ML service.

In some examples, to support performing the one or more LCM operations, the LCM signaling component 2040 is capable of, configured to, or operable to support a means for receiving, from the UE, an LCM control indication including a request to deactivate, switch, revert, or reconfigure the first inference or model of the AI or ML service based on the monitoring input data.

In some examples, to support performing the one or more LCM operations, the LCM signaling component 2040 is capable of, configured to, or operable to support a means for transmitting, to the UE, LCM control signaling associated with deactivating, switching, reverting, or reconfiguring the first inference or model of the AI or ML service in accordance with the LCM control signaling.

In some examples, to support performing the one or more LCM operations, the LCM signaling component 2040 is capable of, configured to, or operable to support a means for transmitting one or more control messages associated with updating or reconfiguring the first inference or model of the AI or ML service based on the monitoring input data.

In some examples, the AI or ML service runs on one or more processors of a network node that is separate from the RAN. In some examples, the AI or ML service runs on one or more processors of the UE that is capable of performing one or more AI or ML functions.

Figure 21:
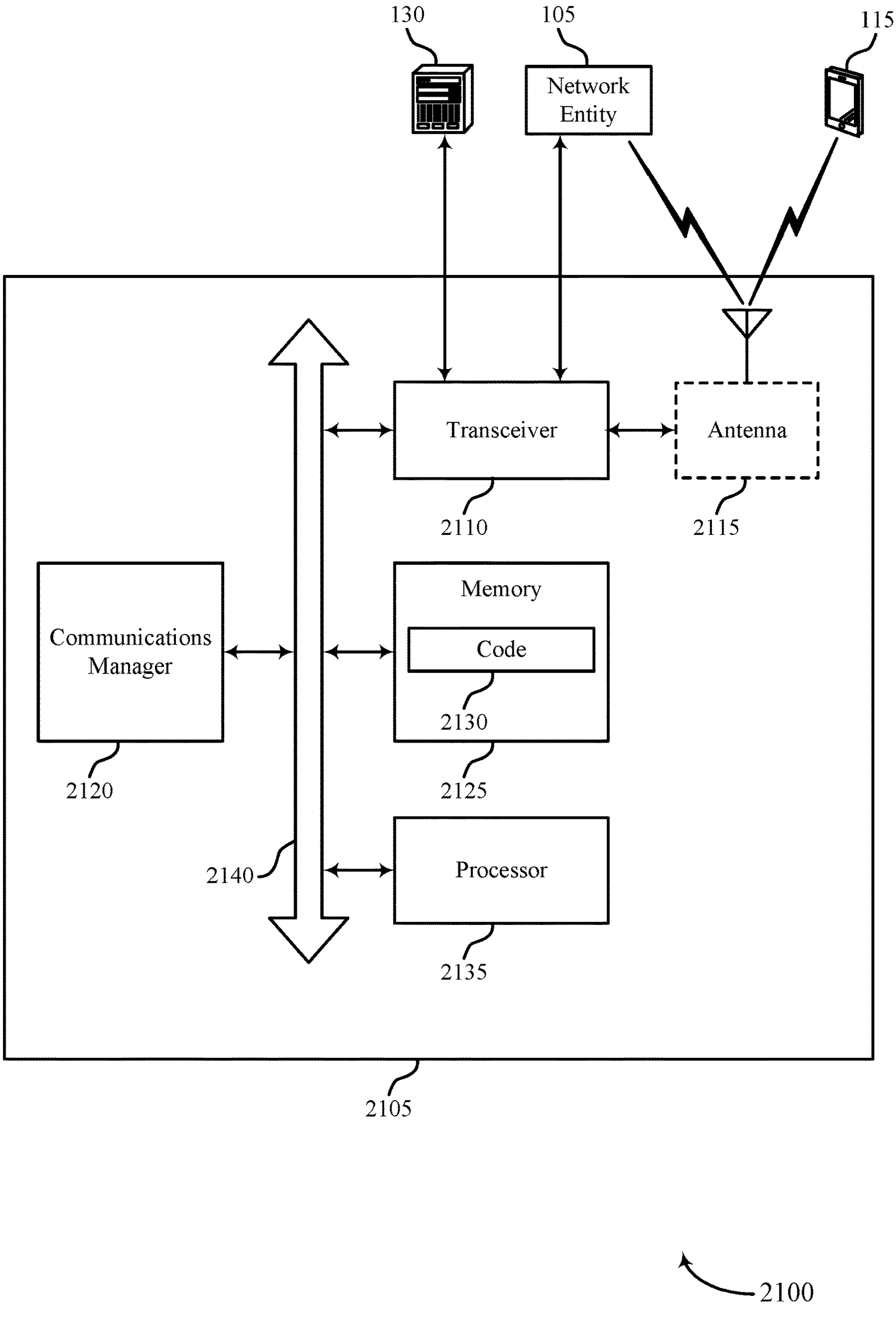
FIG. 21 shows a diagram of a system including a device that supports techniques for non-transparent service establishment and inference monitoring in accordance with one or more aspects of the present disclosure.

FIG. 21 shows a diagram of a system 2100 including a device 2105 that supports techniques for non-transparent inference monitoring in accordance with one or more aspects of the present disclosure. The device 2105 may be an example of or include the components of a device 1905 as described herein. The device 2105 may include components for bi-directional voice and data communications including components for transmitting and receiving communications, such as a communications manager 2120, a transceiver 2110, an antenna 2115, at least one memory 2125, code 2130, and at least one processor 2135. These components may be in electronic communication or otherwise coupled (e.g., operatively, communicatively, functionally, electronically, electrically) via one or more buses (e.g., a bus 2140).

The transceiver 2110 may support bi-directional communications via wired links, wireless links, or both as described herein. In some examples, the transceiver 2110 may include a wired transceiver and may communicate bi-directionally with another wired transceiver. Additionally, or alternatively, in some examples, the transceiver 2110 may include a wireless transceiver and may communicate bi-directionally with another wireless transceiver. In some examples, the device 2105 may include one or more antennas 2115, which may be capable of transmitting or receiving wireless transmissions (e.g., concurrently).

The transceiver 2110 may also include a modem to modulate signals, to provide the modulated signals for transmission (e.g., by one or more antennas 2115, by a wired transmitter), to receive modulated signals (e.g., from one or more antennas 2115, from a wired receiver), and to demodulate signals. In some implementations, the transceiver 2110 may include one or more interfaces, such as one or more interfaces coupled with the one or more antennas 2115 that are configured to support various receiving or obtaining operations, or one or more interfaces coupled with the one or more antennas 2115 that are configured to support various transmitting or outputting operations, or a combination thereof. In some implementations, the transceiver 2110 may include or be configured for coupling with one or more processors or one or more memory components that are operable to perform or support operations based on received or obtained information or signals, or to generate information or other signals for transmission or other outputting, or any combination thereof.

In some implementations, the transceiver 2110, or the transceiver 2110 and the one or more antennas 2115, or the transceiver 2110 and the one or more antennas 2115 and one or more processors or one or more memory components (e.g., the at least one processor 2135, the at least one memory 2125, or both), may be included in a chip or chip assembly that is installed in the device 2105. In some examples, the transceiver 2110 may be operable to support communications via one or more communications links (e.g., a communication link 125, a backhaul communication link 120, a midhaul communication link 162, a fronthaul communication link 168).

The at least one memory 2125 may include RAM, ROM, or any combination thereof. The at least one memory 2125 may store computer-readable, computer-executable code 2130 including instructions that, when executed by one or more of the at least one processor 2135, cause the device 2105 to perform various functions described herein. The code 2130 may be stored in a non-transitory computer-readable medium such as system memory or another type of memory. In some cases, the code 2130 may not be directly executable by a processor of the at least one processor 2135 but may cause a computer (e.g., when compiled and executed) to perform functions described herein. In some cases, the at least one memory 2125 may contain, among other things, a BIOS which may control basic hardware or software operation such as the interaction with peripheral components or devices. In some examples, the at least one processor 2135 may include multiple processors and the at least one memory 2125 may include multiple memories. One or more of the multiple processors may be coupled with one or more of the multiple memories which may, individually or collectively, be configured to perform various functions herein (for example, as part of a processing system).

The at least one processor 2135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 2135 may be configured to operate a memory array using a memory controller. In some other cases, a memory controller may be integrated into one or more of the at least one processor 2135.

The at least one processor 2135 may be configured to execute computer-readable instructions stored in a memory (e.g., one or more of the at least one memory 2125) to cause the device 2105 to perform various functions (e.g., functions or tasks supporting techniques for non-transparent inference monitoring). For example, the device 2105 or a component of the device 2105 may include at least one processor 2135 and at least one memory 2125 coupled with one or more of the at least one processor 2135, the at least one processor 2135 and the at least one memory 2125 configured to perform various functions described herein. The at least one processor 2135 may be an example of a cloud-computing platform (e.g., one or more physical nodes and supporting software such as operating systems, virtual machines, or container instances) that may host the functions (e.g., by executing code 2130) to perform the functions of the device 2105. The at least one processor 2135 may be any one or more suitable processors capable of executing scripts or instructions of one or more software programs stored in the device 2105 (such as within one or more of the at least one memory 2125). In some examples, the at least one processor 2135 may include multiple processors and the at least one memory 2125 may include multiple memories.

One or more of the multiple processors may be coupled with one or more of the multiple memories, which may, individually or collectively, be configured to perform various functions herein. In some examples, the at least one processor 2135 may be a component of a processing system, which may refer to a system (such as a series) of machines, circuitry (including, for example, one or both of processor circuitry (which may include the at least one processor 2135) and memory circuitry (which may include the at least one memory 2125)), or components, that receives or obtains inputs and processes the inputs to produce, generate, or obtain a set of outputs. The processing system may be configured to perform one or more of the functions described herein. As such, the at least one processor 2135 or a processing system including the at least one processor 2135 may be configured to, configurable to, or operable to cause the device 2105 to perform one or more of the functions described herein. Further, as described herein, being "configured to," being "configurable to," and being "operable to" may be used interchangeably and may be associated with a capability, when executing code stored in the at least one memory 2125 or otherwise, to perform one or more of the functions described herein.

In some examples, a bus 2140 may support communications of (e.g., within) a protocol layer of a protocol stack. In some examples, a bus 2140 may support communications associated with a logical channel of a protocol stack (e.g., between protocol layers of a protocol stack), which may include communications performed within a component of the device 2105, or between different components of the device 2105 that may be co-located or located in different locations (e.g., where the device 2105 may refer to a system in which one or more of the communications manager 2120, the transceiver 2110, the at least one memory 2125, the code 2130, and the at least one processor 2135 may be located in one of the different components or divided between different components).

In some examples, the communications manager 2120 may manage aspects of communications with a core network 130 (e.g., via one or more wired or wireless backhaul links). For example, the communications manager 2120 may manage the transfer of data communications for client devices, such as one or more UEs 115. In some examples, the communications manager 2120 may manage communications with other network entities 105, and may include a controller or scheduler for controlling communications with UEs 115 in cooperation with other network entities 105. In some examples, the communications manager 2120 may support an X2 interface within an LTE/LTE-A wireless communications network technology to provide communication between network entities 105.

The communications manager 2120 may support wireless communication in accordance with examples disclosed herein. For example, the communications manager 2120 is capable of, configured to, or operable to support a means for transmitting monitoring input data to one or both of a UE or a network entity of a RAN. The communications manager 2120 is capable of, configured to, or operable to support a means for receiving, from one or both of the UE or the network entity, at least one monitoring report based on the monitoring input data provided by the AI or ML service and a reporting configuration of the UE or the network entity, the at least one monitoring report including feedback information associated with a first inference or model of the AI or ML service. The communications manager 2120 is capable of, configured to, or operable to support a means for performing one or more LCM operations associated with the first inference or model of the AI or ML service in accordance with the at least one monitoring report provided by one or both of the UE or the network entity.

By including or configuring the communications manager 2120 in accordance with examples described herein, the device 2105 may support techniques for non-transparent inference monitoring, which may result in improved inference capability, improved communication reliability, reduced latency, improved user experience related to reduced processing, reduced power consumption, more efficient utilization of communication resources, improved coordination between devices, longer battery life, improved utilization of processing capability, among other advantages.

In some examples, the communications manager 2120 may be configured to perform various operations (e.g., receiving, obtaining, monitoring, outputting, transmitting) using or otherwise in cooperation with the transceiver 2110, the one or more antennas 2115 (e.g., where applicable), or any combination thereof. Although the communications manager 2120 is illustrated as a separate component, in some examples, one or more functions described with reference to the communications manager 2120 may be supported by or performed by the transceiver 2110, one or more of the at least one processor 2135, one or more of the at least one memory 2125, the code 2130, or any combination thereof (for example, by a processing system including at least a portion of the at least one processor 2135, the at least one memory 2125, the code 2130, or any combination thereof). For example, the code 2130 may include instructions executable by one or more of the at least one processor 2135 to cause the device 2105 to perform various aspects of techniques for non-transparent inference monitoring as described herein, or the at least one processor 2135 and the at least one memory 2125 may be otherwise configured to, individually or collectively, perform or support such operations.

Figure 22:
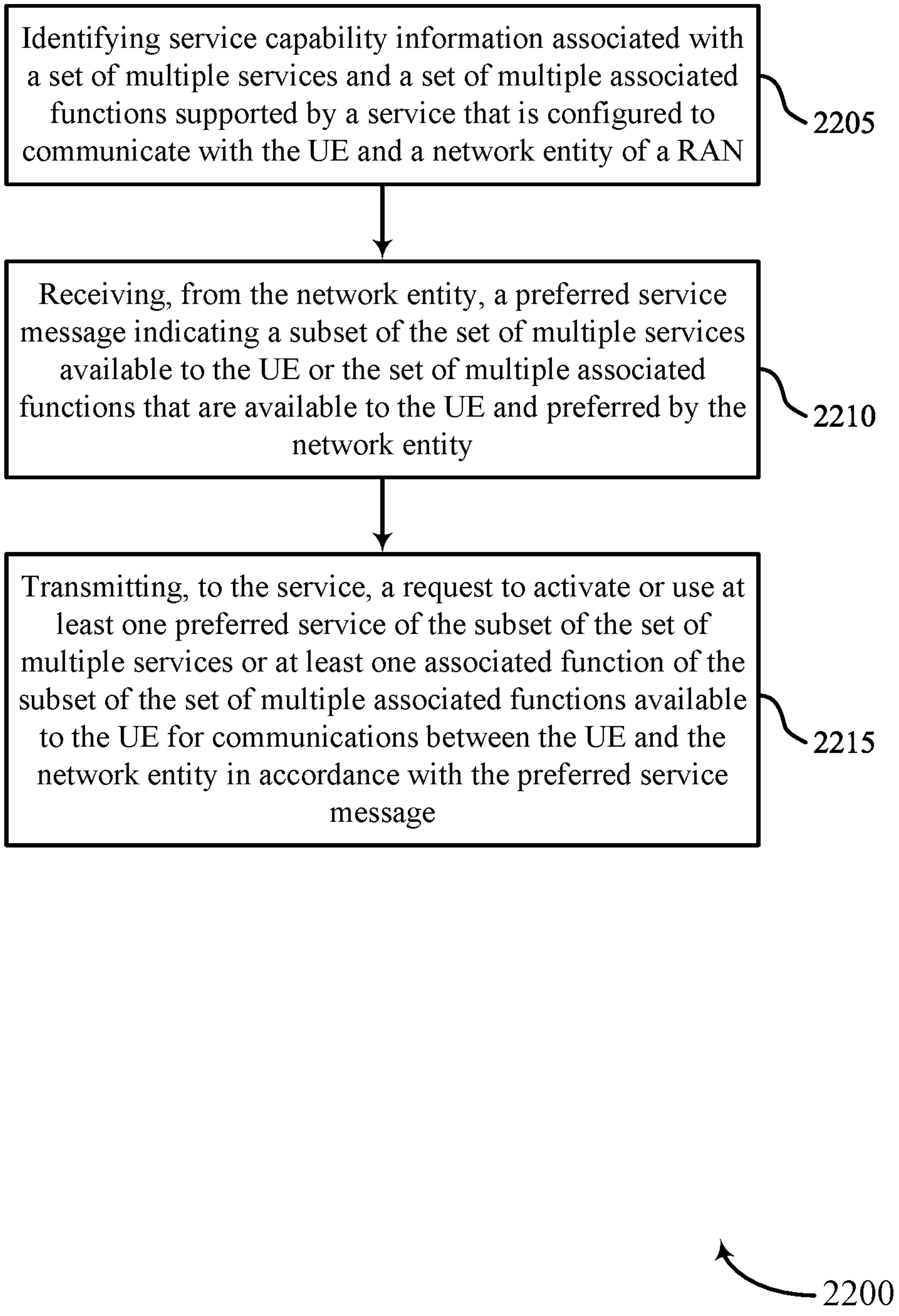
FIGS. 22 through 26 show flowcharts illustrating methods that support techniques for non-transparent service establishment and inference monitoring in accordance with one or more aspects of the present disclosure.

FIG. 22 shows a flowchart illustrating a method 2200 that supports techniques for non-transparent inference monitoring in accordance with aspects of the present disclosure. The operations of the method 2200 may be implemented by a UE or components thereof. For example, the operations of the method 2200 may be performed by a UE 115, as described with reference to FIGS. 1 through 15. In some examples, the UE may execute a set of instructions to control the functional elements of the UE to perform the described functions. Additionally, or alternatively, the UE may perform aspects of the described functions using special-purpose hardware.

At 2205, the method may include identifying service capability information associated with a set of multiple services and a set of multiple associated functions supported by a service that is configured to communicate with the UE and a network entity of a RAN. In some examples, aspects of the operations of 2205 may be performed by a service capability component 25, as described with reference to FIG. 14.

At 2210, the method may include receiving, from the network entity, a preferred service message indicating a subset of the set of multiple services available to the UE or the set of multiple associated functions that are available to the UE and preferred by the network entity. In some examples, aspects of the operations of 2210 may be performed by a preferred service component 30, as described with reference to FIG. 14.

At 2215, the method may include transmitting, to the service, a request to activate or use at least one preferred service of the subset of the set of multiple services or at least one preferred associated function of the subset of the set of multiple associated functions available to the UE for communications between the UE and the network entity in accordance with the preferred service message. In some examples, aspects of the operations of 2215 may be performed by a service request component 35, as described with reference to FIG. 14.

Figure 23:
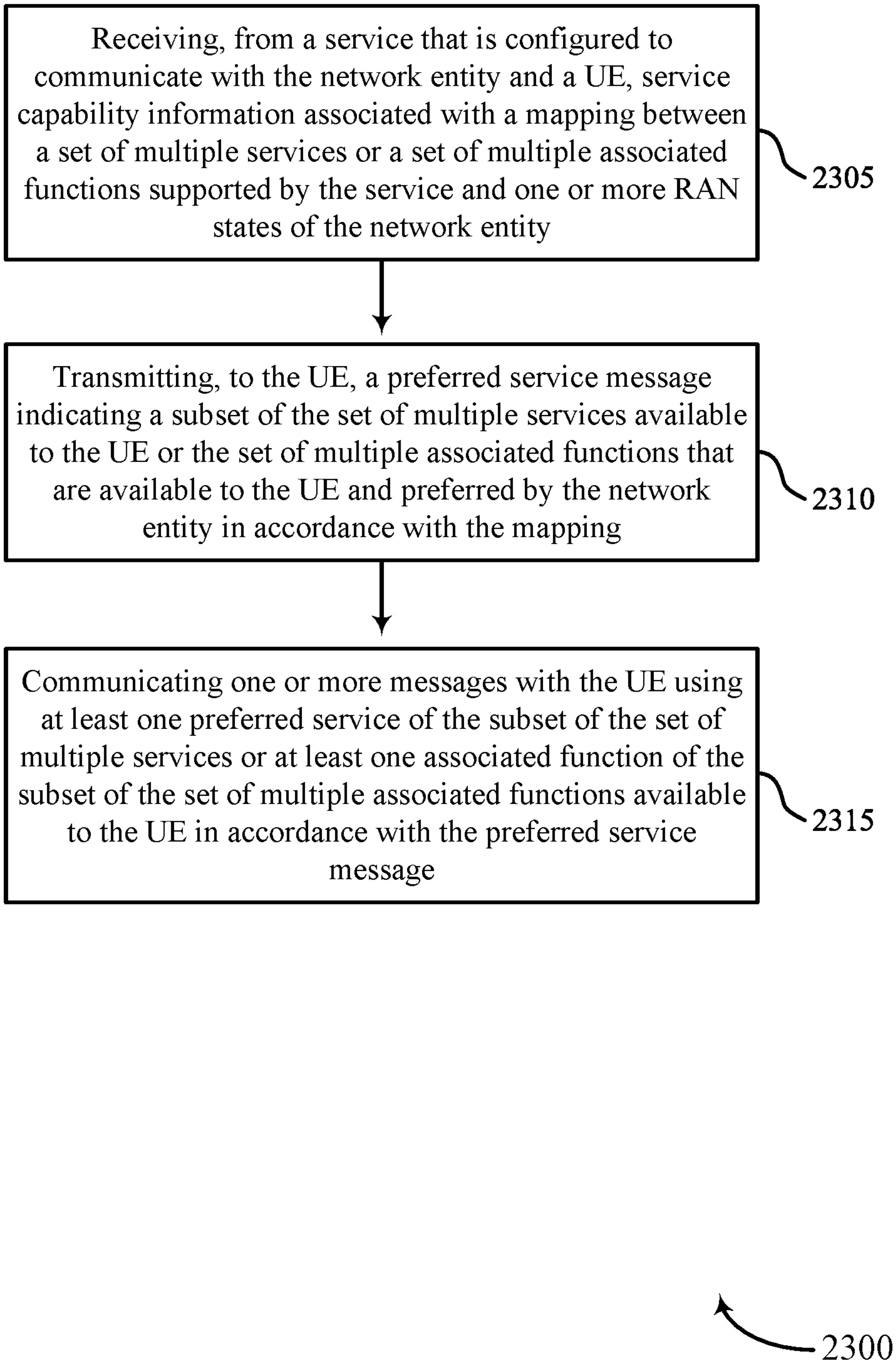

FIG. 23 shows a flowchart illustrating a method 2300 that supports techniques for non-transparent inference monitoring in accordance with aspects of the present disclosure. The operations of the method 2300 may be implemented by a network entity or components thereof. For example, the operations of the method 2300 may be performed by a network entity 105, as described with reference to FIGS. 1 through 13 and 16 through 18. In some examples, the network entity may execute a set of instructions to control the functional elements of the network entity to perform the described functions. Additionally, or alternatively, the network entity may perform aspects of the described functions using special-purpose hardware.

At 2305, the method may include receiving, from a service that is configured to communicate with the network entity and a UE, service capability information associated with a mapping between a set of multiple services or a set of multiple associated functions supported by the service and one or more RAN states of the network entity. In some examples, aspects of the operations of 2305 may be performed by a capability information component 1725, as described with reference to FIG. 17.

At 2310, the method may include transmitting, to the UE, a preferred service message indicating a subset of the set of multiple services available to the UE or the set of multiple associated functions that are available to the UE and preferred by the network entity in accordance with the mapping. In some examples, aspects of the operations of 2310 may be performed by a service message component 1730, as described with reference to FIG. 17.

At 2315, the method may include communicating one or more messages with the UE using at least one preferred service of the subset of the set of multiple services or at least one preferred associated function of the subset of the set of multiple associated functions available to the UE in accordance with the preferred service message. In some examples, aspects of the operations of 2315 may be performed by a preferred service/function component 1735, as described with reference to FIG. 17.

Figure 24:
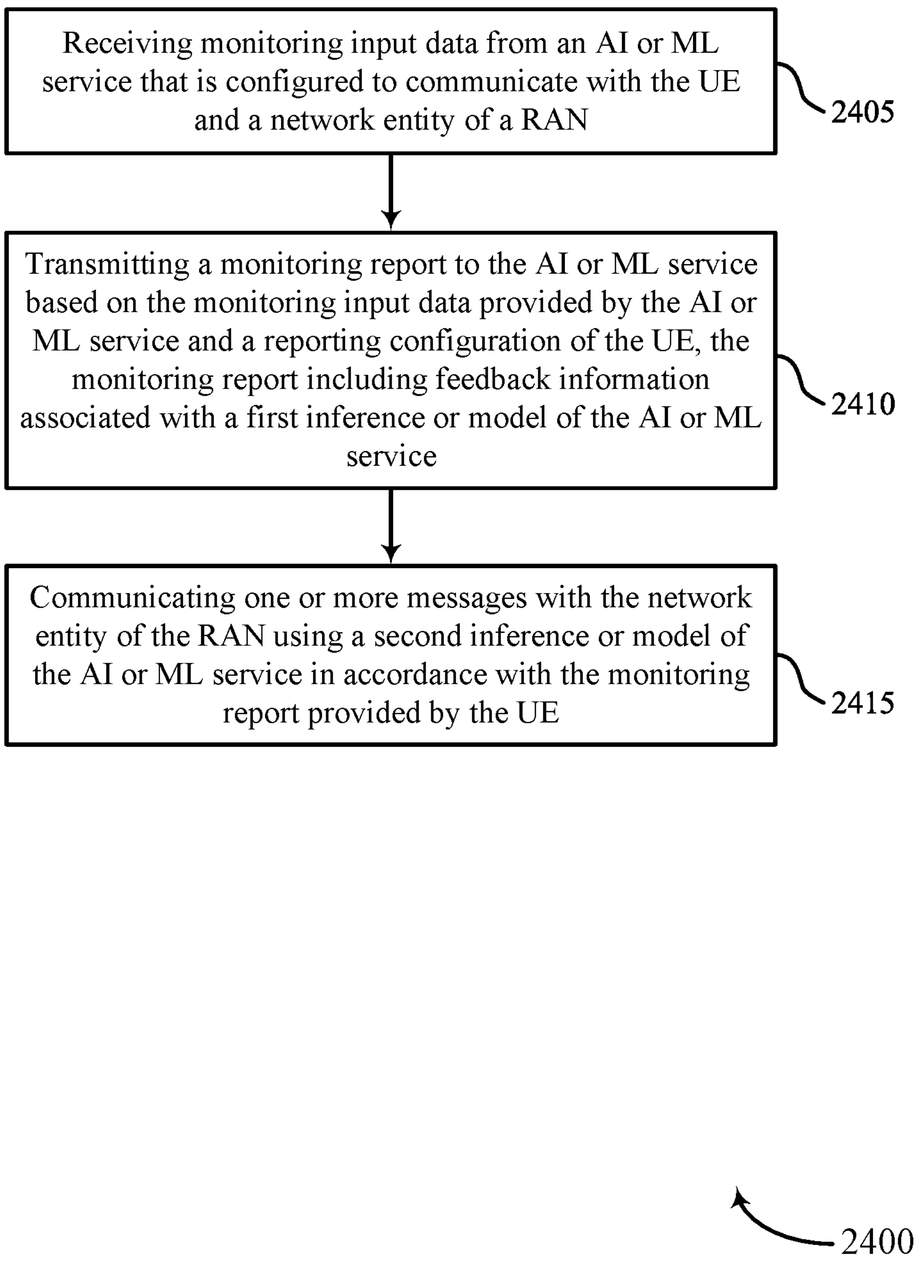

FIG. 24 shows a flowchart illustrating a method 2400 that supports techniques for non-transparent inference monitoring in accordance with aspects of the present disclosure. The operations of the method 2400 may be implemented by a UE or components thereof. For example, the operations of the method 2400 may be performed by a UE 115, as described with reference to FIGS. 1 through 15. In some examples, the UE may execute a set of instructions to control the functional elements of the UE to perform the described functions. Additionally, or alternatively, the UE may perform aspects of the described functions using special-purpose hardware.

At 2405, the method may include receiving monitoring input data from an AI or ML service that is configured to communicate with the UE and a network entity of a RAN. In some examples, aspects of the operations of 2405 may be performed by an input data component 40, as described with reference to FIG. 14.

At 2410, the method may include transmitting a monitoring report to the AI or ML service based on the monitoring input data provided by the AI or ML service and a reporting configuration of the UE, the monitoring report including feedback information associated with a first inference or model of the AI or ML service. In some examples, aspects of the operations of 2410 may be performed by a monitoring report component 45, as described with reference to FIG. 14.

At 2415, the method may include communicating one or more messages with the network entity of the RAN using a second inference or model of the AI or ML service in accordance with the monitoring report provided by the UE. In some examples, aspects of the operations of 2415 may be performed by a message communication component 50, as described with reference to FIG. 14.

Figure 25:
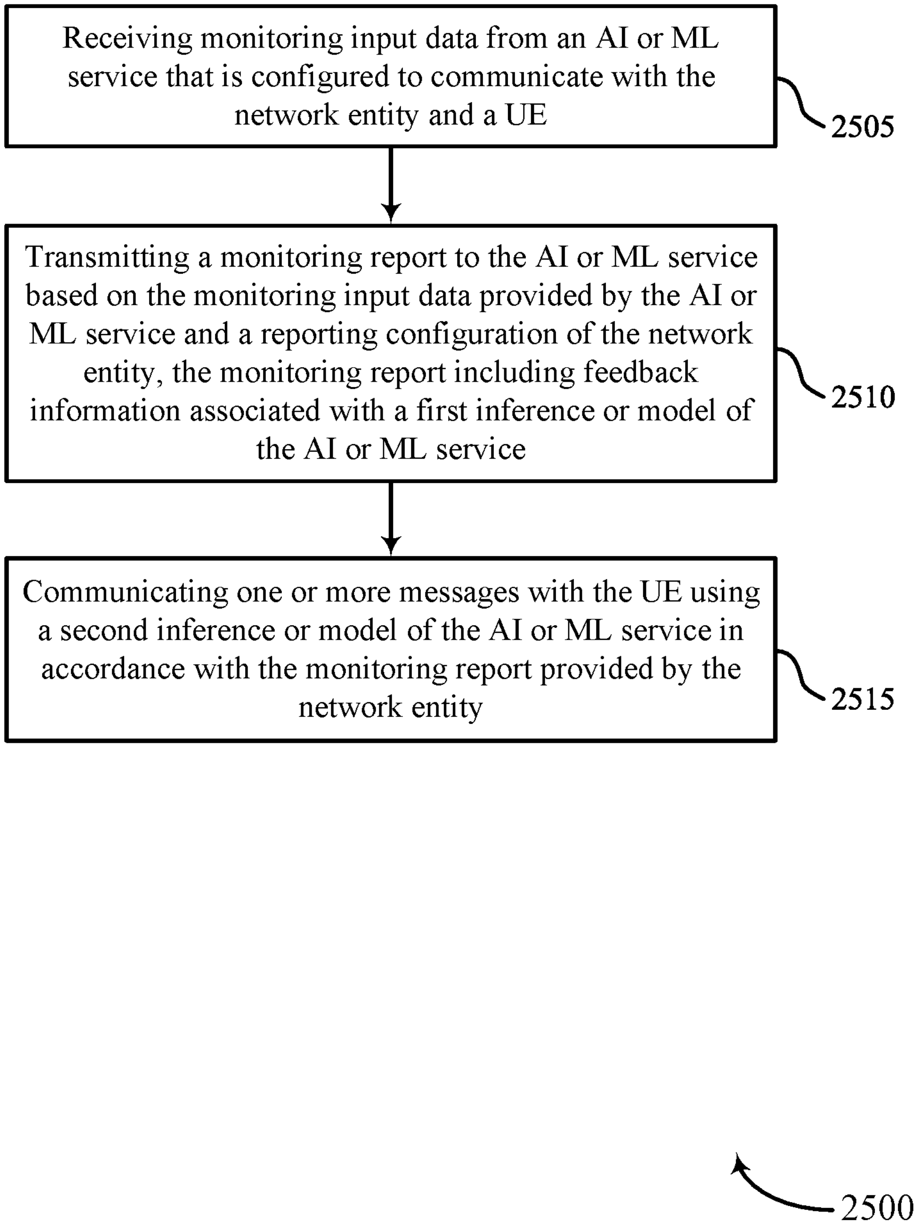

FIG. 25 shows a flowchart illustrating a method 2500 that supports techniques for non-transparent inference monitoring in accordance with aspects of the present disclosure. The operations of the method 2500 may be implemented by a network entity or components thereof. For example, the operations of the method 2500 may be performed by a network entity 105, as described with reference to FIGS. 1 through 13 and 16 through 18. In some examples, a network entity may execute a set of instructions to control the functional elements of the network entity to perform the described functions. Additionally, or alternatively, the network entity may perform aspects of the described functions using special-purpose hardware.

At 2505, the method may include receiving monitoring input data from an AI or ML service that is configured to communicate with the network entity and a UE. In some examples, aspects of the operations of 2505 may be performed by a monitoring input component 1740, as described with reference to FIG. 17.

At 2510, the method may include transmitting a monitoring report to the AI or ML service based on the monitoring input data provided by the AI or ML service and a reporting configuration of the network entity, the monitoring report including feedback information associated with a first inference or model of the AI or ML service. In some examples, aspects of the operations of 2510 may be performed by a feedback information component 1745, as described with reference to FIG. 17.

At 2515, the method may include communicating one or more messages with the UE using a second inference or model of the AI or ML service in accordance with the monitoring report provided by the network entity. In some examples, aspects of the operations of 2515 may be performed by an AI/ML inference component 1750, as described with reference to FIG. 17.

Figure 26:
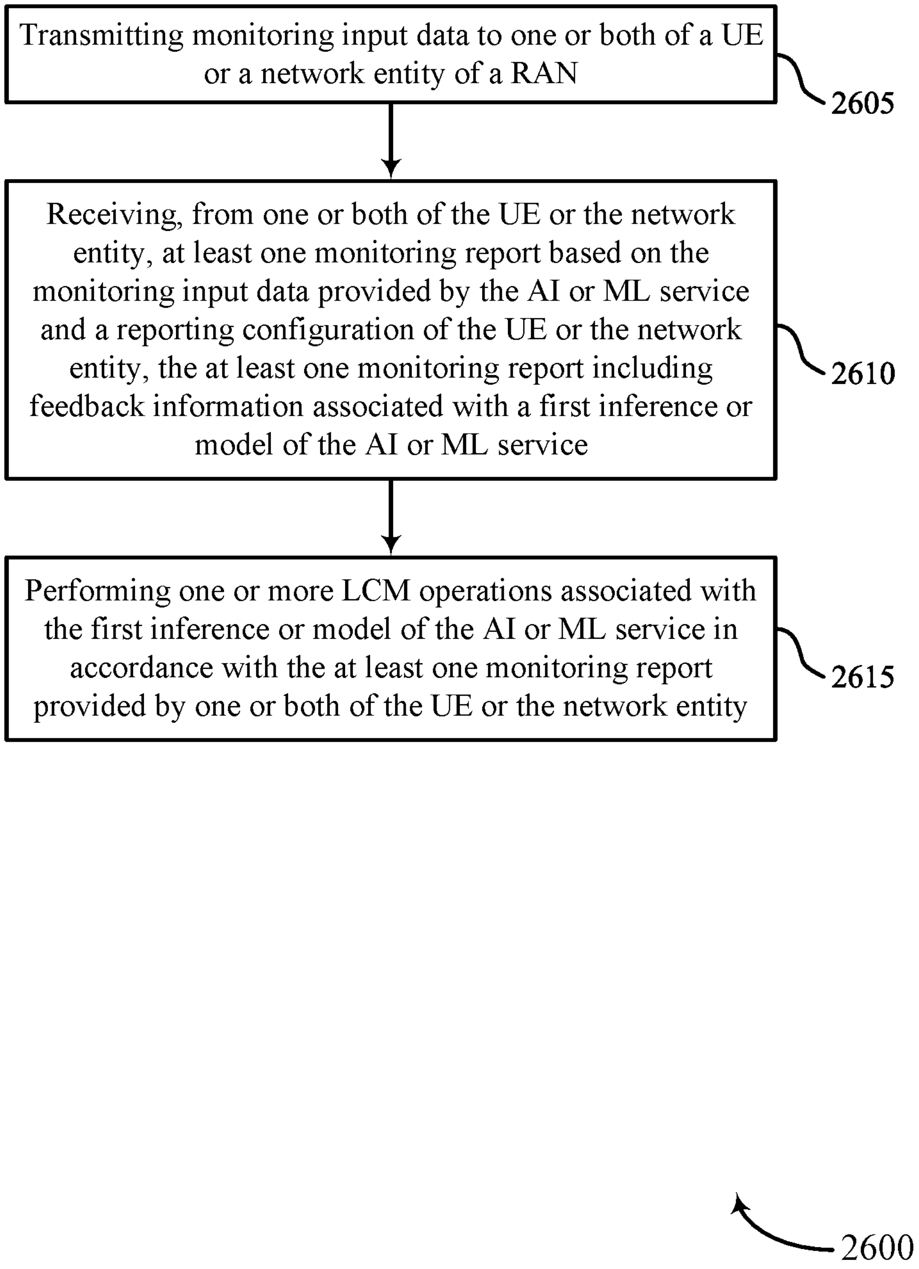

FIG. 26 shows a flowchart illustrating a method 2600 that supports techniques for non-transparent inference monitoring in accordance with aspects of the present disclosure. The operations of the method 2600 may be implemented by an AI/ML service or components thereof. For example, the operations of the method 2600 may be performed by an AI/ML service 605, as described with reference to FIG. 6. In some examples, the AI/ML service may execute a set of instructions to control the functional elements of the AI/ML service to perform the described functions. Additionally, or alternatively, the AI/ML service may perform aspects of the described functions using special-purpose hardware.

At 2605, the method may include transmitting monitoring input data to one or both of a UE or a network entity of a RAN. In some examples, aspects of the operations of 2605 may be performed by an AI/ML data transmitting component 2025, as described with reference to FIG. 20.

At 2610, the method may include receiving, from one or both of the UE or the network entity, at least one monitoring report based on the monitoring input data provided by the AI or ML service and a reporting configuration of the UE or the network entity, the at least one monitoring report including feedback information associated with a first inference or model of the AI or ML service. In some examples, aspects of the operations of 2610 may be performed by a report receiving component 2030, as described with reference to FIG. 20.

At 2615, the method may include performing one or more LCM operations associated with the first inference or model of the AI or ML service in accordance with the at least one monitoring report provided by one or both of the UE or the network entity. In some examples, aspects of the operations of 2615 may be performed by an LCM performing component 2035, as described with reference to FIG. 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

What is claimed is:

1. A user equipment (UE), comprising:

one or more memories storing processor-executable code; and one or more processors coupled with the one or more memories and individually or collectively operable to execute the code to cause the UE to:

receive monitoring input data from an artificial intelligence (AI) or machine learning (ML) service that is configured to communicate with the UE and a network entity of a radio access network (RAN);

transmit a monitoring report to the AI or ML service based at least in part on the monitoring input data provided by the AI or ML service and a reporting configuration of the UE, the monitoring report comprising feedback information associated with a first inference or model of the AI or ML service; and communicate one or more messages with the network entity of the RAN using a second inference or model of the AI or ML service in accordance with the feedback information of the monitoring report provided by the UE.

2. The UE of claim 1, wherein the one or more processors are individually or collectively further operable to execute the code to cause the UE to:

receive second monitoring input data from the network entity of the RAN that is configured to communicate with the UE and the AI or ML service, wherein the monitoring report is based at least in part on the second monitoring input data.

3. The UE of claim 1, wherein, to transmit the monitoring report, the one or more processors are individually or collectively operable to execute the code to cause the UE to:

transmit the monitoring report that indicates at least one of a minimum mean square error (MMSE) threshold, latency data, network loading information, uplink or downlink throughout information, packet loss data, or radio link failure (RLF) rate information associated with the first inference or model of the AI or ML service.

4. The UE of claim 1, wherein, to transmit the monitoring report, the one or more processors are individually or collectively operable to execute the code to cause the UE to:

transmit the monitoring report to the AI or ML service based at least in part on the monitoring input data satisfying one or more event-based trigger conditions associated with the reporting configuration of the UE.

5. The UE of claim 1, wherein the one or more processors are individually or collectively further operable to execute the code to cause the UE to:

transmit first AI or ML input data to the AI or ML service; and receive, from the AI or ML service, AI or ML output data generated based at least in part on the first AI or ML input data and comprising positioning data or feedback information associated with the first inference or model of the AI or ML service.

6. The UE of claim 1, wherein the one or more processors are individually or collectively further operable to execute the code to cause the UE to:

transmit, to the AI or ML service, a lifecycle management (LCM) control indication comprising a request to deactivate, switch, revert, or reconfigure a current model of the AI or ML service based at least in part on the monitoring input data.

7. The UE of claim 6, wherein the one or more processors are individually or collectively further operable to execute the code to cause the UE to:

receive, from the AI or ML service, LCM control signaling associated with deactivating, switching, reverting, or reconfiguring the current model of the AI or ML service in accordance with the LCM control signaling.

8. The UE of claim 1, wherein the one or more processors are individually or collectively further operable to execute the code to cause the UE to:

receive control signaling that indicates the reporting configuration of the UE, wherein transmitting the monitoring report is based at least in part on the control signaling.

9. The UE of claim 1, wherein the one or more messages are communicated with the network entity of the RAN based at least in part on one or more communication parameters, the one or more communication parameters based at least in part on the second inference or model of the AI or ML service.

10. A network entity, comprising:

one or more memories storing processor-executable code; and one or more processors coupled with the one or more memories and individually or collectively operable to execute the code to cause the network entity to:

receive monitoring input data from an artificial intelligence (AI) or machine learning (ML) service that is configured to communicate with the network entity and a user equipment (UE);

transmit a monitoring report to the AI or ML service based at least in part on the monitoring input data provided by the AI or ML service and a reporting configuration of the network entity, the monitoring report comprising feedback information associated with a first inference or model of the AI or ML service; and communicate one or more messages with the UE using a second inference or model of the AI or ML service in accordance with the feedback information of the monitoring report provided by the network entity.

11. The network entity of claim 10, wherein the one or more processors are individually or collectively further operable to execute the code to cause the network entity to:

transmit second monitoring input data to the UE, wherein the monitoring report is based at least in part on the second monitoring input data, and wherein the second inference or model of the AI or ML service is based at least in part on feedback information associated with the second monitoring input data provided by the network entity.

12. The network entity of claim 10, wherein, to transmit the monitoring report, the one or more processors are individually or collectively operable to execute the code to cause the network entity to:

transmit the monitoring report that triggers deactivation of the first inference or model of the AI or ML service when the feedback information indicates that a performance of the first inference or model is below a threshold.

13. The network entity of claim 10, wherein, to transmit the monitoring report, the one or more processors are individually or collectively operable to execute the code to cause the network entity to:

transmit the monitoring report that triggers a switch from the first inference or model of the AI or ML service to the second inference or model of the AI or ML service when the feedback information indicates that a performance of the first inference or model is below a threshold.

14. The network entity of claim 10, wherein the one or more processors are individually or collectively further operable to execute the code to cause the network entity to:

receive, from the AI or ML service, AI or ML output data generated using the second inference or model of the AI or ML service.

15. The network entity of claim 10, wherein the one or more processors are individually or collectively further operable to execute the code to cause the network entity to:

receive, from the AI or ML service, lifecycle management (LCM) control signaling that indicates a reconfiguration from an AI or ML-based model to a non-AI or ML-based model, wherein the reconfiguration is based at least in part on the monitoring report.

16. The network entity of claim 10, wherein the one or more processors are individually or collectively further operable to execute the code to cause the network entity to:

receive, from the AI or ML service, lifecycle management (LCM) control signaling that indicates a reconfiguration from a non-AI or ML-based model to an AI or ML-based model, wherein the reconfiguration is based at least in part on the monitoring report.

17. The network entity of claim 10, wherein the second inference or model of the AI or ML service comprises the first inference or model of the AI or ML service.

18. The network entity of claim 10, wherein the one or more processors are individually or collectively further operable to execute the code to cause the network entity to:

receive, from the AI or ML service, control signaling that indicates the reporting configuration of the network entity, wherein transmitting the monitoring report is based at least in part on the control signaling.

19. The network entity of claim 10, wherein the one or more messages are communicated with the UE based at least in part on one or more communication parameters, the one or more communication parameters based at least in part on the second inference or model of the AI or ML service.

20. An artificial intelligence (AI) or machine learning (ML) service, comprising:

one or more memories storing processor-executable code; and one or more processors coupled with the one or more memories and individually or collectively operable to execute the code to cause the artificial intelligence (AI) or machine learning (ML) service to:

transmit monitoring input data to at least one of a user equipment (UE) or a network entity of a radio access network (RAN);

receive, from the at least one of the UE or the network entity, at least one monitoring report based at least in part on the monitoring input data provided by the AI or ML service and a reporting configuration of the UE or the network entity, the at least one monitoring report comprising feedback information associated with a first inference or model of the AI or ML service; and perform one or more lifecycle management (LCM) operations associated with the first inference or model of the AI or ML service in accordance with the feedback information of the at least one monitoring report provided by one or both of the UE or the network entity.

21. The AI or ML service of claim 20, wherein, to receive the at least one monitoring report, the one or more processors are individually or collectively operable to execute the code to cause the artificial intelligence (AI) or machine learning (ML) service to:

receive the at least one monitoring report that indicates at least one of a minimum mean square error (MMSE) threshold, latency data, network loading information, uplink or downlink throughout information, packet loss data, or radio link failure (RLF) rate information associated with the first inference or model of the AI or ML service.

22. The AI or ML service of claim 20, wherein, to receive the at least one monitoring report, the one or more processors are individually or collectively operable to execute the code to cause the artificial intelligence (AI) or machine learning (ML) service to:

receive the at least one monitoring report from the UE based at least in part on the monitoring input data satisfying one or more event-based trigger conditions associated with the reporting configuration of the UE.

23. The AI or ML service of claim 20, wherein, to receive the at least one monitoring report, the one or more processors are individually or collectively operable to execute the code to cause the artificial intelligence (AI) or machine learning (ML) service to:

receive the at least one monitoring report from the network entity based at least in part on the monitoring input data satisfying one or more event-based trigger conditions associated with the reporting configuration of the network entity.

24. The AI or ML service of claim 20, wherein, to receive the at least one monitoring report, the one or more processors are individually or collectively operable to execute the code to cause the artificial intelligence (AI) or machine learning (ML) service to:

receive the at least one monitoring report from one or both of the UE or the network entity in accordance with one or more periodic reporting criteria associated with the reporting configuration of the UE or the network entity.

25. The AI or ML service of claim 20, wherein, to receive the at least one monitoring report, the one or more processors are individually or collectively operable to execute the code to cause the artificial intelligence (AI) or machine learning (ML) service to:

receive respective monitoring reports from the UE and the network entity; and perform one or more LCM operations associated with the first inference or model of the AI or ML service based at least in part on the respective monitoring reports provided by the UE and the network entity.

26. The AI or ML service of claim 20, wherein the one or more processors are individually or collectively further operable to execute the code to cause the artificial intelligence (AI) or machine learning (ML) service to:

receive first AI or ML input data from the UE; and transmit, to the UE, AI or ML output data generated based at least in part on the first AI or ML input data and comprising channel state information (CSI), positioning data, or feedback information generated using a second inference or model of the AI or ML service.

27. The AI or ML service of claim 20, wherein, to perform the one or more LCM operations, the one or more processors are individually or collectively operable to execute the code to cause the artificial intelligence (AI) or machine learning (ML) service to:

receive, from the UE, an LCM control indication comprising a request to deactivate, switch, revert, or reconfigure the first inference or model of the AI or ML service based at least in part on the monitoring input data.

28. The AI or ML service of claim 27, wherein, to perform the one or more LCM operations, the one or more processors are individually or collectively operable to execute the code to cause the artificial intelligence (AI) or machine learning (ML) service to:

transmit, to the UE, LCM control signaling associated with deactivating, switching, reverting, or reconfiguring the first inference or model of the AI or ML service in accordance with the LCM control signaling.

29. The AI or ML service of claim 20, wherein, to perform the one or more LCM operations, the one or more processors are individually or collectively operable to execute the code to cause the artificial intelligence (AI) or machine learning (ML) service to:

transmit one or more control messages associated with updating or reconfiguring the first inference or model of the AI or ML service based at least in part on the monitoring input data.

30. The AI or ML service of claim 20, wherein the AI or ML service runs on one or more processors of a network node that is separate from the RAN.

31. The AI or ML service of claim 20, wherein the AI or ML service runs on one or more processors of the UE that is capable of performing one or more AI or ML functions.

32. A method for wireless communication by a user equipment (UE), comprising:

receiving monitoring input data from an artificial intelligence (AI) or machine learning (ML) service that is configured to communicate with the UE and a network entity of a radio access network (RAN);

transmitting a monitoring report to the AI or ML service based at least in part on the monitoring input data provided by the AI or ML service and a reporting configuration of the UE, the monitoring report comprising feedback information associated with a first inference or model of the AI or ML service; and communicating one or more messages with the network entity of the RAN using a second inference or model of the AI or ML service in accordance with the feedback information of the monitoring report provided by the UE.

33. The method of claim 32, further comprising:

receiving second monitoring input data from the network entity of the RAN that is configured to communicate with the UE and the AI or ML service, wherein the monitoring report is based at least in part on the second monitoring input data.

34. The method of claim 32, wherein transmitting the monitoring report comprises:

transmitting the monitoring report that indicates at least one of a minimum mean square error (MMSE) threshold, latency data, network loading information, uplink or downlink throughout information, packet loss data, or radio link failure (RLF) rate information associated with the first inference or model of the AI or ML service.

35. The method of claim 32, wherein transmitting the monitoring report comprises:

transmitting the monitoring report to the AI or ML service based at least in part on the monitoring input data satisfying one or more event-based trigger conditions associated with the reporting configuration of the UE.

36. The method of claim 32, further comprising:

transmitting first AI or ML input data to the AI or ML service; and receiving, from the AI or ML service, AI or ML output data comprising positioning data or feedback information associated with the first inference or model of the AI or ML service.

37. The method of claim 32, further comprising:

transmitting, to the AI or ML service, a lifecycle management (LCM) control indication comprising a request to deactivate, switch, revert, or reconfigure a current model of the AI or ML service based at least in part on the monitoring input data.

38. The method of claim 37, further comprising:

receiving, from the AI or ML service, LCM control signaling associated with deactivating, switching, reverting, or reconfiguring the current model of the AI or ML service in accordance with the LCM control signaling.

39. The method of claim 32, further comprising:

receiving control signaling that indicates the reporting configuration of the UE, wherein transmitting the monitoring report is based at least in part on the control signaling.

40. A method for wireless communication by a network entity, comprising:

receiving monitoring input data from an artificial intelligence (AI) or machine learning (ML) service that is configured to communicate with the network entity and a user equipment (UE);

transmitting a monitoring report to the AI or ML service based at least in part on the monitoring input data provided by the AI or ML service and a reporting configuration of the network entity, the monitoring report comprising feedback information associated with a first inference or model of the AI or ML service; and communicating one or more messages with the UE using a second inference or model of the AI or ML service in accordance with the feedback information of the monitoring report provided by the network entity.

41. The method of claim 40, further comprising:

transmitting second monitoring input data to the UE, wherein the monitoring report is based at least in part on the second monitoring input data, and wherein the second inference or model of the AI or ML service is based at least in part on feedback information associated with the second monitoring input data provided by the network entity.

42. The method of claim 40, wherein transmitting the monitoring report comprises:

transmitting the monitoring report that triggers deactivation of the first inference or model of the AI or ML service when the feedback information indicates that a performance of the first inference or model is below a threshold.

43. The method of claim 40, wherein transmitting the monitoring report comprises:

transmitting the monitoring report that triggers a switch from the first inference or model of the AI or ML service to the second inference or model of the AI or ML service when the feedback information indicates that a performance of the first inference or model is below a threshold.

44. The method of claim 40, further comprising:

receiving, from the AI or ML service, AI or ML output data generated using the second inference or model of the AI or ML service.

45. The method of claim 40, further comprising:

receiving, from the AI or ML service, lifecycle management (LCM) control signaling that indicates a reconfiguration from an AI or ML-based model to a non-AI or ML-based model, wherein the reconfiguration is based at least in part on the monitoring report.

46. The method of claim 40, further comprising:

receiving, from the AI or ML service, lifecycle management (LCM) control signaling that indicates a reconfiguration from a non-AI or ML-based model to an AI or ML-based model, wherein the reconfiguration is based at least in part on the monitoring report.

47. The method of claim 40, wherein the second inference or model of the AI or ML service comprises the first inference or model of the AI or ML service.

48. The method of claim 40, further comprising:

receiving, from the AI or ML service, control signaling that indicates the reporting configuration of the network entity, wherein transmitting the monitoring report is based at least in part on the control signaling.

49. A method for wireless communication by an artificial intelligence (AI) or machine learning (ML) service, comprising:

transmitting monitoring input data to one or both of a user equipment (UE) or a network entity of a radio access network (RAN);

receiving, from one or both of the UE or the network entity, at least one monitoring report based at least in part on the monitoring input data provided by the AI or ML service and a reporting configuration of the UE or the network entity, the at least one monitoring report comprising feedback information associated with a first inference or model of the AI or ML service; and performing one or more lifecycle management (LCM) operations associated with the first inference or model of the AI or ML service in accordance with the feedback information of the at least one monitoring report provided by one or both of the UE or the network entity.

50. The method of claim 49, wherein receiving the at least one monitoring report comprises:

receiving the at least one monitoring report that indicates at least one of a minimum mean square error (MMSE) threshold, latency data, network loading information, uplink or downlink throughout information, packet loss data, or radio link failure (RLF) rate information associated with the first inference or model of the AI or ML service.

51. The method of claim 49, wherein receiving the at least one monitoring report comprises:

receiving the at least one monitoring report from the UE based at least in part on the monitoring input data satisfying one or more event-based trigger conditions associated with the reporting configuration of the UE.

52. The method of claim 49, wherein receiving the at least one monitoring report comprises:

receiving the at least one monitoring report from the network entity based at least in part on the monitoring input data satisfying one or more event-based trigger conditions associated with the reporting configuration of the network entity.

53. The method of claim 49, wherein receiving the at least one monitoring report comprises:

receiving the at least one monitoring report from one or both of the UE or the network entity in accordance with one or more periodic reporting criteria associated with the reporting configuration of the UE or the network entity.

54. The method of claim 49, wherein receiving the at least one monitoring report comprises:

receiving respective monitoring reports from the UE and the network entity; and performing one or more LCM operations associated with the first inference or model of the AI or ML service based at least in part on the respective monitoring reports provided by the UE and the network entity.

55. The method of claim 49, further comprising:

receiving first AI or ML input data from the UE; and transmitting, to the UE, AI or ML output data comprising channel state information (CSI), positioning data, or feedback information generated using a second inference or model of the AI or ML service.

56. The method of claim 49, wherein performing the one or more LCM operations comprises:

receiving, from the UE, an LCM control indication comprising a request to deactivate, switch, revert, or reconfigure the first inference or model of the AI or ML service based at least in part on the monitoring input data.

57. The method of claim 56, wherein performing the one or more LCM operations comprises:

transmitting, to the UE, LCM control signaling associated with deactivating, switching, reverting, or reconfiguring the first inference or model of the AI or ML service in accordance with the LCM control signaling.

58. The method of claim 49, wherein performing the one or more LCM operations comprises:

transmitting one or more control messages associated with updating or reconfiguring the first inference or model of the AI or ML service based at least in part on the monitoring input data.

59. The method of claim 49, wherein the AI or ML service runs on one or more processors of a network node that is separate from the RAN.

60. The method of claim 49, wherein the AI or ML service runs on one or more processors of the UE that is capable of performing one or more AI or ML functions.

* * * * *